US011584901B2

United States Patent
Huang et al.

(10) Patent No.: US 11,584,901 B2
(45) Date of Patent: *Feb. 21, 2023

(54) AMPHIPHILIC POLYSACCHARIDE DERIVATIVES AND COMPOSITIONS COMPRISING SAME

(71) Applicant: NUTRITION & BIOSCIENCES USA 4, INC., Rochester, NY (US)

(72) Inventors: Zhengzheng Huang, Hockessin, DE (US); Helen S. M. Lu, Wallingford, PA (US); Weiming Qiu, Wilmington, DE (US); Mukesh C. Shah, Hockessin, DE (US); Steven W. Shuey, Chadds Ford, PA (US); Mark Robert Sivik, Cincinnati, OH (US); Kristi Lynn Fliter, Cincinnati, OH (US)

(73) Assignee: NUTRITION & BIOSCIENCES USA 4, INC., Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/376,834

(22) Filed: Jul. 15, 2021

(65) Prior Publication Data

US 2022/0056375 A1    Feb. 24, 2022

Related U.S. Application Data

(63) Continuation of application No. 16/465,385, filed as application No. PCT/US2017/066395 on Dec. 14, 2017, now Pat. No. 11,066,626.

(60) Provisional application No. 62/435,158, filed on Dec. 16, 2016.

(51) Int. Cl.
*C11D 3/22* (2006.01)
*B08B 3/04* (2006.01)
*C08B 37/00* (2006.01)
*B08B 3/10* (2006.01)
*C11D 3/00* (2006.01)
*C11D 3/386* (2006.01)
*C11D 11/00* (2006.01)
*C11D 17/04* (2006.01)

(52) U.S. Cl.
CPC ............. *C11D 3/228* (2013.01); *B08B 3/10* (2013.01); *C08B 37/0009* (2013.01); *C11D 3/0036* (2013.01); *C11D 3/225* (2013.01); *C11D 3/226* (2013.01); *C11D 3/227* (2013.01); *C11D 3/38618* (2013.01); *C11D 3/38627* (2013.01); *C11D 3/38645* (2013.01); *C11D 11/0017* (2013.01); *C11D 17/045* (2013.01)

(58) Field of Classification Search
CPC .......... C11D 3/22; C11D 3/225; C11D 3/227; C11D 3/228; C11D 7/268; C11D 17/042; C11D 17/045; B08B 3/04; C08B 37/00; C08B 37/0009
See application file for complete search history.

(56) References Cited

U.S. PATENT DOCUMENTS

| | | | | |
|---|---|---|---|---|
| 11,066,626 B2* | 7/2021 | Huang | ............... | C11D 3/38645 |
| 2015/0368594 A1* | 12/2015 | Nagy | ................. | C11D 3/38645 |
| | | | | 510/320 |

* cited by examiner

*Primary Examiner* — Brian P Mruk

(57) ABSTRACT

The disclosure relates to compositions comprising a polysaccharide derivative, wherein the polysaccharide derivative comprises a polysaccharide substituted with a) at least one hydrophobic group, and b) at least one hydrophilic group, wherein the polysaccharide is poly alpha-1,3-glucan, poly alpha-1,6-glucan, or poly alpha-1,3-1,6-glucan.

14 Claims, No Drawings

AMPHIPHILIC POLYSACCHARIDE DERIVATIVES AND COMPOSITIONS COMPRISING SAME

CROSS-REFERENCE TO RELATED APPLICATIONS

This application is a continuation of application Ser. No. 16/465,385 (filed May 30, 2019) (now U.S. Pat. No. 11,066, 626), which is the National Stage application of International Application No. PCT/US2017/066395 (filed Dec. 14, 2017), which claims the benefit of priority of U.S. Provisional Application No. 62/435,158 (filed Dec. 16, 2016), the disclosures of which prior applications are incorporated herein by reference in their entirety.

FIELD OF THE DISCLOSURE

The present disclosure is directed towards a composition comprising a polysaccharide derivative, wherein the polysaccharide derivative comprises a polysaccharide substituted with at least one hydrophobic group and at least one hydrophilic group.

BACKGROUND

Driven by a desire to find new structural polysaccharides using enzymatic syntheses or genetic engineering of microorganisms, researchers have discovered oligosaccharides and polysaccharides that are biodegradable and can be made economically from renewably-sourced feedstocks.

Modern detergent compositions, including laundry, fabric, dishwashing or other cleaning compositions, comprise common detergent ingredients such as anionic, nonionic, cationic, amphoteric, zwitterionic, and/or semi-polar surfactants; as well as enzymes such as proteases, cellulases, lipases, amylases, and/or peroxidases. Laundry detergent and/or fabric care compositions may further comprise various detergent ingredients having one or more purposes in obtaining fabrics which are not only clean, fresh, and sanitized but also have retained appearance and integrity. Therefore, benefit agents such as perfumes, hygiene agents, insect control agents, bleaching agents, fabric softeners, dye fixatives, soil release agents, and fabric brightening agents have been incorporated into laundry detergent and/or fabric care compositions. In using such detergent components, it is important that some of these compounds deposit on the fabrics so as to be effective during or after the laundering and/or fabric care process.

Many of the ingredients that form a part of a detergent composition are produced from non-renewable petroleum feedstocks. There remains a need to formulate detergent compositions providing improved cleaning performance that are made from renewable resources.

SUMMARY

Disclosed herein are compositions comprising:
a polysaccharide derivative, wherein the polysaccharide derivative comprises a polysaccharide substituted with
  a) at least one hydrophobic group; and
  b) at least one hydrophilic group;
wherein the polysaccharide is poly alpha-1,3-glucan, poly alpha-1,6-glucan, or poly alpha-1,3-1,6-glucan.

In one embodiment, the poly alpha-1,3-glucan comprises a backbone of glucose monomer units wherein greater than or equal to 50% of the glucose monomer units are linked via alpha-1,3-glycosidic linkages. In another embodiment, the poly alpha-1,3-glucan comprises a backbone of glucose monomer units wherein greater than or equal to 90% of the glucose monomer units are linked via alpha-1,3-glycosidic linkages. In a further embodiment, the poly alpha-1,6-glucan comprises a backbone of glucose monomer units wherein greater than or equal to 40% of the glucose monomer units are linked via alpha-1,6-glycosodic linkages. In one embodiment, the poly alpha-1,6-glucan has a degree of alpha-1,2-branching that is less than 50%.

In one embodiment, the at least one hydrophobic group comprises a $C_1$ to $C_{18}$ alkyl, a $C_2$ to $C_{18}$ alkene, a $C_2$ to $C_{18}$ alkyne, a polyether comprising repeat units of ($-CH_2CH_2O-$), ($-CH_2CH(CH_3)O-$), or a mixture thereof, wherein the total number of repeat units is in the range of from 3 to 100, a $C_6$ to $C_{20}$ aryl, a benzyl, a $C_1$-$C_{18}$ alkyl sulfonyl, a $C_8$-$C_{20}$ aryl sulfonyl, a p-toluenesulfonyl group, or a combination thereof. In another embodiment, the at least one hydrophobic group comprises a $C_1$ to $C_{18}$ alkyl, a benzyl, a p-toluenesulfonyl group, or a combination thereof. In yet another embodiment, the at least one hydrophobic group comprises a benzyl group, and the benzyl group is further substituted with one or more of a halogen, a cyano, an amide, an ester, an amide, an ether group, a $C_1$ to $C_6$ alkyl group, an aryl group, a $C_2$ to $C_6$ alkene group, a $C_2$ to $C_6$ alkyne group, or a combination thereof.

In one embodiment, the at least one hydrophilic group comprises a carboxylic acid, carboxylic acid salt, sulfonic acid derivative, sulfonic acid derivative salt, sulfuric acid derivative, sulfuric acid derivative salt, thiosulfate, thiosulfate salt, phosphoric acid derivative, phosphoric acid derivative salt, alkyl amine, alkyl substituted ammonium salt, quaternized pyridine salt, quaternized imidazole salt, or a combination thereof. In another embodiment, the at least one hydrophilic group comprises a carboxylic acid, an alkyl substituted ammonium salt, a sulfonate, an alkyl sulfonate, a sulfate, a thiosulfate, or a combination thereof.

In another embodiment, the at least one hydrophobic group comprises a $C_1$ to $C_{18}$ alkyl, a $C_2$ to $C_{18}$ alkene, a $C_2$ to $C_{18}$ alkyne, a polyether comprising repeat units of ($-CH_2CH_2O-$), ($-CH_2CH(CH_3)O-$), or mixtures thereof, wherein the total number of repeat units is in the range of from 3 to 100, a $C_6$ to $C_{20}$ aryl, a benzyl, a $C_1$-$C_{18}$ alkyl sulfonyl, a $C_6$-$C_{20}$ aryl sulfonyl group, a p-toluenesulfonyl group, or a combination thereof, and the at least one hydrophilic group comprises a carboxylic acid, carboxylic acid salt, a sulfonic acid derivative, a sulfonic acid derivative salt, a sulfuric acid derivative, a sulfuric acid derivative salt, thiosulfate, a thiosulfate salt, a phosphoric acid derivative, a phosphoric acid derivative salt, an alkyl amine, an alkyl substituted ammonium salt, a quaternized pyridine salt, a quaternized imidazole salt, or a combination thereof. In a further embodiment, the at least one hydrophobic group comprises a $C_1$ to $C_{18}$ alkyl, a benzyl, a p-toluenesulfonyl group, or a combination thereof, and the at least one hydrophilic group comprises a carboxylic acid, an alkyl substituted ammonium salt, a sulfonate, an alkyl sulfonate, a sulfate, a thiosulfate, or a combination thereof. In yet a further embodiment, the at least one hydrophobic group comprises a $C_1$ to $C_{18}$ alkyl, a benzyl, or a p-toluenesulfonyl group, and the at least one hydrophilic group comprises a thiosulfate or carboxymethyl group.

In one embodiment, the polysaccharide derivative has a degree of polymerization in the range of from about 5 to about 1400. In another embodiment, the polysaccharide derivative has a degree of substitution of about 0.001 to about 3.0. In a further embodiment, the polysaccharide derivative at 2 wt % has a surface tension of 65 mN/m or less as determined according to ASTM Standard D1331, 2015 method.

In another embodiment, the composition is in the form of a liquid, a gel, a powder, a hydrocolloid, an aqueous solution, a granule, a tablet, a capsule, a single compartment sachet, a multi-compartment sachet, a single compartment pouch, or a multi-compartment pouch.

In yet another embodiment, the composition further comprises at least one of a surfactant, an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil re-deposition agent, a dye, a bactericide, a tarnish inhibitor, an optical brightener, a perfume, a saturated or unsaturated fatty acid, a dye transfer inhibiting agent, a chelating agent, a hueing dye, a calcium cation, a magnesium cation, a visual signaling ingredient, an anti-foam, a structurant, a thickener, an anti-caking agent, a starch, sand, a gelling agent, or a combination thereof.

In one embodiment, the enzyme is a cellulase, a protease, an amylase, a lipase, or a combination thereof. In one embodiment, the enzyme is a cellulase. In another embodiment, the enzyme is a protease. In a further embodiment, the enzyme is an amylase. In yet another embodiment, the enzyme is a lipase.

Also disclosed herein is a method for treating a substrate, the method comprising the steps:

A) providing a composition comprising a polysaccharide derivative, wherein the polysaccharide derivative comprises a polysaccharide substituted with:
  a) at least one hydrophobic group; and
  b) at least one hydrophilic group;
wherein the polysaccharide is poly alpha-1,3-glucan, poly alpha-1,6-glucan, or poly alpha-1,3-1,6-glucan;
B) contacting the substrate with the composition; and
C) optionally rinsing the substrate;
wherein the substrate is carpet, upholstery, or a surface.

Also disclosed herein is a product, the product comprising:
from about 1% to about 60% by weight of a surfactant; and
from about 0.1% to about 10% by weight of a polysaccharide derivative,
wherein the polysaccharide derivative comprises a polysaccharide substituted with
  a) at least one hydrophobic group; and
  b) at least one hydrophilic group;
wherein the polysaccharide is poly alpha-1,3-glucan, poly alpha-1,6-glucan, or poly alpha-1,3-1,6-glucan; wherein said product is a household product.

In one embodiment, the product is in the form of a liquid, a gel, a powder, a hydrocolloid, an aqueous solution, a granule, a tablet, a capsule, a single compartment sachet, a multi-compartment sachet, a single compartment pouch, or a multi-compartment pouch.

In another embodiment, the product further comprises at least one of an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil re-deposition agent, a dye, a bactericide, a tarnish inhibitor, an optical brightener, a perfume, a saturated or unsaturated fatty acid, a dye transfer inhibiting agent, a chelating agent, a hueing dye, a calcium cation, a magnesium cation, a visual signaling ingredient, an anti-foam, a structurant, a thickener, an anti-caking agent, a starch, sand, a gelling agent, or a combination thereof.

In one embodiment of the product, the enzyme is a cellulase, a protease, an amylase, a lipase, or a combination thereof.

In another embodiment of the product, the polysaccharide derivative at 2 wt % has a surface tension of less than 65 mN/m.

Also disclosed herein is a water-soluble unit dose article comprising a water-soluble film and a composition comprising from about 1% to about 60% by weight of a surfactant; and from about 0.1% to about 10% by weight of a polysaccharide derivative, wherein the polysaccharide derivative comprises a polysaccharide substituted with
  a) at least one hydrophobic group; and
  b) at least one hydrophilic group;
wherein the polysaccharide is poly alpha-1,3-glucan, poly alpha-1,6-glucan, or poly alpha-1,3-1,6-glucan; wherein said water-soluble unit dose article is a household product.

In one embodiment, the water-soluble unit dose article comprises at least two compartments. In a further embodiment, the water-soluble unit dose article comprises at least two compartments where the compartments are arranged in a superposed orientation or in a side-by-side orientation. In a further embodiment, the water-soluble unit dose article comprises at least three compartments.

Also disclosed herein is a method of treating a substrate, where the method includes the step of contacting the substrate with the household product in the presence of water, wherein the substrate is a fabric or a hard surface. Additionally disclosed herein is a method of treating a fabric with the product, wherein the treated fabric has a change in WICIE of +1.5 or more units versus the fabric before treatment, as determined according to the L*a*b* WICIE method.

Further disclosed herein is a product comprising:
  from about 1% to about 60% by weight of a non-petroleum derived surfactant;
  from about 0.1% to about 10% by weight of a polysaccharide derivative,
  wherein the polysaccharide derivative comprises a polysaccharide substituted with
    a) at least one hydrophobic group; and
    b) at least one hydrophilic group;
  wherein the polysaccharide is poly alpha-1,3-glucan, poly alpha-1,6-glucan, or poly alpha-1,3-1,6-glucan;
  wherein said product is a household product.

In one embodiment, the product is substantially free of dye and brightener.

DETAILED DESCRIPTION

The disclosures of all cited patent and non-patent literature are incorporated herein by reference in their entirety.

As used herein, the term "embodiment" or "disclosure" is not meant to be limiting, but applies generally to any of the embodiments defined in the claims or described herein. These terms are used interchangeably herein.

In this disclosure, a number of terms and abbreviations are used. The following definitions apply unless specifically stated otherwise.

The articles "a", "an", and "the" preceding an element or component are intended to be nonrestrictive regarding the number of instances (i.e. occurrences) of the element or component. There "a", "an", and "the" should be read to include one or at least one, and the singular word form of the element or component also includes the plural unless the number is obviously meant to be singular.

The term "comprising" means the presence of the stated features, integers, steps, or components as referred to in the claims, but that it does not preclude the presence or addition of one or more other features, integers, steps, components, or groups thereof. The term "comprising" is intended to include embodiments encompassed by the terms "consisting essentially of" and "consisting of". Similarly, the term "consisting essentially of" is intended to include embodiments encompassed by the term "consisting of".

Where present, all ranges are inclusive and combinable. For example, when a range of "1 to 5" is recited, the recited range should be construed as including ranges "1 to 4", "1 to 3", 1-2", "1-2 and 4-5", "1-3 and 5", and the like.

As used herein in connection with a numerical value, the term "about" refers to a range of +/−0.5 of the numerical value, unless the term is otherwise specifically defined in context. For instance, the phrase a "pH value of about 6" refers to pH values of from 5.5 to 6.5, unless the pH value is specifically defined otherwise.

It is intended that every maximum numerical limitation given throughout this Specification includes every lower numerical limitation, as if such lower numerical limitations were expressly written herein. Every minimum numerical limitation given throughout this Specification will include every higher numerical limitation, as if such higher numerical limitations were expressly written herein. Every numerical range given throughout this Specification will include every narrower numerical range that falls within such broader numerical range, as if such narrower numerical ranges were all expressly written herein.

The features and advantages of the present disclosure will be more readily understood, by those of ordinary skill in the art from reading the following detailed description. It is to be appreciated that certain features of the disclosure, which are, for clarity, described above and below in the context of separate embodiments, may also be provided in combination in a single element. Conversely, various features of the disclosure that are, for brevity, described in the context of a single embodiment, may also be provided separately or in any sub-combination. In addition, references to the singular may also include the plural (for example, "a" and "an" may refer to one or more) unless the context specifically states otherwise.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

As used herein:

The terms "percent by weight", "weight percentage (wt %)" and "weight-weight percentage (% w/w)" are used interchangeably herein. Percent by weight refers to the percentage of a material on a mass basis as it is comprised in a composition, mixture or solution.

The phrase "water insoluble" means that less than 5 grams of the substance, for example, the alpha-(1,3-glucan) polymer, dissolves in 100 milliliters of water at 23° C. In other embodiments, water insoluble means that less than 4 grams or 3 grams or 2 grams or 1 grams of the substance is dissolved in water at 23° C.

The term "water soluble" means that the polysaccharide or polysaccharide derivative is soluble at 1% by weight or higher in pH 7 water at 25° C. The percentage by weight is based on the total weight of the polysaccharide soluble in water, for example, 1 gram of polysaccharide in 100 grams of water.

Water dispersible is defined as a compound having the ability, at 1% by weight or higher in pH 7 water at 25° C., to be distributed throughout a solution into finite particles or droplets. The percentage by weight is based on the total weight of the compound in water, for example, 1 gram of polysaccharide or polysaccharide derivative in 100 grams of water.

As used herein, "weight average molecular weight" or "$M_w$" is calculated as $M_w = \Sigma N_i M_i^2 / \Sigma N_i M_i$; where $M_i$ is the molecular weight of a chain and $N_i$ is the number of chains of that molecular weight. The weight average molecular weight can be determined by technics such as static light scattering, gas chromatography (GC), high pressure liquid chromatography (HPLC), gel permeation chromatography (GPC), small angle neutron scattering, X-ray scattering, and sedimentation velocity.

As used herein, "number average molecular weight" or "$M_n$" refers to the statistical average molecular weight of all the polymer chains in a sample. The number average molecular weight is calculated as $M_n = \Sigma N_i M_i / \Sigma N_i$ where $M_i$ is the molecular weight of a chain and $N_i$ is the number of chains of that molecular weight. The number average molecular weight of a polymer can be determined by technics such as gel permeation chromatography, viscometry via the (Mark-Houwink equation), and colligative methods such as vapor pressure osmometry, end-group determination or proton NMR.

The term "hydrophobic" refers to a molecule or substituent which is nonpolar and has little or no affinity for water, and which tends to repel water.

The term "hydrophilic" refers to a molecule or a substituent which is polar and has affinity to interact with polar solvents, in particular with water, or with other polar groups. A hydrophilic molecule or substituent tends to attract water.

The term "amphiphilic" means containing both hydrophobic and hydrophilic groups.

Glucose carbon positions 1, 2, 3, 4, 5 and 6 as referred to herein are as known in the art and depicted in Structure I:

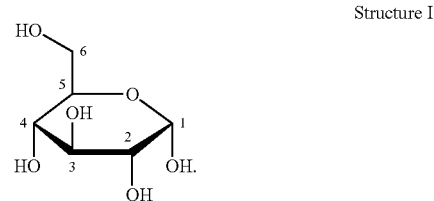

Structure I

The terms "glycosidic linkage" and "glycosidic bond" are used interchangeably herein and refer to the type of covalent bond that joins a carbohydrate (sugar) molecule to another group such as another carbohydrate. The term "alpha-1,6-glucosidic linkage" as used herein refers to the covalent bond that joins alpha-D-glucose molecules to each other through carbons 1 and 6 on adjacent alpha-D-glucose rings.

The term "alpha-1,3-glucosidic linkage" as used herein refers to the covalent bond that joins alpha-D-glucose molecules to each other through carbons 1 and 3 on adjacent alpha-D-glucose rings. The term "alpha-1,2-glucosidic linkage" as used herein refers to the covalent bond that joins alpha-D-glucose molecules to each other through carbons 1 and 2 on adjacent alpha-D-glucose rings. The term "alpha-1,4-glucosidic linkage" as used herein refers to the covalent bond that joins alpha-D-glucose molecules to each other through carbons 1 and 4 on adjacent alpha-D-glucose rings. Herein, "alpha-D-glucose" will be referred to as "glucose".

The glycosidic linkage profile of a glucan, dextran, substituted glucan, or substituted dextran can be determined using any method known in the art. For example, a linkage profile can be determined using methods that use nuclear magnetic resonance (NMR) spectroscopy (e.g., $^{13}$C NMR or $^{1}$H NMR). These and other methods that can be used are disclosed in *Food Carbohydrates: Chemistry, Physical Properties, and Applications* (S. W. Cui, Ed., Chapter 3, S. W. Cui, Structural Analysis of Polysaccharides, Taylor & Francis Group LLC, Boca Raton, Fla., 2005), which is incorporated herein by reference.

The term "poly glucan", as used herein, refers to poly alpha-1,3-glucan, poly alpha-1,6-glucan, and/or poly alpha-1,3-1,6-glucan. The plural "poly glucans" refers to all three polysaccharides.

The term "alkyl group", as used herein, refers to linear, branched, or cyclic ("cycloalkyl") hydrocarbon groups containing no unsaturation. As used herein, the term "alkyl group" encompasses substituted alkyls, for example alkyl groups substituted with at least one hydroxyalkyl group or dihydroxy alkyl group, as well as alkyl groups containing one or more heteroatoms such as oxygen, sulfur, and/or nitrogen within the hydrocarbon chain.

As used herein, the term "alkene" refers to linear, branched, or cyclic hydrocarbon groups containing at least one carbon-carbon double bond. As used herein, the term "alkene" encompasses substituted alkene groups, for example alkenes substituted with at least one alkyl group, hydroxyalkyl group, or dihydroxy alkyl group, as well as alkenes containing one or more heteroatoms such as oxygen, sulfur, and/or nitrogen within the hydrocarbon chain.

As used herein, the term "alkyne" refers to linear and branched hydrocarbon groups containing at least one carbon-carbon triple bond. As used herein, the term "alkyne" encompasses substituted alkyne groups, for example alkynes substituted with at least one alkyl group, hydroxyalkyl group, or dihydroxy group, as well as alkynes containing one or more heteroatoms such as oxygen, sulfur, and/or nitrogen within the hydrocarbon chain.

As used herein, the term "aryl" means an aromatic carbocyclic group having a single ring (e.g., phenyl), multiple rings (e.g., biphenyl), or multiple condensed rings in which at least one is aromatic, (e.g., 1,2,3,4-tetrahydronaphthyl, naphthyl, anthryl, or phenanthryl), which is optionally mono-, di-, or trisubstituted with alkyl groups. By aryl is also meant heteroaryl groups where heteroaryl is defined as 5-, 6-, or 7-membered aromatic ring systems having at least one hetero atom selected from the group consisting of nitrogen, oxygen and sulfur. Examples of heteroaryl groups include pyridyl, pyrimidinyl, pyrrolyl, pyrazolyl, pyrazinyl, pyridazinyl, oxazolyl, furanyl, quinolinyl, isoquinolinyl, thiazolyl, and thienyl, which can optionally be substituted with alkyl groups.

The term "molar substitution" (M.S.) as used herein refers to the moles of an organic group per monomeric unit of the polysaccharide or the derivative thereof. It is noted that the molar substitution value for a poly alpha-1,3-glucan derivative, for example, may have a very high upper limit, for example in the hundreds or even thousands. For example, if the organic group is a hydroxyl-containing alkyl group, via the addition of ethylene oxide to one of the hydroxyl groups of the poly alpha-1,3-glucan, then the so-formed hydroxyl group from the ethylene oxide can then be further etherified to form a polyether.

The present disclosure is directed to a composition comprising a polysaccharide derivative, wherein the polysaccharide derivative comprises a polysaccharide substituted with
 a) at least one hydrophobic group; and
 b) at least one hydrophilic group;
wherein the polysaccharide is poly alpha-1,3-glucan, poly alpha-1,6-glucan, or poly alpha-1,3-1,6-glucan.

The polysaccharide derivatives disclosed herein are referred to as amphiphilic polysaccharide derivatives, that is, polysaccharides containing both hydrophobic and hydrophilic groups. Amphiphilic polysaccharide derivatives are of interest due to their enhanced adsorption characteristics at interfaces, which can lead to a reduction in surface tensions. These characteristics are useful in a wide range of applications, including laundry, cleaning, food, cosmetics, industrial, film, and paper production. For laundry applications, amphiphilic polysaccharide derivatives may function as soil release agents wherein the hydrophobic groups adsorb to the hydrophobic substrate surface and the hydrophilic group repels soil. The amphiphilic polysaccharide derivatives may also be useful as surface coating of films and papers, to enable good adhesion to hydrophobic substrates and provide a hydrophilic surface. The amphiphilic polysaccharide derivatives can orient themselves at the interface of water and oil droplets when oil is dispersed in water. For an oil-in-water dispersion, the hydrophobic groups of the amphiphilic polysaccharide derivatives are dissolved in the oil phase while the hydrophilic groups are dissolved in the water phase. The amphiphilic polysaccharide derivative thereby forms a film around the oil droplet and stabilizes the emulsion. In this way, the amphiphilic polysaccharide derivatives, due to their surface activity, can be used as emulsion stabilizers and/or foaming agents in cleaning, food, and cosmetic applications. Typically, for use in such applications, the amphiphilic polysaccharide derivatives are water soluble or water dispersible.

In one embodiment, the polysaccharide derivative comprises a polysaccharide which has hydrophobic groups and hydrophilic groups randomly substituted along the polysaccharide backbone, such that the polysaccharide backbone comprises unsubstituted and substituted alpha-D-glucose rings. As used herein, the term "randomly substituted" means the substituents on the glucose rings in the randomly substituted polysaccharide occur in a non-repeating or random fashion. That is, the substitution on a substituted glucose ring may be the same or different [i.e. the substituents (which may be the same or different) on different atoms in the glucose rings in the polysaccharide] from the substitution on a second substituted glucose ring in the polysaccharide, such that the overall substitution on the polymer has no pattern. Further, the substituted glucose rings occur randomly within the polysaccharide (i.e., there is no pattern with the substituted and unsubstituted glucose rings within the polysaccharide).

In one embodiment, the polysaccharide derivative comprises a polysaccharide substituted with a) at least one hydrophobic group and b) at least one hydrophilic group, and the polysaccharide is poly alpha-1,3-glucan. In another embodiment, the polysaccharide derivative comprises a polysaccharide substituted with a) at least one hydrophobic group and b) at least one hydrophilic group, and the polysaccharide is poly alpha-1,6-glucan. In a further embodiment, the polysaccharide derivative comprises a polysaccharide substituted with a) at least one hydrophobic group and b) at least one hydrophilic group, and the polysaccharide is poly alpha-1,3-1,6-glucan. Mixtures of amphiphilic polysaccharide derivatives can also be used.

The substituted polysaccharide may also comprise mixtures of the polysaccharides disclosed herein above.

The polysaccharide derivative comprises poly alpha-1,3-glucan, poly alpha-1,6-glucan, or poly alpha-1,3-1,6-glucan substituted at one or more positions with a) at least one hydrophobic group and b) at least one hydrophilic group. Suitable hydrophobic groups include a $C_1$ to $C_{18}$ alkyl, a $C_2$ to $C_{18}$ alkene, a $C_2$ to $C_{18}$ alkyne, a polyether comprising repeat units of (—$CH_2CH_2O$—), (—$CH_2CH(CH_3)O$—), or mixtures thereof, wherein the total number of repeat units is in the range of from 3 to 100, a $C_6$ to $C_{20}$ aryl, a benzyl, a $C_1$-$C_{18}$ alkyl sulfonyl, a $C_6$-$C_{20}$ aryl sulfonyl group, a p-toluenesulfonyl group, and a combination thereof. Suitable hydrophilic groups include carboxylic acids, carboxylic acid salts, sulfonic acid derivatives, sulfonic acid derivative salts, sulfuric acid derivatives, sulfuric acid derivative salts, thiosulfate, thiosulfate salts, phosphoric acid derivatives, phosphoric acid derivative salts, alkyl amines, alkyl substituted ammonium salts, quaternized pyridine salts, quaternized imidazole salts, and a combination thereof.

The at least one hydrophobic group and the at least one hydrophilic group can each independently derivatize the polysaccharide at the 2, 3, 4, and/or 6 hydroxyl position of a glucose monomer, as appropriate for the specific polysaccharide. The hydrophobic and hydrophilic groups are independently linked to the polysaccharide through a chemical linkage such as alkylene, ester (COO—, —OOC), amide (—CONH—), carbamate (—NHCO—), ether (—O—), thioether (—S—), sulfonate (—OSO$_2$—), sulfate (—OSO$_2$O—), thiosulfate (—SS(O$_2$)O), carbonate (—OCOO—), urethane (—NHCOO—, —OOCNH), urea (—NHCONH—), amine (—NH—), phosphate (—OPO$_2$(OR), or phosphonate (—PO$_2$(OR)$^-$.

Structures II and III below show two generalized embodiments representing derivatization of a poly-1,3-glucan glucose repeat unit and a poly-1,6-glucan glucose repeat unit, respectively, to more clearly illustrate the positions at which the glucose unit could be derivatized and the chemical linkage (shown as Z) between the glucan polymer and the substituent group R shown in the structures. The number of hydrophobic groups (wherein R=R') and hydrophilic groups (wherein R=R") present in the derivatized polysaccharide is reflected in the degree of substitution of the derivatized polysaccharide; at unsubstituted positions the Z—R moiety would be a hydroxyl group.

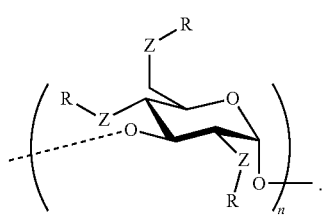

Structure II

Derivatization of a Glucose Unit within
Poly-1,3-Glucan

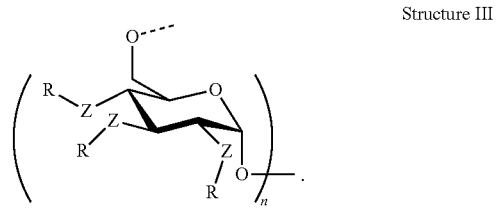

Structure III

Derivatization of a Glucose Unit within Poly
Alpha-1,6-Glucan

In the case where the hydrophobic group is a $C_1$ to $C_{18}$ alkyl, a $C_2$ to $C_{18}$ alkene, a $C_2$ to $C_{18}$ alkyne, a polyether comprising repeat units of (—$CH_2CH_2O$—), (—$CH_2CH(CH_3)O$—), or mixtures thereof, wherein the total number of repeat units is in the range of from 3 to 100, a $C_6$ to $C_{20}$ aryl, or a benzyl group (Aryl-CH$_2$—), the hydrophobic group is chemically bound to the glucan polymer through an ether linkage. When the hydrophobic group is a p-toluenesulfonyl group (CH$_3$—C$_6$H$_4$—SO$_2$—), the hydrophobic group is bound as illustrated in Structure IV below for a glucose unit within poly alpha-1,3-glucan, in which the p-toluenesulfonyl group is shown at the 6 position:

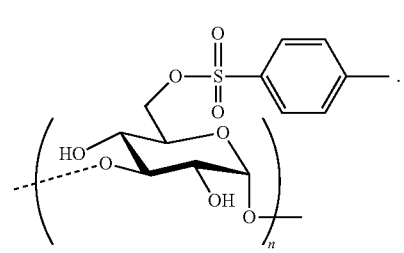

Structure IV

In the case where poly alpha-1,3-glucan is oxidized to contain a hydrophilic group comprising a carboxylic acid moiety (—COO—) at the 6 position of the glucose ring, the carboxylic acid group (or salt) binds to the glucan through a carbon-carbon bond, as shown generically below in Structure V:

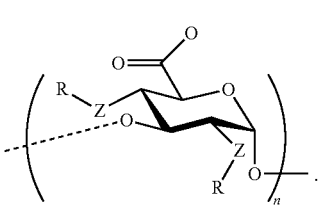

Structure V

Structure VI is a generalized embodiment representing derivatization of a poly-1,3-glucan glucose repeat unit with a hydrophobic benzyl group at the 2 position of the glucose ring and a hydrophilic alkyl sulfonate group (shown as an anion) at the 6 position:

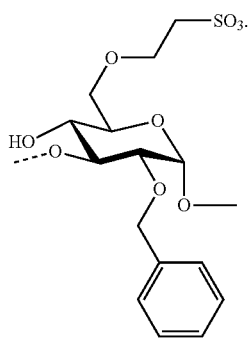

Structure VI

The polysaccharide derivative has a degree of substitution of about 0.001 to about 3.0. The term "degree of substitution" DoS as used herein refers to the average number of hydroxyl groups substituted in each monomeric unit (glucose) of the polysaccharide. Since there are at most three hydroxyl groups in a glucose monomeric unit in a glucan polymer, the overall degree of substitution can be no higher than 3. In other embodiments, the degree of substitution can be in the range of from 0.02 to 2.5, or from 0.02 to 2.0, or from 0.2 to 2, or from 0.2 to 1. Alternatively, the DoS can be about 0.001, 0.005, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, or any value between 0.001 and 3. It would be understood by those skilled in the art that since a polysaccharide derivative as disclosed herein has a degree of substitution between about 0.001 to about 3.0, the substituents on the polysaccharide cannot only be hydrogen. The degree of substitution of an amphiphilic polysaccharide derivative disclosed herein can be stated with reference to the at least one hydrophobic group, with reference to the at least one hydrophilic group, or with reference to the overall degree of substitution, that is, the sum of the DoS of the hydrophobic and hydrophilic groups. As used herein, when the degree of substitution is not stated with reference to the hydrophobic or hydrophilic group, the overall degree of substitution is meant. As the polysaccharide derivative comprises a polysaccharide substituted with at least one hydrophobic group and at least one hydrophilic group, the DoS with reference to the hydrophobic group alone, or with reference to the hydrophilic group alone, is necessarily less than 3.

In one embodiment, the DoS of the polysaccharide derivative with respect to the hydrophobic group(s) can be in the range of from about 0.02 to about 1.5, or for example from about 0.1 to about 1, and the DoS of the polysaccharide derivative with respect to the hydrophilic group(s) can be in the range of from about 0.1 to about 2.5, or for example from about 0.2 to about 1.5, with the proviso that the overall DoS of the polysaccharide derivative is not greater than 3.

The polysaccharide derivative has a degree of polymerization in the range of from about 5 to about 1400, for example in the range of from about 5 to about 100, or from about 5 to about 500, or from about 5 to about 1000, or from about 5 to about 1100, or from about 5 to about 1200, or from about 5 to about 1300, or from about 5 to about 1400.

The structure, molecular weight, and degree of substitution of a polysaccharide derivative can be confirmed using various physiochemical analyses known in the art such as NMR spectroscopy and size exclusion chromatography (SEC).

The "molecular weight" of a polysaccharide or polysaccharide derivative can be represented as number-average molecular weight ($M_n$) or as weight-average molecular weight ($M_w$). Alternatively, molecular weight can be represented as Daltons, grams/mole, DPw (weight average degree of polymerization), or DPn (number average degree of polymerization). Various means are known in the art for calculating these molecular weight measurements, such as high-pressure liquid chromatography (HPLC), size exclusion chromatography (SEC), or gel permeation chromatography (GPC).

The terms "poly alpha-1,3-glucan", "alpha-1,3-glucan polymer" and "glucan polymer" are used interchangeably herein. Poly alpha-1,3-glucan means a polymer comprising glucose monomeric units linked together by glycosidic linkages, wherein at least about 50% of the glycosidic linkages are alpha-1,3-glycosidic linkages. Poly alpha-1,3-glucan is a type of polysaccharide. The alpha-1,3-glycosodic linkage of the poly alpha-1,3-glucan can be illustrated by Structure VII as follows:

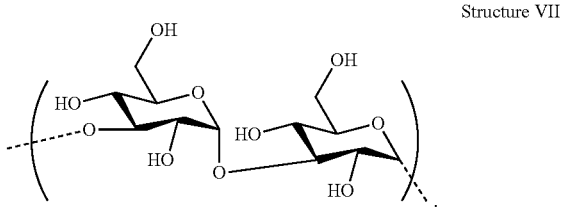

Structure VII

The poly alpha-1,3-glucan can be prepared using chemical methods. Alternatively, it can be prepared by extracting it from various organisms, such as fungi, that produce poly alpha-1,3-glucan. Alternatively, poly alpha-1,3-glucan can be enzymatically produced from sucrose using one or more glucosyltransferase (gtf) enzymes (e.g., gtfJ), such as described in U.S. Pat. Nos. 7,000,000; 8,642,757; and 9,080,195 (the entirety of which are incorporated herein by reference), for example. Using the procedures given therein, the polymer is made directly in a one-step enzymatic reaction using a recombinant glucosyltransferase enzyme, for example the gtfJ enzyme, as the catalyst and sucrose as the substrate. The poly alpha-1,3-glucan is produced with fructose as the by-product. As the reaction progresses, the poly alpha-1,3-glucan precipitates from solution. Produced using the gtfJ enzyme, the poly alpha-1,3-glucan can have a number average degree of polymerization (DPn) in the range of 4 to 500. In other embodiments, the DPn can be in the range of from 30 to 500 or from 40 to 500 or from 50 to 400. In some embodiments, the poly alpha-1,3-glucan has a DPw of from about 10 to about 400, 10 to about 300, 10 to about 200, 10 to about 100, 10 to about 50, 400 to about 1400, or from about 400 to about 1000, or from about 500 to about 900.

In some embodiments, the percentage of glycosidic linkages between the glucose monomer units of the poly alpha-1,3-glucan that are alpha-1,3 is greater than or equal to 50%, 60%, 70%, 80%, 90%, 95%, 96%, 97%, 98%, 99%, or 100% (or any integer value between 50% and 100%). In such embodiments, accordingly, poly alpha-1,3-glucan has less than or equal to 50%, 40%, 30%, 20%, 10%, 5%, 4%, 3%, 2%, 1%, or 0% (or any integer value between 0% and 50%) of glycosidic linkages that are not alpha-1,3. The poly alpha-1,3-glucan may have relatively low percentages of glucose monomers that are linked at the 1,2-, 1,4- and/or 1,6-positions. In some embodiments, the poly alpha-1,3-glucan comprises greater than or equal to 93 to 97% alpha-1,3-glycosidic linkages and less than 3% alpha-1,6-glycosidic linkages. In other embodiments, the poly alpha-1,3-glucan comprises greater than or equal to 95% alpha-1,3-glycosidic linkages and about 1% alpha-1,6-glycosidic linkages. In a further embodiment, the poly alpha-1,3-glucan comprises less than or equal to 1 to 3% alpha-1,3,6-glycosidic linkages.

Insoluble poly alpha-1,3-glucan in some embodiments can be in the form of a copolymer (e.g., graft copolymer) having (i) a backbone comprising dextran (e.g., with at least about 95%, 96%, 97%, 98%, 99%, or 100% alpha-1,6 linkages) with a molecular weight of at least about 100000 Daltons, and (ii) alpha-1,3-glucan side chains comprising at least about 95%, 96%, 97%, 98%, 99%, or 100% alpha-1,3-glucosidic linkages. Such copolymers can be as disclosed in International Pat. Appl. Publ. No. WO2017/079595, which is incorporated herein by reference.

The terms "poly alpha-1,6-glucan" and "dextran" are used interchangeably herein. Dextrans represent a family of complex, branched alpha-glucans generally comprising chains of alpha-1,6-linked glucose monomers, with periodic side chains (branches) linked to the straight chains by alpha-1,3-linkage (loan et al., *Macromolecules* 33:5730-5739). Production of dextrans is typically done through fermentation of sucrose with bacteria (e.g., *Leuconostoc* or *Streptococcus* species), where sucrose serves as the source of glucose for dextran polymerization (Naessens et al., *J. Chem. Technol. Biotechnol.* 80:845-860; Sarwat et al., *Int. J. Biol. Sci.* 4:379-386; Onilude et al., *Int. Food Res. J.* 20:1645-1651). Poly alpha-1,6-glucan can be prepared using glucosyltransferases such as (but not limited to) GTF1729, GTF1428, GTF5604, GTF6831, GTF8845, GTF0088, and GTF8117 as described in WO2015/183714 and WO2017/091533, both of which are incorporated herein by reference.

The poly alpha-1,6-glucan can have a number average degree of polymerization (DPn) in the range of 4 to 1400. In other embodiments, the DPn can be in the range of from 4 to 100, or from 4 to 500 or from 40 to 500 or from 50 to 400. In some embodiments, the poly alpha-1,6-glucan has a DPw of from about 10 to about 400, 10 to about 300, 10 to about 200, 10 to about 100, 10 to about 50, 400 to about 1400, or from about 400 to about 1000, or from about 500 to about 900.

In some embodiments, the poly alpha-1,6-glucan comprises a backbone of glucose monomer units wherein greater than or equal to 40% of the glucose monomer units are linked via alpha-1,6-glycosodic linkages, for example greater than or equal to 40%, 45%, 50%, 55%, 60%, 65%, 70%, 75%, 80% or 90% of the glucose monomer units.

Dextran "long chains" herein can comprise "substantially [or mostly] alpha-1,6-glucosidic linkages", meaning that they can have at least about 98.0% alpha-1,6-glucosidic linkages in some aspects. Dextran herein can comprise a "branching structure" (branched structure) in some aspects. It is contemplated that in this structure, long chains branch from other long chains, likely in an iterative manner (e.g., a long chain can be a branch from another long chain, which in turn can itself be a branch from another long chain, and so on). It is contemplated that long chains in this structure can be "similar in length", meaning that the length (DP [degree of polymerization]) of at least 70% of all the long chains in a branching structure is within plus/minus 30% of the mean length of all the long chains of the branching structure.

Dextran in some embodiments can also comprise "short chains" branching from the long chains, typically being one to three glucose monomers in length, and typically comprising less than about 10% of all the glucose monomers of a dextran polymer. Such short chains typically comprise alpha-1,2-, alpha-1,3-, and/or alpha-1,4-glucosidic linkages (it is understood that there can also be a small percentage of such non-alpha-1,6 linkages in long chains in some aspects). In certain embodiments, the poly-1,6-glucan with branching is produced enzymatically according to the procedures in WO2015/183714 and WO2017/091533 where, for example, alpha-1,2-branching enzymes such as "gtfJ18T1" or "GTF9905" can be added during or after the production of the dextran polymer (polysaccharide). In other embodiments, any other enzyme known to produce alpha-1,2-branching can be added. The degree of branching of poly-alpha-1,6 glucan in such embodiments has less than or equal to 50%, 40%, 30%, 20%, 10%, 5%, 4%, 3%, 2%, 1%, or 0% (or any integer value between 0% and 50%) of short branching, for example alpha-1,2-branching. In one embodiment, the poly alpha-1,6-glucan has a degree of alpha-1,2-branching that is less than 50%. In one embodiment, the poly alpha-1,6-glucan is predominantly linear.

In one embodiment, the polysaccharide is poly alpha-1,3-1,6-glucan. Poly alpha-1,3-1,6-glucan is a product of a glucosyltransferase enzyme, as disclosed in United States Patent Application Publication 2015/0232785 A1. In some embodiments, an insoluble alpha-glucan can comprise at least about 30% alpha-1,3 linkages and a percentage of alpha-1,6 linkages that brings the total of both the alpha-1,3 and -1,6 linkages in the alpha-glucan to 100%. For example, the percentage of alpha-1,3 and -1,6 linkages can be about 30-40% and 60-70%, respectively. In some aspects, an insoluble alpha-glucan comprising at least about 30% alpha-1,3 linkages is linear. Glucosyltransferases for producing insoluble alpha-glucan comprising at least about 30% alpha-1,3 linkages are disclosed in U.S. Pat. Appl. Publ. No. 2015/0232819, which is incorporated herein by reference.

In one embodiment, the polysaccharide comprises poly alpha-1,3-1,6-glucan wherein (i) at least 30% of the glycosidic linkages of the poly alpha-1,3-1,6-glucan are alpha-1,3 linkages, (ii) at least 30% of the glycosidic linkages of the poly alpha-1,3-1,6-glucan are alpha-1,6 linkages, (iii) the poly alpha-1,3-1,6-glucan has a weight average degree of polymerization ($DP_w$) of at least 10; and (iv) the alpha-1,3 linkages and alpha-1,6 linkages of the poly alpha-1,3-1,6-glucan do not consecutively alternate with each other. In another embodiment, at least 60% of the glycosidic linkages of the poly alpha-1,3-1,6-glucan are alpha-1,6 linkages.

At least 30% of the glycosidic linkages of poly alpha-1,3-1,6-glucan are alpha-1,3 linkages, and at least 30% of the glycosidic linkages of the poly alpha-1,3-1,6-glucan are alpha-1,6 linkages. Alternatively, the percentage of alpha-1,3 linkages in poly alpha-1,3-1,6-glucan herein can be at least 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, or 64%. Alternatively still, the percentage of alpha-1,6 linkages in poly alpha-1,3-1,6-glucan herein can be at least 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, or 69%.

A poly alpha-1,3-1,6-glucan can have any one the aforementioned percentages of alpha-1,3 linkages and any one of the aforementioned percentages of alpha-1,6 linkages, just so long that the total of the percentages is not greater than 100%. For example, poly alpha-1,3-1,6-glucan herein can have (i) any one of 30%, 31%, 32%, 33%, 34%, 35%, 36%, 37%, 38%, 39%, or 40% (30%-40%) alpha-1,3 linkages and (ii) any one of 60%, 61%, 62%, 63%, 64%, 65%, 66%, 67%, 68%, or 69% (60%-69%) alpha-1,6 linkages, just so long that the total of the percentages is not greater than 100%. Non-limiting examples include poly alpha-1,3-1,6-glucan with 31% alpha-1,3 linkages and 67% alpha-1,6 linkages. In certain embodiments, at least 60% of the glycosidic linkages of the poly alpha-1,3-1,6-glucan are alpha-1,6 linkages.

A poly alpha-1,3-1,6-glucan can have, for example, less than 10%, 9%, 8%, 7%, 6%, 5%, 4%, 3%, 2%, or 1% of glycosidic linkages other than alpha-1,3 and alpha-1,6. In another embodiment, a poly alpha-1,3-1,6-glucan only has alpha-1,3 and alpha-1,6 linkages.

The backbone of a poly alpha-1,3-1,6-glucan disclosed herein can be linear/unbranched. Alternatively, there can be branches in the poly alpha-1,3-1,6-glucan. A poly alpha-1,3-1,6-glucan in certain embodiments can thus have no branch points or less than about 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, or 1% branch points as a percent of the glycosidic linkages in the polymer.

The alpha-1,3 linkages and alpha-1,6 linkages of a poly alpha-1,3-1,6-glucan do not consecutively alternate with each other. For the following discussion, consider that ... G-1,3-G-1,6-G-1,3-G-1,6-G-1,3-G- ... (where G represents glucose) represents a stretch of six glucose monomeric units linked by consecutively alternating alpha-1,3 linkages and alpha-1,6 linkages. Poly alpha-1,3-1,6-glucan in certain embodiments herein comprises less than 2, 3, 4, 5, 6, 7, 8, 9, 10, or more glucose monomeric units that are linked consecutively with alternating alpha-1,3 and alpha-1,6 linkages.

The molecular weight of a poly alpha-1,3-1,6-glucan can be measured as $DP_w$ (weight average degree of polymerization) or $DP_n$ (number average degree of polymerization). Alternatively, molecular weight can be measured in Daltons or grams/mole. It may also be useful to refer to the number-average molecular weight ($M_n$) or weight-average molecular weight ($M_w$) of the poly alpha-1,3-1,6-glucan.

A poly alpha-1,3-1,6-glucan herein can have an $M_w$ of at least about 1600, 3000, 4000, 5000, 8000, 10000, 15000, 20000, 25000, 30000, 35000, 40000, 50000, 100000, 200000, 300000, 400000, 500000, 600000, 700000, 800000, 900000, 1000000, 1100000, 1200000, 1300000, 1400000, 1500000, or 1600000 (or any integer between 50000 and 1600000), for example. The $M_w$ in certain embodiments is at least about 1000000. Alternatively, poly alpha-1,3-1,6-glucan can have an $M_n$ of at least about 1600, 3000, 4000, 5000, 10000, 20000, 30000, or 40000, for example.

A poly alpha-1,3-1,6-glucan herein can comprise at least 10 glucose monomeric units, for example. Alternatively, the number of glucose monomeric units can be at least 10, 25, 50, 100, 500, 1000, 2000, 3000, 4000, 5000, 6000, 7000, 8000, or 9000 (or any integer between 10 and 9000), for example.

The polysaccharide derivative comprises poly alpha-1,3-glucan, poly alpha-1,6-glucan, or poly alpha-1,3-1,6-glucan substituted at one or more positions with a) at least one hydrophobic group and b) at least one hydrophilic group. Suitable hydrophobic groups include linear or branched $C_1$ to $C_{18}$ alkyl, linear or branched $C_2$ to $C_{18}$ alkene, linear or branched $C_2$ to $C_{18}$ alkyne, polyethers comprising repeat units of (—CH$_2$CH$_2$O—), (—CH$_2$CH(CH$_3$)O—), or a mixture thereof, wherein the total number of repeat units is in the range of from 3 to 100, $C_6$ to $C_{20}$ aryl, benzyl, $C_1$-$C_{18}$ alkyl sulfonyl, $C_6$-$C_{20}$ aryl sulfonyl or p-toluenesulfonyl groups.

The term "alkyl group", as used herein, refers to linear, branched, or cyclic ("cycloalkyl") hydrocarbon groups containing no unsaturation. The alkyl group can be substituted, for example with another alkyl group or with at least one hydroxyalkyl group or dihydroxy alkyl group. In one embodiment, the hydrophobic group is a $C_1$ to $C_{15}$ alkyl group, and the alkyl group may be, for example, a methyl, ethyl, propyl, butyl, pentyl, hexyl, heptyl, octyl, nonyl, decyl, undecyl, dodecyl, tridecanyl, tetradecanyl, pentadecanyl, hexadecanyl, heptadecanyl, or octadecanyl group. In another embodiment, the alkyl group is a $C_4$ to $C_{18}$ alkyl group. One or more carbons of an alkyl group can be substituted with another alkyl group, making the alkyl group branched. Examples of branched chain isomers of linear alkyl groups include isopropyl, iso-butyl, tert-butyl, sec-butyl, isopentyl, neopentyl, isohexyl, neohexyl, 2-ethylhexyl, and isooctyl. One or more carbons of an alkyl group can be substituted with at least one hydroxyalkyl group. Suitable hydroxyalkyl groups are hydroxymethyl (—CH$_2$OH), hydroxyethyl (e.g., —CH$_2$CH$_2$OH, —CH(OH)CH$_3$), hydroxypropyl (e.g., —CH$_2$CH$_2$CH$_2$OH, —CH$_2$CH(OH)CH$_3$, —CH(OH)CH$_2$CH$_3$), hydroxybutyl, and hydroxypentyl groups. Other examples include dihydroxy alkyl groups (diols) such as dihydroxymethyl, dihydroxyethyl, dihydroxypropyl, dihydroxybutyl and dihydroxypentyl. In another embodiment, the alkyl group is a cycloalkyl group, and the cycloalkyl group may be, for example, a cyclopentyl, cyclohexyl, cycloheptyl, cyclooctyl, cyclononyl, or cyclodecyl group. In one embodiment, the cycloalkyl group is a $C_5$ to $C_{10}$ cycloalkyl group.

A substitution on an alkyl group in certain embodiments may be bonded to the terminal carbon atom of the alkyl group, where the terminal carbon group is opposite the carbon atom that is ether linked to the oxygen of the glucan polymer. An example of this terminal substitution is in the hydroxypropyl group —CH$_2$CH$_2$CH$_2$OH. Alternatively, a substitution may be on an internal carbon atom of an alkyl group. An example on an internal substitution is in the hydroxypropyl group —CH$_2$CH(OH)CH$_3$.

Optionally, an alkyl group can contain one or more heteroatoms such as oxygen, sulfur, and/or nitrogen within the hydrocarbon chain. Examples include alkyl groups containing an alkyl glycerol alkoxylate moiety (-alkylene-OCH$_2$CH(OH)CH$_2$OH) or a moiety derived from ring-opening of 2-ethylhexl glycidyl ether.

In another embodiment, the hydrophobic group is a $C_2$ to $C_{18}$ alkene group, and the alkene group may be linear, branched, or cyclic. As used herein, the term "alkene group" refers to hydrocarbon groups containing at least one carbon-carbon double bond. Examples of alkene groups include ethenyl, propenyl, butenyl, pentenyl, hexenyl, cyclohexyl, and allyl groups. In other embodiments, one or more carbons of the alkene group can have a substitution(s) with an alkyl group, or with a hydroxyalkyl or dihydroxy alkyl group. Examples of such substituent alkyl groups include methyl, ethyl, and propyl groups. To illustrate, an R group can be —CH(CH$_3$)CH$_2$CH$_3$ or —CH$_2$CH(CH$_3$)CH$_3$, which are both propyl groups having a methyl substitution. In one embodiment, the alkene group is a $C_4$ to $C_{18}$ alkene group.

Optionally, an alkene group can contain one or more heteroatoms such as oxygen, sulfur, and/or nitrogen within the hydrocarbon chain, for example an alkene group can contain a moiety derived from ring-opening of an allyl glycidyl ether.

In another embodiment, the hydrophobic group is a $C_2$ to $C_{18}$ alkyne group, and the alkyne group may be, for example, propyne, butyne, pentyne, or hexyne. The alkyne group may be linear or branched, and can be substituted, for example with alkyl, hydroxyalkyl, or dihydroxy alkyl groups. Optionally, an alkyne group can contain one or more heteroatoms such as oxygen, sulfur, and/or nitrogen within the hydrocarbon chain.

In another embodiment, the hydrophobic group is a polyether comprising repeat units of (—$CH_2CH_2O$—), (—$CH_2CH(CH_3)O$—), or a mixture thereof, wherein the total number of repeat units is in the range of from 3 to 100. In one embodiment, the hydrophobic group is a polyether group comprising (—$CH_2CH_2O$—)$_{4-100}$. In another embodiment, the hydrophobic group is a polyether group comprising (—$CH_2CH(CH_3)O$—)$_{4-100}$. As used herein, the subscript designating a range of values will be used to designate the potential number of repeat units, for example, $(CH_2CH_2O)_{4-100}$ means a polyether group containing in the range of from 3 to 100 repeat units.

In yet another embodiment, the hydrophobic group is an aryl group, and the aryl group may be, for example, phenyl or biphenyl, optionally substituted with an alkyl group, such as a methyl, ethyl, or propyl group. In one embodiment, the aryl group is a $C_6$ to $C_{20}$ aryl group. In another embodiment, the aryl group is a methyl substituted aryl group.

In still another embodiment, the hydrophobic group is a benzyl group. The benzyl group can optionally be further substituted with one or more of a halogen, a cyano, an ester, an amide, an ether group, a $C_1$ to $C_6$ alkyl group, an aryl group, a $C_2$ to $C_6$ alkene group, a $C_2$ to $C_6$ alkyne group, or a combination thereof.

In a further embodiment, the hydrophobic group is a $C_1$-$C_{18}$ alkyl sulfonyl or a $C_6$-$C_{20}$ aryl sulfonyl group, optionally substituted with alkyl groups. An example of an alkyl sulfonyl is methanesulfonyl group. An example of a $C_6$-$C_{20}$ aryl sulfonyl group is a p-toluenesulfonyl group, which can be represented as $CH_3$-aryl-$SO_2$—. As a substituent on a derivatized polysaccharide, the alkyl sulfonyl or aryl sulfonyl moiety binds to the polysaccharide through a sulfur-oxygen bond. The $C_1$-$C_{18}$ alkyl sulfonyl, $C_6$-$C_{20}$ aryl sulfonyl, and p-toluenesulfonyl groups are not ionizable.

The polysaccharide derivative comprises poly alpha-1,3-glucan, poly alpha-1,6-glucan, or poly alpha-1,3-1,6-glucan which is also substituted with at least one hydrophilic group. Suitable hydrophilic groups include carboxylic acids, carboxylic acid salts, sulfonic acid derivatives, sulfonic acid derivative salts, sulfuric acid derivatives, sulfuric acid derivative salts, thiosulfate, thiosulfate salts, phosphoric acid derivatives, phosphoric acid derivative salts, alkyl amines, alkyl substituted ammonium salts, quaternized pyridine salts, and quaternized imidazole salts. These hydrophilic groups are ionizable. The hydrophilic groups may exist in a neutral or ionic form as a solid or in a formulation or aqueous solution, depending on the pH at which they are isolated or used.

In one embodiment, the hydrophilic group is a carboxylic acid group. Examples of suitable carboxylic groups are carboxy (—$CO_2H$), carboxymethyl (—$CH_2COOH$), carboxyethyl (e.g., —$CH_2CH_2COOH$, —$CH(COOH)CH_3$), carboxypropyl (e.g., —$CH_2CH_2CH_2COOH$, —$CH_2CH(COOH)CH_3$, —$CH(COOH)CH_2CH_3$), carboxybutyl, and carboxypentyl groups. In one embodiment, the hydrophilic group is carboxymethyl. In another embodiment, the hydrophilic group is carboxyethyl. In yet another embodiment, the hydrophilic group is carboxypropyl. The carboxylic acid moiety can reside at any substitution site on an alkyl chain.

In another embodiment, the hydrophilic group is a carboxylic acid salt, and the salt can comprise a carboxylate anion of the carboxylic groups disclosed herein above and an inorganic cation, for example, any one of Li, Na, K, Rb, Cs, Mg, Ca, or Ba; an organic cation, for example, an ammonium ion, ammonium ($NH_4^+$), tetraalkyl ammonium cations, or a combination thereof.

In another embodiment, the hydrophilic group is a sulfuric acid derivative, a sulfonic acid derivative, or a thiosulfate (—$SS(O_2)OH$). As used herein, "sulfuric acid derivative" encompasses sulfate (—$OS(O_2)OH$) and alkyl sulfates (-alkylene-$OS(O_2)OH$), where the alkyl group can be a $C_1$ to $C_4$ group. As used herein, "sulfonic acid derivative" encompasses sulfonate (—$S(O_2)OH$) and alkyl sulfonates (-alkylene-$S(O_2)OH$), where the alkyl group can be a $C_1$ to $C_4$ group. Examples of alkyl sulfonates include ethyl sulfonate, propyl sulfonate, and butyl sulfonate.

In a further embodiment, the hydrophilic group is a salt of a sulfonic acid derivative or a salt of a sulfuric acid derivative, for example a sulfate salt, an alkyl sulfate salt, a sulfonate salt, an alkyl sulfonate salt, or a thiosulfate salt. The salt can comprise an anion of the sulfate, alkyl sulfonate, and thiosulfate groups disclosed herein above and an inorganic cation, for example any one of Li, Na, K, Rb, Cs, Mg, Ca, or Ba; an organic cation, for example, an ammonium ion, ammonium ($NH_4^+$), tetraalkyl ammonium cations, or a combination thereof.

In one embodiment, the hydrophilic group is a sulfate or a sulfate salt. In another embodiment, the hydrophilic group is an alkyl sulfonate or an alkyl sulfonate salt. In yet another embodiment, the hydrophilic group is a thiosulfate or a thiosulfate salt.

In another embodiment, the hydrophilic group is a phosphoric acid derivative, for example phosphate (—$OPO_2$(OR') where R' is H, alkyl, or aryl), or phosphonate (—$PO_2$(OR')$^-$ where R' is H, alkyl, or aryl). In yet another embodiment, the hydrophilic group is a salt of a phosphoric acid derivative, for example a phosphate salt wherein the anion is —$OPO_3^{2-}$, or a phosphonate salt wherein the anion is —$PO_3^{2-}$, and the salt further comprises an inorganic cation, for example any one of Li, Na, K, Rb, Cs, Mg, Ca, or Ba; an organic cation, for example, an ammonium ion, ammonium ($NH_4^+$), tetraalkyl ammonium cations, or a combination thereof.

In one embodiment, the hydrophilic group is a phosphate. In another embodiment, the hydrophilic group is a phosphate salt. In a further embodiment, the hydrophilic group is a phosphonate. In yet another embodiment, the hydrophilic group is a phosphonate salt.

In one embodiment, the hydrophilic group is an alkyl amine group. Alkyl amine groups can be represented by —$NR_1R_2$ where $R_1$ and $R_2$ are independently hydrogen and $C_1$ to $C_{12}$ alkyl. Examples of alkyl amines include diethyl amine, ethyl amine, dimethyl amine, methyl amine, ethylenediamine, propyl amine, dipropyl amine, butyl amine, dibutyl amine. In one embodiment, the alkyl amine group is an ethylenediamine derivative.

In another embodiment, the hydrophilic group is an alkyl substituted ammonium salt. Alkyl substituted ammonium salts may be represented by the following structure:

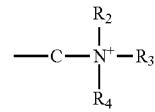

in which $R_2$, $R_3$ and $R_4$ each independently represent a hydrogen atom or an alkyl, aryl, cycloalkyl, aralkyl, or alkaryl group. The carbon atom (C) in the structure is part of the chain of one or more carbons ("carbon chain") of the positively charged organic group. The carbon atom is either directly ether-linked to a glucose monomer of poly alpha-1,3-glucan, poly alpha-1,6-glucan, or poly alpha-1,3-1,6-glucan, or is part of a chain of two or more carbon atoms ether-linked to a glucose monomer of poly alpha-1,3-glucan, poly alpha-1,3-glucan, or poly alpha-1,3-1,6-glucan. The carbon atom in the structure can be —$CH_2$—, —CH— (where a H is substituted with another group such as a hydroxy group), or —C— (where both H's are substituted).

A substituted ammonium group can be a "primary ammonium group", "secondary ammonium group", "tertiary ammonium group", or "quaternary ammonium" group, depending on the composition of $R_2$, $R_3$ and $R_4$ in the structure above. A primary ammonium group herein refers to the structure above in which each of $R_2$, $R_3$ and $R_4$ is a hydrogen atom (i.e., —C—$NH_3^+$). A secondary ammonium group herein refers to the structure above in which each of $R_2$ and $R_3$ is a hydrogen atom and $R_4$ is an alkyl, aryl, or cycloalkyl group. A tertiary ammonium group herein refers to the structure above in which $R_2$ is a hydrogen atom and each of $R_3$ and $R_4$ is an alkyl, aryl, or cycloalkyl group. A quaternary ammonium group herein refers to the structure above in which each of $R_2$, $R_3$ and $R_4$ is an alkyl, aryl, or cycloalkyl group (i.e., none of $R_2$, $R_3$ and $R_4$ is a hydrogen atom).

A quaternary ammonium poly alpha-1,3-glucan, poly alpha-1,6-glucan, or poly alpha-1,3-1,6-glucan ether herein can comprise a trialkyl ammonium group (where each of $R_2$, $R_3$ and $R_4$ is an alkyl group), for example. A trimethylammonium group is an example of a trialkyl ammonium group, where each of $R_2$, $R_3$ and $R_4$ is a methyl group. It would be understood that a fourth member (i.e., $R_1$) implied by "quaternary" in this nomenclature is the chain of one or more carbons of the positively charged organic group that is ether-linked to a glucose monomer of a poly glucan.

An example of a quaternary ammonium poly alpha-1,3-glucan ether compound is trimethylammonium hydroxypropyl poly alpha-1,3-glucan. The positively charged organic group of this ether compound can be represented by the following structure:

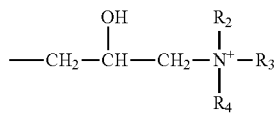

where each of $R_2$, $R_3$ and $R_4$ is a methyl group. The structure above is an example of a quaternary ammonium hydroxypropyl group.

A "hydroxy alkyl" group herein refers to a substituted alkyl group in which one or more hydrogen atoms of the alkyl group are substituted with a hydroxyl group.

In one embodiment, the hydrophilic group is a quaternized pyridine salt. In another embodiment, the hydrophilic group is a quaternized imidazole salt.

In one embodiment, the polysaccharide derivative comprises a polysaccharide substituted with at least one hydrophobic group and at least one hydrophilic group, wherein the at least one hydrophobic group comprises a $C_1$ to $C_{18}$ alkyl, a $C_2$ to $C_{18}$ alkene, a $C_2$ to $C_{18}$ alkyne, a polyether comprising repeat units of (—$CH_2CH_2O$—), (—$CH_2CH(CH_3)O$—), or mixtures thereof, wherein the total number of repeat units is in the range of from 3 to 100, a $C_6$ to $C_{20}$ aryl, a benzyl, a $C_1$-$C_{18}$ alkyl sulfonyl, a $C_6$-$C_{20}$ aryl sulfonyl, a p-toluene-sulfonyl group, or a combination thereof, and the at least one hydrophilic group comprises a carboxylic acid, carboxylic acid salt, a sulfonic acid derivative, a sulfonic acid derivative salt, a sulfuric acid derivative, a sulfuric acid derivative salt, thiosulfate, a thiosulfate salt, a phosphoric acid derivative, a phosphoric acid derivative salt, an alkyl amine, an alkyl substituted ammonium salt, a quaternized pyridine salt, a quaternized imidazole salt, or a combination thereof.

In one embodiment, the polysaccharide derivative comprises a polysaccharide substituted with at least one hydrophobic group and at least one hydrophilic group, wherein the at least one hydrophobic group comprises a $C_1$ to $C_{18}$ alkyl group, and the at least one hydrophilic group comprises a carboxylic acid, carboxylic acid salt, a sulfonic acid derivative, a sulfonic acid derivative salt, a sulfuric acid derivative, a sulfuric acid derivative salt, thiosulfate, a thiosulfate salt, a phosphoric acid derivative, a phosphoric acid derivative salt, an alkyl amine, an alkyl substituted ammonium salt, a quaternized pyridine salt, a quaternized imidazole salt, or a combination thereof. In another embodiment, the at least one hydrophobic group comprises a $C_1$ to $C_{18}$ alkyl group, and the at least one hydrophilic group comprises a carboxylic acid, an alkyl substituted ammonium salt, a sulfonate, an alkyl sulfonate, a sulfate, a thiosulfate group, or a combination thereof.

In another embodiment, the polysaccharide derivative comprises a polysaccharide substituted with at least one hydrophobic group and at least one hydrophilic group, wherein the at least one hydrophobic group comprises a $C_2$ to $C_{18}$ alkene group, and the at least one hydrophilic group comprises a carboxylic acid, carboxylic acid salt, a sulfonic acid derivative, a sulfonic acid derivative salt, a sulfuric acid derivative, a sulfuric acid derivative salt, thiosulfate, a thiosulfate salt, a phosphoric acid derivative, a phosphoric acid derivative salt, an alkyl amine, an alkyl substituted ammonium salt, a quaternized pyridine salt, a quaternized imidazole salt, or a combination thereof. In another embodiment, the at least one hydrophobic group comprises a $C_2$ to $C_{18}$ alkene group, and the at least one hydrophilic group comprises a carboxylic acid, an alkyl substituted ammonium salt, a sulfonate, an alkyl sulfonate, a sulfate, a thiosulfate group, or a combination thereof.

In yet another embodiment, the polysaccharide derivative comprises a polysaccharide substituted with at least one hydrophobic group and at least one hydrophilic group, wherein the at least one hydrophobic group comprises a $C_2$ to $C_{18}$ alkyne group, and the at least one hydrophilic group comprises a carboxylic acid, carboxylic acid salt, a sulfonic acid derivative, a sulfonic acid derivative salt, a sulfuric acid derivative, a sulfuric acid derivative salt, thiosulfate, a thiosulfate salt, a phosphoric acid derivative, a phosphoric acid derivative salt, an alkyl amine, an alkyl substituted ammonium salt, a quaternized pyridine salt, a quaternized imidazole salt, or a combination thereof. In another embodiment, the at least one hydrophobic group comprises a $C_2$ to $C_{18}$ alkyne group, and the at least one hydrophilic group comprises a carboxylic acid, an alkyl substituted ammonium salt, a sulfonate, an alkyl sulfonate, a sulfate, a thiosulfate group, or a combination thereof.

In a further embodiment, the polysaccharide derivative comprises a polysaccharide substituted with at least one hydrophobic group and at least one hydrophilic group, wherein the at least one hydrophobic group comprises a polyether comprising repeat units of (—$CH_2CH_2O$—), (—CH$_2$CH(CH$_3$)O—), or mixtures thereof, wherein the total number of repeat units is in the range of from 3 to 100, and the at least one hydrophilic group comprises a carboxylic acid, carboxylic acid salt, a sulfonic acid derivative, a sulfonic acid derivative salt, a sulfuric acid derivative, a sulfuric acid derivative salt, thiosulfate, a thiosulfate salt, a phosphoric acid derivative, a phosphoric acid derivative salt, an alkyl amine, an alkyl substituted ammonium salt, a quaternized pyridine salt, a quaternized imidazole salt, or a combination thereof. In another embodiment, the at least one hydrophobic group comprises a polyether comprising repeat units of (—CH$_2$CH$_2$O—), (—CH$_2$CH(CH$_3$)O—), or mixtures thereof, wherein the total number of repeat units is in the range of from 3 to 100, and the at least one hydrophilic group comprises a carboxylic acid, an alkyl substituted ammonium salt, a sulfonate, an alkyl sulfonate, a sulfate, a thiosulfate group, or a combination thereof.

In a further embodiment, the polysaccharide derivative comprises a polysaccharide substituted with at least one hydrophobic group and at least one hydrophilic group, wherein the at least one hydrophobic group comprises a C$_6$ to C$_{20}$ aryl group, and the at least one hydrophilic group comprises a carboxylic acid, carboxylic acid salt, a sulfonic acid derivative, a sulfonic acid derivative salt, a sulfuric acid derivative, a sulfuric acid derivative salt, thiosulfate, a thiosulfate salt, a phosphoric acid derivative, a phosphoric acid derivative salt, an alkyl amine, an alkyl substituted ammonium salt, a quaternized pyridine salt, a quaternized imidazole salt, or a combination thereof. In another embodiment, the at least one hydrophobic group comprises a C$_6$ to C$_{20}$ aryl group, and the at least one hydrophilic group comprises a carboxylic acid, an alkyl substituted ammonium salt, a sulfonate, an alkyl sulfonate, a sulfate, a thiosulfate group, or a combination thereof.

In an additional embodiment, the polysaccharide derivative comprises a polysaccharide substituted with at least one hydrophobic group and at least one hydrophilic group, wherein the at least one hydrophobic group comprises a benzyl group, and the at least one hydrophilic group comprises a carboxylic acid, carboxylic acid salt, a sulfonic acid derivative, a sulfonic acid derivative salt, a sulfuric acid derivative, a sulfuric acid derivative salt, thiosulfate, a thiosulfate salt, a phosphoric acid derivative, a phosphoric acid derivative salt, an alkyl amine, an alkyl substituted ammonium salt, a quaternized pyridine salt, a quaternized imidazole salt, or a combination thereof. In another embodiment, the at least one hydrophobic group comprises a benzyl group, and the at least one hydrophilic group comprises a carboxylic acid, an alkyl substituted ammonium salt, a sulfonate, an alkyl sulfonate, a sulfate, or a thiosulfate group.

In an additional embodiment, the polysaccharide derivative comprises a polysaccharide substituted with at least one hydrophobic group and at least one hydrophilic group, wherein the at least one hydrophobic group comprises a benzyl group substituted with one or more of a halogen, a cyano, an ester, an amide, an ether group, a C$_1$ to C$_6$ alkyl group, an aryl group, a C$_2$ to C$_6$ alkene group, a C$_2$ to C$_6$ alkyne group, or a combination thereof, and the at least one hydrophilic group comprises a carboxylic acid, carboxylic acid salt, a sulfonic acid derivative, a sulfonic acid derivative salt, a sulfuric acid derivative, a sulfuric acid derivative salt, thiosulfate, a thiosulfate salt, a phosphoric acid derivative, a phosphoric acid derivative salt, an alkyl amine, an alkyl substituted ammonium salt, a quaternized pyridine salt, a quaternized imidazole salt, or a combination thereof. In another embodiment, the at least one hydrophobic group comprises a benzyl group substituted with one or more of a halogen, a cyano, an ester, an amide, an ether group, a C$_1$ to C$_6$ alkyl group, an aryl group, a C$_2$ to C$_6$ alkene group, a C$_2$ to C$_6$ alkyne group, or a combination thereof, and the at least one hydrophilic group comprises a carboxylic acid, an alkyl substituted ammonium salt, a sulfonate, an alkyl sulfonate, a sulfate, or a thiosulfate group.

In an additional embodiment, the polysaccharide derivative comprises a polysaccharide substituted with at least one hydrophobic group and at least one hydrophilic group, wherein the at least one hydrophobic group comprises a C$_1$-C$_{18}$ alkyl sulfonyl or a C$_6$-C$_{20}$ aryl sulfonyl group, and the at least one hydrophilic group comprises a carboxylic acid, carboxylic acid salt, a sulfonic acid derivative, a sulfonic acid derivative salt, a sulfuric acid derivative, a sulfuric acid derivative salt, thiosulfate, a thiosulfate salt, a phosphoric acid derivative, a phosphoric acid derivative salt, an alkyl amine, an alkyl substituted ammonium salt, a quaternized pyridine salt, a quaternized imidazole salt, or a combination thereof. In another embodiment, the at least one hydrophobic group comprises a C$_1$-C$_{18}$ alkyl sulfonyl or a C$_6$-C$_{20}$ aryl sulfonyl group, and the at least one hydrophilic group comprises a carboxylic acid, an alkyl substituted ammonium salt, a sulfonate, an alkyl sulfonate, a sulfate, or a thiosulfate group.

In an additional embodiment, the polysaccharide derivative comprises a polysaccharide substituted with at least one hydrophobic group and at least one hydrophilic group, wherein the at least one hydrophobic group comprises a p-toluenesulfonyl group, and the at least one hydrophilic group comprises a carboxylic acid, carboxylic acid salt, a sulfonic acid derivative, a sulfonic acid derivative salt, a sulfuric acid derivative, a sulfuric acid derivative salt, thiosulfate, a thiosulfate salt, a phosphoric acid derivative, a phosphoric acid derivative salt, an alkyl amine, an alkyl substituted ammonium salt, a quaternized pyridine salt, a quaternized imidazole salt, or a combination thereof. In another embodiment, the at least one hydrophobic group comprises a p-toluenesulfonyl group, and the at least one hydrophilic group comprises a carboxylic acid, an alkyl substituted ammonium salt, a sulfonate, an alkyl sulfonate, a sulfate, or a thiosulfate group.

In one embodiment, the polysaccharide derivative comprises a polysaccharide substituted with at least one hydrophobic group and at least one hydrophilic group, wherein the at least one hydrophobic group comprises a C$_1$ to C$_{18}$ alkyl, a benzyl, a p-toluenesulfonyl group, or a combination thereof, and the at least one hydrophilic group comprises a carboxylic acid, an alkyl substituted ammonium salt, a sulfonate, an alkyl sulfonate, a sulfate, a thiosulfate, or a combination thereof.

In one embodiment, the polysaccharide derivative comprises a polysaccharide substituted with at least one hydrophobic group and at least one hydrophilic group, wherein the at least one hydrophobic group comprises a C$_1$ to C$_{18}$ alkyl, a benzyl, a p-toluenesulfonyl group, or a combination thereof, and the at least one hydrophilic group comprises a thiosulfate or carboxymethyl group.

In a further embodiment, the at least one hydrophobic group comprises a benzyl or p-toluenesulfonyl group, and the at least one hydrophilic group comprises a thiosulfate or carboxymethyl group. In yet a further embodiment, the at least one hydrophobic group comprises a C$_1$ to C$_{18}$ alkyl or p-toluenesulfonyl group, and the at least one hydrophilic group comprises a thiosulfate or carboxymethyl group. In another embodiment, the at least one hydrophobic group comprises a $C_1$ to $C_{18}$ alkyl or benzyl group, and the at least one hydrophilic group comprises a thiosulfate or carboxymethyl group.

Poly alpha-1,3-glucan, poly alpha-1,6-glucan, or poly alpha-1,3-1,6-glucan may be hydrophobically modified by contacting the polysaccharide with at least one etherification agent comprising a hydrophobic organic group under alkaline conditions. This step can be performed, for example, by first preparing alkaline conditions by contacting the polysaccharide with a solvent and one or more alkali hydroxides to provide a solution or mixture. The alkaline conditions of the reaction can thus comprise an alkali hydroxide solution. The pH of the alkaline conditions can be at least about 11.0, 11.2, 11.4, 11.6, 11.8, 12.0, 12.2, 12.4, 12.6, 12.8, or 13.0.

Etherification agents comprising a hydrophobic organic group include, for example, dialkyl sulfates, dialkyl carbonates, alkyl halides (e.g., alkyl chloride), iodoalkanes, alkyl triflates (alkyl trifluoromethanesulfonates), alkyl fluorosulfonates, 1,2-epoxyalkyls, and epoxides. Thus, examples of etherification agents for producing methyl poly alpha-1,3-glucan ethers, methyl poly-1,6-glucan ethers, or methyl poly alpha-1,3-1,6-glucan ethers include dimethyl sulfate, dimethyl carbonate, methyl chloride, iodomethane, methyl triflate, methyl fluorosulfonate. Examples of etherification agents for producing ethyl poly glucan ethers include diethyl sulfate, diethyl carbonate, ethyl chloride, iodoethane, ethyl triflate and ethyl fluorosulfonate. Examples of etherification agents for producing propyl poly glucan ethers include dipropyl sulfate, dipropyl carbonate, propyl chloride, iodopropane, propyl triflate and propyl fluorosulfonate. Examples of etherification agents for producing butyl poly glucan ethers include dibutyl sulfate, dibutyl carbonate, butyl chloride, iodobutane, butyl triflate, and 1,2-epoxybutane. Examples of etherification agents for producing benzyl poly glucan ethers include benzyl chloride and benzyl bromide.

Polyethers of polysaccharides, e.g. polyethers derived from polyethylene glycol (PEG), polypropylene glycol (PPG), or mixtures thereof, may also be obtained by contacting the polysaccharide with an epoxide, for example, ethylene oxide, propylene oxide, or a mixture thereof in the presence of a base. The hydroxyl group may undergo further reaction with an epoxide, producing a polyether having two or more ether repeat units. Depending on the molar amounts of the epoxide or polysaccharide, one or more of the hydroxyl groups of the polysaccharide can be monoalkoxylated or polyalkoxylated. The polysaccharide can have one or more polyether repeat units according to the formula $(-CH_2CH_2O-)_{4-100}$, $(-CH_2CH(CH_3)O-)_{4-100}$, or a combination thereof. If used in combination, the repeat units can be in a random configuration or in a block configuration. As used herein, the subscript designating a range of values will be used to designate the potential number of repeat units, for example, $(CH_2CH_2O)_{4-100}$ means a polyether group containing in the range of from 3 to 100 repeat units.

Hydrophilic anionic derivatives of poly glucans may be prepared from reactions known in the art. For example, glucan can be derivatized with a carboxymethyl group by contacting poly alpha-1,3-glucan, poly alpha-1,6-glucan, or poly alpha-1,3-1,6-glucan with monochloroacetic acid under alkaline conditions. Etherification agents suitable for preparing a carboxyalkyl poly glucan ether compound may include haloalkylates (e.g., chloroalkylate). Examples of haloalkylates include haloacetate (e.g., chloroacetate), 3-halopropionate (e.g., 3-chloropropionate) and 4-halobutyrate (e.g., 4-chlorobutyrate). For example, chloroacetate (monochloroacetate) (e.g., sodium chloroacetate) can be used as an etherification agent to prepare carboxymethyl poly alpha-1,3-glucan or carboxymethyl poly alpha-1,6-glucan.

Phosphate, phosphonate, sulfonates, and sulfate derivatives of poly glucans may be produced analogously as described in Solarek, D. B., *Phosphoryated Starches and Miscellaneous Inorganic Esters in Modified Starches: Properties and Uses*, Wurzburg, O. B., Ed., CRC Press, Inc. Boca Raton, Fla., 1986, pp. 97-108. Inorganic esters of glucan such as phosphate and sulfate can be formed from methods known in the art. For example, phosphate groups can be introduced by reaction of the polysaccharide with sodium tripolyphosphate or with alkyl phosphates and pyrophosphate diester, as described in Modified Starches: Properties and Uses, by O. B. Wurzburg, CRC Press, 2000). Polysaccharides can be sulfated by a variety of methods, including sulfation with sulfuric acid, chorosulfonic acid in organic solvents, or sulfur trioxide complexes, as described in Modified Starches: properties and Uses, by O. B. Wurzburg, CRC Press, 2000).

Alkylsulfonate ethers of poly glucans may be prepared from the Michael addition of alkali poly glucan with vinyl sulfonic acid or with chloroalkane sulfonate. Alternatively, poly glucan may be reacted with propane sultone or butane sultone to yield the corresponding sulfoalkyl poly glucan. Sulfation of poly glucan may be carried out with chlorosulfonic acid or with sulfur trioxide complexes. Examples of sulfur trioxide complexes include sulfur trioxide-nitrogen base complexes, such as $SO_3$-DMF, $SO_3$-triethylamine, $SO_3$-pyridine.

Hydrophilic cationic derivatives of poly glucans may be prepared from reactions known in the art. For example, derivatives of poly glucans may be produced analogously as described in Solarek, D. B., *Cationic Starches: Properties and Uses*, Wurzburg, O. B., Ed., CRC Press, Inc. Boca Raton, Fla., 1986, pp. 113-148. Some common reagents used to prepare cationic derivatives of polyglucan include: 2-diethylaminoethyl chloride (DEC); 2-dimethylaminoethyl chloride; 2-diisopropylaminoethyl chloride; 2-diethylaminoethyl bromide, N-alkyl-N-(2-haloethyl)-aminomethylphosphoric acid; and 2,3-epoxypropyltrimethylammonium chloride.

Methods for preparing compositions comprising a poly alpha-1,3-glucan, poly alpha-1,6-glucan, or poly alpha-1,3-1,6-glucan ether compound containing a positively charged organic group, such as a trimethyl ammonium group, a substituted ammonium group, or a quaternary ammonium group, are disclosed in published patent application US 2016/0311935, which is incorporated herein by reference in its entirety.

Etherification agents suitable for preparing a dihydroxyalkyl poly alpha-1,3-glucan, poly alpha-1,6-glucan, or poly alpha-1,3-1,6-glucan ether compound include dihydroxyalkyl halides (e.g., dihydroxyalkyl chloride) such as dihydroxyethyl halide, dihydroxypropyl halide (e.g., 2,3-dihydroxypropyl chloride [i.e., 3-chloro-1,2-propanediol]), or dihydroxybutyl halide, for example. 2,3-dihydroxypropyl chloride can be used to prepare dihydroxypropyl poly alpha-1,3-glucan, poly alpha-1,6-glucan, or poly alpha-1,3-1,6-glucan, for example.

When producing a poly alpha-1,3-glucan, poly alpha-1,6-glucan, or poly alpha-1,3-1,6-glucan ether compound with two or more different organic groups, two or more different etherification agents would be used, accordingly. For example, both an alkylene oxide and an alkyl chloride could be used as etherification agents to produce an alkyl hydroxyalkyl poly alpha-1,3-glucan ether, an alkyl hydroxyalkyl poly alpha-1,6-glucan ether, or an alkyl hydroxyalkyl poly alpha-1,3-1,6-glucan. Any of the etherification agents disclosed herein may therefore be combined to produce poly glucan ether compounds with two or more different organic groups. Such two or more etherification agents may be used in the reaction at the same time, or may be used sequentially in the reaction. When used sequentially, any of the temperature-treatment (e.g., heating) steps disclosed below may optionally be used between each addition. One may choose sequential introduction of etherification agents in order to control the desired DoS of each organic group. In general, a particular etherification agent would be used first if the organic group it forms in the ether product is desired at a higher DoS compared to the DoS of another organic group to be added.

The amount of etherification agent to be contacted with poly alpha-1,3-glucan, poly alpha-1,6-glucan, or poly alpha-1,3-1,6-glucan in a reaction under alkaline conditions can be determined based on the degree of substitution required in the ether compound being produced. The amount of ether substitution groups on each monomeric unit in poly alpha-1,3-glucan, poly alpha-1,6-glucan, or poly alpha-1,3-1,6-glucan ether compounds produced herein can be determined using nuclear magnetic resonance (NMR) spectroscopy. The molar substitution (MS) value for poly alpha-1,3-glucan, poly alpha-1,6-glucan, or poly alpha-1,3-1,6-glucan has no upper limit. In general, an etherification agent can be used in a quantity of at least about 0.05 mole per mole of poly glucan. There is no upper limit to the quantity of etherification agent that can be used.

Reactions for producing poly alpha-1,3-glucan, poly alpha-1,6-glucan, or poly alpha-1,3-1,6-glucan ether compounds herein can optionally be carried out in a pressure vessel such as a Parr reactor, an autoclave, a shaker tube or any other pressure vessel well known in the art. A shaker tube is used to perform the reaction in certain embodiments.

A reaction herein can optionally be heated following the step of contacting the poly glucan with an etherification agent under alkaline conditions. The reaction temperatures and time of applying such temperatures can be varied within wide limits. For example, a reaction can optionally be maintained at ambient temperature for up to 14 days. Alternatively, a reaction can be heated, with or without reflux, between about 25° C. to about 200° C. (or any integer between 25 and 200° C.). Reaction time can be varied correspondingly: more time at a low temperature and less time at a high temperature.

In certain embodiments of producing carboxymethyl poly alpha-1,3-glucan, carboxymethyl poly alpha-1,6-glucan, or carboxymethyl poly alpha-1,3-1,6-glucan a reaction can be heated to about 55° C. for about 3 hours. Thus, a reaction for preparing a carboxyalkyl poly-glucan herein can be heated to about 50° C. to about 60° C. (or any integer between 50 and 60° C.) for about 2 hours to about 5 hours, for example.

Optionally, a reaction herein can be maintained under an inert gas, with or without heating. As used herein, the term "inert gas" refers to a gas which does not undergo chemical reactions under a set of given conditions, such as those disclosed for preparing a reaction herein.

All of the components of the reactions disclosed herein can be mixed together at the same time and brought to the desired reaction temperature, whereupon the temperature is maintained with or without stirring until the desired poly glucan ether compound is formed. Alternatively, the mixed components can be left at ambient temperature as described above.

Following etherification, the pH of a reaction can be neutralized. Neutralization of a reaction can be performed using one or more acids. The term "neutral pH" as used herein, refers to a pH that is neither substantially acidic or basic (e.g., a pH of about 6-8, or about 6.0, 6.2, 6.4, 6.6, 6.8, 7.0, 7.2, 7.4, 7.6, 7.8, or 8.0). Various acids that can be used for this purpose include, but are not limited to, sulfuric, acetic, hydrochloric, nitric, any mineral (inorganic) acid, any organic acid, or any combination of these acids.

A poly glucan ether compound produced in a reaction herein can optionally be washed one or more times with a liquid that does not readily dissolve the compound. For example, a poly alpha-1,3-glucan, poly alpha-1,6-glucan, or poly alpha-1,3-1,6-glucan ether can be washed with water, alcohol, acetone, aromatics, or any combination of these, depending on the solubility of the ether compound therein (where lack of solubility is desirable for washing). In general, a solvent comprising an organic solvent such as alcohol is preferred for the washing. A poly glucan ether product can be washed one or more times with an aqueous solution containing methanol or ethanol, for example. For example, 70-95 wt % ethanol can be used to wash the product. A poly glucan ether product can be washed with a methanol:acetone (e.g., 60:40) solution in another embodiment. Hot water (about 95-100° C.) can be used in certain embodiments, such as for washing alkyl poly alpha-1,3-glucan or poly alpha-1,6-glucan ethers (e.g., ethyl poly alpha-1,3-glucan) and alkyl hydroxyalkyl poly alpha-1,3-glucan ethers (e.g., ethyl hydroxyethyl poly alpha-1,3-glucan).

The poly alpha-1,3-glucan, poly alpha-1,6-glucan, or poly alpha-1,3-1,6-glucan can also be modified with one or more benzyl groups. The poly glucan can be benzylated by deprotonating one or more of the hydroxyl groups using a base, for example, sodium hydroxide, potassium hydroxide, sodium alkoxide, potassium alkoxide, sodium hydride followed by treatment with a benzylating agent, for example, a benzyl halide. The benzyl group of the benzylating agent can optionally substituted by one or more of halogen, a cyano, an ester, an amide, an ether group, a $C_1$ to $C_6$ alkyl group, an aryl group, a $C_2$ to $C_6$ alkene group, a $C_2$ to $C_6$ alkyne group, or a combination thereof. In some embodiments, the benzylating agent can be:

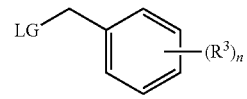

wherein LG is a leaving group, for example, chloride, bromide, iodide; $R^3$ is halogen, cyano, ester, amide, ether, $C_1$ to $C_6$ alkyl, aryl, $C_2$ to $C_6$ alkene, $C_2$ to $C_6$ alkyne; and n is 1, 2, 3, 4 or 5. Halogen can be fluoride, chloride, bromide or iodide. The ester can be benzyl-C(O)O—R', or the ester can be benzyl-OC(O)—R', wherein the R' group is a $C_1$ to $C_6$ alkyl or an aryl group. The ether can be a $C_1$ to $C_6$ alkyl ether or an aryl ether. The amide can be benzyl-C(O)N(R")$_2$ or benzyl-N(R")(O)C—, wherein each R" is independently hydrogen or $C_1$ to $C_6$ alkyl. In each of the above examples, the term 'benzyl' refers to the benzylating agent.

The poly alpha-1,3-glucan, poly alpha-1,6-glucan, or poly alpha-1,3-1,6-glucan has 3 hydroxyl groups per repeat unit. Therefore, the amount of benzylating agent that can be used is enough to produce a degree of substitution that has a maximum value of 3.0. The phrase "degree of substitution" means the average number of substituent groups, for example, benzyl groups, attached per repeat unit of the poly glucan. For example, a degree of substitution of 0.5 means that, on average, one hydroxyl group per 2 repeat units is substituted by a benzyl group. A degree of substitution of 3 means that all hydroxyl groups of the poly alpha-1,3-glucan, poly alpha-1,6-glucan, or poly alpha-1,3-1,6-glucan are substituted. In some embodiments, the degree of substitution is in the range of from 0.1 to 0.6. In other embodiments, the degree of substitution is in the range of from 0.1 to 0.5, or from 0.01 to 1.0, or from 0.2 to 0.45, or from 0.4 to 0.6. One method to determine the degree of substitution can be by integration of the peaks of a carbon-13 NMR spectrum. Proton NMR analysis can also be used.

Deprotonation can take place in the presence of a base and an aqueous solvent, a base and an organic solvent, or a base and a mixture of an aqueous and organic solvent. Suitable organic solvents can include, for example, dimethyl sulfoxide, dimethyl acetamide, dimethyl formamide, pyridine, 1-methyl-2-pyrrolidinone or a combination thereof. In some embodiments, the poly glucan can be added to a mixture of the base and the solvent. Optionally, the mixture can be heated. The benzylating agent, for example, benzyl chloride, can then be added. In an aqueous system, as the degree of benzylation increases, the benzyl poly glucan precipitates from the solution, and can be removed by filtration. By utilizing organic solvents, or varying the temperature or concentration, the degree of substitution can be increased above 0.4. The benzyl poly glucan can be isolated using known techniques.

Any of the above etherification reactions can be repeated using a poly alpha-1,3-glucan ether, poly alpha-1,6-glucan ether, or poly alpha-1,3-1,6-glucan ether as the starting material for further modification. This approach may be suitable for increasing the DoS of an organic group, and/or adding one or more different organic groups to the ether product. For example, a benzyl poly alpha-1,3-glucan ether product can be used as a substrate for further modification with carboxymethyl groups.

Poly alpha-1,3-glucan, poly alpha-1,6-glucan, or poly alpha-1,3-1,6-glucan may be hydrophobically modified by contacting the polysaccharide with a $C_1$ to $C_{18}$ alkyl sulfonyl chloride, $C_6$ to $C_{20}$ aryl sulfonyl chloride, or p-toluenesulfonyl chloride in the presence of base. This hydrophobic modification can be performed, for example, by first preparing alkaline conditions by contacting the polysaccharide with a solvent and one or more alkali hydroxides to provide a solution or mixture. The alkaline conditions of the reaction can thus comprise an alkali hydroxide solution. The pH of the alkaline conditions can be at least about 11.0, 11.2, 11.4, 11.6, 11.8, 12.0, 12.2, 12.4, 12.6, 12.8, or 13.0. To the basic solution was then added $C_1$ to $C_{18}$ alkyl sulfonyl chloride, $C_6$ to $C_{20}$ aryl sulfonyl chloride, or p-toluenesulfonyl chloride and the mixture allowed to react at room temperature or with heating.

Depending upon the desired application, the polysaccharide derivatives disclosed herein can be formulated, for example, blended, mixed, or incorporated into, with one or more other materials and/or active ingredients suitable for use in various compositions, for example compositions for use in laundry care, textile/fabric care, and/or personal care products. The term "composition comprising the polysaccharide derivative" in this context may include, for example, aqueous formulations, rheology modifying compositions, fabric treatment/care compositions, laundry care formulations/compositions, fabric softeners or personal care compositions (hair, skin and oral care), each comprising poly alpha-1,3-glucan, poly alpha-1,6-glucan, or poly alpha-1,3-1,6-glucan substituted with a) at least one hydrophobic group and b) at least one hydrophilic group.

As used herein, the term "effective amount" refers to the amount of the substance used or administered that is suitable to achieve the desired effect. The effective amount of material may vary depending upon the application. One of skill in the art will typically be able to determine an effective amount for a particular application or subject without undo experimentation.

The term "resistance to enzymatic hydrolysis" refers to the relative stability of the polysaccharide derivative to enzymatic hydrolysis. Having a resistance to hydrolysis is important for the use of these materials in applications wherein enzymes are present, such as in detergent, fabric care, and/or laundry care applications. In some embodiments, the polysaccharide derivative is resistant to cellulases. In other embodiments, the polysaccharide derivative is resistant to proteases. In still further embodiments, the polysaccharide derivative is resistant to amylases. In yet other embodiments, the polysaccharide derivative is resistant to lipases. In yet other embodiments, the polysaccharide derivative is resistant to mannanases. In other embodiments, the polysaccharide derivative is resistant to multiple classes of enzymes, for example, two or more cellulases, proteases, amylases, lipases, mannanases, or combinations thereof. Resistance to any particular enzyme will be defined as having at least 10, 20, 30, 40, 50, 60, 70, 80, 90, 95 or 100% of the materials remaining after treatment with the respective enzyme. The percentage remaining may be determined by measuring the supernatant after enzyme treatment using SEC-HPLC. The assay to measure enzyme resistance can be determined using the following procedure: A sample of the polysaccharide derivative is added to water in a vial and mixed using a PTFE magnetic stir bar to create a 1 percent by weight aqueous solution. The aqueous mixture is produced at pH 7.0 and 20° C. After the polysaccharide derivative thereof has completely dissolved, 1.0 milliliter (mL) (1 percent by weight of the enzyme formulation) of cellulase (PURADEX® EGL), amylase (PURASTAR® ST L) protease (SAVINASE® 16.0 L), or lipase (Lipex® 100 L) is added and mixed for 72 hours (hrs) at 20° C. After 72 hrs of stirring, the reaction mixture is heated to 70° C. for 10 minutes to inactivate the added enzyme, and the resulting mixture is cooled to room temperature and centrifuged to remove any precipitate. The supernatant is analyzed by SEC-HPLC for recovered polysaccharide derivative and compared to a control where no enzyme was added to the reaction mixture. Percent changes in area counts for the respective polysaccharide derivative thereof may be used to test the relative resistance of the materials to the respective enzyme treatment. Percent changes in area versus the total will be used to assess the relative amount of materials remaining after treatment with a particular enzyme. Materials having a percent recovery of at least 10%, preferably at least 50, 60, 70, 80, 90, 95 or 100% will be considered "resistant" to the respective enzyme treatment.

The phrase "aqueous composition" herein refers to a solution or mixture in which the solvent is at least about 1% by weight of water and which comprises the polysaccharide derivative.

The terms "hydrocolloid" and "hydrogel" are used interchangeably herein. A hydrocolloid refers to a colloid system in which water is the dispersion medium. A "colloid" herein refers to a substance that is microscopically dispersed throughout another substance. Therefore, a hydrocolloid herein can also refer to a dispersion, emulsion, mixture, or solution of the polysaccharide derivative in water or aqueous solution.

The term "aqueous solution" herein refers to a solution in which the solvent is water. The polysaccharide derivative can be dispersed, mixed, and/or dissolved in an aqueous solution. An aqueous solution can serve as the dispersion medium of a hydrocolloid herein.

The terms "dispersant" and "dispersion agent" are used interchangeably herein to refer to a material that promotes the formation and stabilization of a dispersion of one substance in another. A "dispersion" herein refers to an aqueous composition comprising one or more particles, for example, any ingredient of a personal care product, pharmaceutical product, food product, household product or industrial product that are scattered, or uniformly distributed, throughout the aqueous composition. It is believed that the polysaccharide derivative can act as dispersants in aqueous compositions disclosed herein.

The term "viscosity" as used herein refers to the measure of the extent to which a fluid or an aqueous composition such as a hydrocolloid resists a force tending to cause it to flow. Various units of viscosity that can be used herein include centipoise (cPs) and Pascal-second (Pa·s). A centipoise is one one-hundredth of a poise; one poise is equal to 0.100 kg·m$^{-1}$·s$^{-1}$. Thus, the terms "viscosity modifier" and "viscosity-modifying agent" as used herein refer to anything that can alter/modify the viscosity of a fluid or aqueous composition.

The terms "fabric", "textile", and "cloth" are used interchangeably herein to refer to a woven or non-woven material having a network of natural and/or artificial fibers. Such fibers can be thread or yarn, for example.

A "fabric care composition" herein is any composition suitable for treating fabric in some manner. Suitable examples of such a composition include non-laundering fiber treatments (for desizing, scouring, mercerizing, bleaching, coloration, dying, printing, bio-polishing, anti-microbial treatments, anti-wrinkle treatments, stain resistance treatments, etc.), laundry care compositions (e.g., laundry care detergents), and fabric softeners.

The terms "detergent composition", "heavy duty detergent" and "all-purpose detergent" are used interchangeably herein to refer to a composition useful for regular washing of a substrate, for example, dishware, cutlery, vehicles, fabrics, carpets, apparel, white and colored textiles at any temperature.

Detergent compositions for treating of fabrics, hard surfaces and any other surfaces in the area of fabric and home care, include: laundry detergents, fabric conditioners (including softeners), laundry and rinse additives and care compositions, fabric freshening compositions, laundry pre-wash, laundry pretreat, hard surface treatment compositions, car care compositions, dishwashing compositions (including hand dishwashing and automatic dishwashing products), air care products, detergent contained on or in a porous substrate or nonwoven sheet, and other cleaner products for consumer or institutional use The terms "cellulase" and "cellulase enzyme" are used interchangeably herein to refer to an enzyme that hydrolyzes β-1,4-D-glucosidic linkages in cellulose, thereby partially or completely degrading cellulose. Cellulase can alternatively be referred to as "β-1,4-glucanase", for example, and can have endocellulase activity (EC 3.2.1.4), exocellulase activity (EC 3.2.1.91), or cellobiase activity (EC 3.2.1.21). A cellulase in certain embodiments herein can also hydrolyze β-1,4-D-glucosidic linkages in cellulose ether derivatives such as carboxymethyl cellulose. "Cellulose" refers to an insoluble polysaccharide having a linear chain of β-1,4-linked D-glucose monomeric units.

As used herein, the term "fabric hand" or "handle" is meant people's tactile sensory response towards fabric which may be physical, physiological, psychological, social or any combination thereof. In some embodiments, the fabric hand may be measured using a PHABROMETER® System (available from Nu Cybertek, Inc. Davis, Calif.) for measuring the relative hand value as given by the American Association of Textile Chemists and Colorists (AATCC test method "202-2012, Relative Hand Value of Textiles: Instrumental Method").

The composition can be in the form of a liquid, a gel, a powder, a hydrocolloid, an aqueous solution, a granule, a tablet, a capsule, a single compartment sachet, a multi-compartment sachet, a single compartment pouch, or a multi-compartment pouch. In some embodiments, the composition is in the form of a liquid, a gel, a powder, a single compartment sachet, or a multi-compartment sachet.

In some embodiments, compositions comprising the polysaccharide derivative can be in the form of a fabric care composition. A fabric care composition can be used for hand wash, machine wash and/or other purposes such as soaking and/or pretreatment of fabrics, for example. A fabric care composition may take the form of, for example, a laundry detergent; fabric conditioner; any wash-, rinse-, or dryer-added product; unit dose or spray. Fabric care compositions in a liquid form may be in the form of an aqueous composition. In other embodiments, a fabric care composition can be in a dry form such as a granular detergent or dryer-added fabric softener sheet. Other non-limiting examples of fabric care compositions can include: granular or powder-form all-purpose or heavy-duty washing agents; liquid, gel or paste-form all-purpose or heavy-duty washing agents; liquid or dry fine-fabric (e.g. delicates) detergents; cleaning auxiliaries such as bleach additives, "stain-stick", or pre-treatments; substrate-laden products such as dry and wetted wipes, pads, or sponges; sprays and mists; water-soluble unit dose articles.

In some embodiments, compositions comprising the polysaccharide derivative can be in the form of a personal care product. Personal care products include, but are not limited to, hair care compositions, skin care compositions, sun care compositions, body cleanser compositions, oral care compositions, wipes, beauty care compositions, cosmetic compositions, antifungal compositions, and antibacterial compositions. The personal care products can include cleansing, cleaning, protecting, depositing, moisturizing, conditioning, occlusive barrier, and emollient compositions.

As used herein, "personal care products" also includes products used in the cleaning, bleaching and/or disinfecting of hair, skin, scalp, and teeth, including, but not limited to shampoos, body lotions, shower gels, topical moisturizers, toothpaste, toothgels, mouthwashes, mouthrinses, anti-plaque rinses, and/or other topical cleansers. In some embodiments, these products are utilized on humans, while in other embodiments, these products find use with non-human animals (e.g., in veterinary applications). In one aspect, "personal care products" includes hair care products. The hair care product can be in the form of a powder, paste, gel, liquid, oil, ointment, spray, foam, tablet, a hair shampoo, a hair conditioner rinse or any combination thereof.

The product formulation comprising the polysaccharide derivative described herein may be optionally diluted with water, or a solution predominantly comprised of water, to produce a formulation with the desired polysaccharide derivative concentration for the target application. Clearly one of skill in the art can adjust the reaction components and/or dilution amounts to achieve the desired polysaccharide derivative concentration for the chosen personal care product.

The personal care compositions described herein may further comprise one or more dermatologically or cosmetically acceptable components known or otherwise effective for use in hair care or other personal care products, provided that the optional components are physically and chemically compatible with the essential components described herein, or do not otherwise unduly impair product stability, aesthetics, or performance. Non-limiting examples of such optional components are disclosed in *International Cosmetic Ingredient Dictionary*, Ninth Edition, 2002, and CTFA Cosmetic Ingredient Handbook, Tenth Edition, 2004.

In one embodiment, the dermatologically acceptable carrier may comprise from about 10 wt % to about 99.9 wt %, alternatively from about 50 wt % to about 95 wt %, and alternatively from about 75 wt % to about 95 wt %, of a dermatologically acceptable carrier. Carriers suitable for use with the composition(s) may include, for example, those used in the formulation of hair sprays, mousses, tonics, gels, skin moisturizers, lotions, and leave-on conditioners. The carrier may comprise water; organic oils; silicones such as volatile silicones, amino or non-amino silicone gums or oils, and mixtures thereof; mineral oils; plant oils such as olive oil, castor oil, rapeseed oil, coconut oil, wheatgerm oil, sweet almond oil, avocado oil, macadamia oil, apricot oil, safflower oil, candlenut oil, false flax oil, tamanu oil, lemon oil and mixtures thereof; waxes; and organic compounds such as $C_2$-$C_{10}$ alkanes, acetone, methyl ethyl ketone, volatile organic $C_1$-$C_{12}$ alcohols, esters (with the understanding that the choice of ester(s) may be dependent on whether or not it may act as a carboxylic acid ester substrates for the perhydrolases) of $C_1$-$C_{20}$ acids and of $C_1$-$C_8$ alcohols such as methyl acetate, butyl acetate, ethyl acetate, and isopropyl myristate, dimethoxyethane, diethoxyethane, $C_{10}$-$C_{30}$ fatty alcohols such as lauryl alcohol, cetyl alcohol, stearyl alcohol, and behenyl alcohol; $C_{10}$-$C_{30}$ fatty acids such as lauric acid and stearic acid; $C_{10}$-$C_{30}$ fatty amides such as lauric diethanolamide; $C_{10}$-$C_{30}$ fatty alkyl esters such as $C_{10}$-$C_{30}$ fatty alkyl benzoates; hydroxypropylcellulose, and mixtures thereof. In one embodiment, the carrier comprises water, fatty alcohols, volatile organic alcohols, and mixtures thereof.

The composition(s) of the present invention further may comprise from about 0.1% to about 10%, and alternatively from about 0.2% to about 5.0%, of a gelling agent to help provide the desired viscosity to the composition(s). Non-limiting examples of suitable optional gelling agents include crosslinked carboxylic acid polymers; unneutralized crosslinked carboxylic acid polymers; unneutralized modified crosslinked carboxylic acid polymers; crosslinked ethylene/maleic anhydride copolymers; unneutralized crosslinked ethylene/maleic anhydride copolymers (e.g., EMA 81 commercially available from Monsanto); unneutralized crosslinked alkyl ether/acrylate copolymers (e.g., SALCARE™ SC90 commercially available from Allied Colloids); unneutralized crosslinked copolymers of sodium polyacrylate, mineral oil, and PEG-1 trideceth-6 (e.g., SALCARE™ SC91 commercially available from Allied Colloids); unneutralized crosslinked copolymers of methyl vinyl ether and maleic anhydride (e.g., STABILEZE™ QM-PVM/MA copolymer commercially available from International Specialty Products); hydrophobically modified nonionic cellulose polymers; hydrophobically modified ethoxylate urethane polymers (e.g., UCARE™ Polyphobe Series of alkali swellable polymers commercially available from Union Carbide); and combinations thereof. In this context, the term "unneutralized" means that the optional polymer and copolymer gelling agent materials contain unneutralized acid monomers. Preferred gelling agents include water-soluble unneutralized crosslinked ethylene/maleic anhydride copolymers, water-soluble unneutralized crosslinked carboxylic acid polymers, water-soluble hydrophobically modified nonionic cellulose polymers and surfactant/fatty alcohol gel networks such as those suitable for use in hair conditioning products.

The polysaccharide derivatives described herein may be incorporated into hair care compositions and products, such as but not limited to, hair conditioning agents. Hair conditioning agents are well known in the art, see for example Green et al. (WO 0107009), and are available commercially from various sources. Suitable examples of hair conditioning agents include, but are not limited to, cationic polymers, such as cationized guar gum, diallyl quaternary ammonium salt/acrylamide copolymers, quaternized polyvinylpyrrolidone and derivatives thereof, and various polyquaternium-compounds; cationic surfactants, such as stearalkonium chloride, centrimonium chloride, and sapamin hydrochloride; fatty alcohols, such as behenyl alcohol; fatty amines, such as stearyl amine; waxes; esters; nonionic polymers, such as polyvinylpyrrolidone, polyvinyl alcohol, and polyethylene glycol; silicones; siloxanes, such as decamethylcyclopentasiloxane; polymer emulsions, such as amodimethicone; and nanoparticles, such as silica nanoparticles and polymer nanoparticles.

The hair care products may also include additional components typically found in cosmetically acceptable media. Non-limiting examples of such components are disclosed in International Cosmetic Ingredient Dictionary, Ninth Edition, 2002, and CTFA Cosmetic Ingredient Handbook, Tenth Edition, 2004. A non-limiting list of components often included in a cosmetically acceptable medium for hair care are also described by Philippe et al. in U.S. Pat. No. 6,280,747, and by Omura et al. in U.S. Pat. No. 6,139,851 and Cannell et al. in U.S. Pat. No. 6,013,250, all of which are incorporated herein by reference. For example, hair care compositions can be aqueous, alcoholic or aqueous-alcoholic solutions, the alcohol preferably being ethanol or isopropanol, in a proportion of from about 1 to about 75% by weight relative to the total weight, for the aqueous-alcoholic solutions. Additionally, the hair care compositions may contain one or more conventional cosmetic or dermatological additives or adjuvants including but not limited to, antioxidants, preserving agents, fillers, surfactants, UVA and/or UVB sunscreens, fragrances, thickeners, gelling agents, wetting agents and anionic, nonionic or amphoteric polymers, and dyes or pigments.

The hair care compositions and methods may also include at least one coloring agents such as any dye, lake, pigment, and the like that may be used to change the color of hair, skin, or nails. Hair coloring agents are well known in the art (see for example Green et al. supra, *CFTA International Color Handbook*, $2^{nd}$ ed., Micelle Press, England (1992) and *Cosmetic Handbook*, US Food and Drug Administration, FDA/IAS Booklet (1992)), and are available commercially from various sources (for example Bayer, Pittsburgh, Pa.; Ciba-Geigy, Tarrytown, N.Y.; ICI, Bridgewater, N.J.; Sandoz, Vienna, Austria; BASF, Mount Olive, N.J.; and Hoechst, Frankfurt, Germany). Suitable hair coloring agents include, but are not limited to, dyes, such as 4-hydroxypropylamino-3-nitrophenol, 4-amino-3-nitrophenol, 2-amino- 6-chloro-4-nitrophenol, 2-nitro-paraphenylenediamine, N,N-hydroxyethyl-2-nitro-phenylenediamine, 4-nitro-indole, Henna, HC Blue 1, HC Blue 2, HC Yellow 4, HC Red 3, HC Red 5, Disperse Violet 4, Disperse Black 9, HC Blue 7, HC Blue 12, HC Yellow 2, HC Yellow 6, HC Yellow 8, HC Yellow 12, HC Brown 2, D&C Yellow 1, D&C Yellow 3, D&C Blue 1, Disperse Blue 3, Disperse violet 1, eosin derivatives such as D&C Red No. 21 and halogenated fluorescein derivatives such as D&C Red No. 27, D&C Red Orange No. 5 in combination with D&C Red No. 21 and D&C Orange No. 10; and pigments, such as D&C Red No. 36 and D&C Orange No. 17, the calcium lakes of D&C Red Nos. 7, 11, 31 and 34, the barium lake of D&C Red No. 12, the strontium lake of D&C Red No. 13, the aluminum lakes of FD&C Yellow No. 5, of FD&C Yellow No. 6, of D&C Red No. 27, of D&C Red No. 21, and of FD&C Blue No. 1, iron oxides, manganese violet, chromium oxide, titanium dioxide, titanium dioxide nanoparticles, zinc oxide, barium oxide, ultramarine blue, bismuth citrate, and carbon black particles. In one embodiment, the hair coloring agents are D&C Yellow 1 and 3, HC Yellow 6 and 8, D&C Blue 1, HC Blue 1, HC Brown 2, HC Red 5, 2-nitro-paraphenylenediamine, N,N-hydroxyethyl-2-nitro-phenylenediamine, 4-nitro-indole, and carbon black. Metallic and semiconductor nanoparticles may also be used as hair coloring agents due to their strong emission of light (U.S. Patent Application Publication No. 2004-0010864 to Vic et al.).

Hair care compositions may include, but are not limited to, shampoos, conditioners, lotions, aerosols, gels, mousses, and hair dyes.

Personal care products may be in the form of lotions, creams, pastes, balms, ointments, pomades, gels, liquids, or combinations thereof. A personal care product can also be in the form of makeup, lipstick, mascara, rouge, foundation, blush, eyeliner, lip liner, lip gloss, other cosmetics, sunscreen, sun block, nail polish, mousse, hair spray, styling gel, nail conditioner, bath gel, shower gel, body wash, face wash, shampoo, hair conditioner (leave-in or rinse-out), cream rinse, hair dye, hair coloring product, hair shine product, hair serum, hair anti-frizz product, hair split-end repair product, lip balm, skin conditioner, cold cream, moisturizer, body spray, soap, body scrub, exfoliant, astringent, scruffing lotion, depilatory, permanent waving solution, anti-dandruff formulation, antiperspirant composition, deodorant, shaving product, pre-shaving product, after-shaving product, cleanser, skin gel, rinse, dentifrice composition, toothpaste, or mouthwash, for example.

Personal care products can include the polysaccharide derivatives as disclosed herein, and can further comprise personal care active ingredient materials including sun screen agents, moisturizers, humectants, benefiting agents for hair, skin, nails and mouth, depositing agents such as surfactants, occlusive agents, moisture barriers, lubricants, emollients, anti-aging agents, antistatic agents, abrasive, antimicrobials, conditioners, exfoliants, fragrances, viscosifying agents, salts, lipids, phospholipids, vitamins, foam stabilizers, pH modifiers, preservatives, suspending agents, silicone oils, silicone derivatives, essential oils, oils, fats, fatty acids, fatty acid esters, fatty alcohols, waxes, polyols, hydrocarbons, and mixtures thereof.

In certain embodiments, a skin care product can include at least one active ingredient for the treatment or prevention of skin ailments, providing a cosmetic effect, or for providing a moisturizing benefit to skin, such as zinc oxide, petrolatum, white petrolatum, mineral oil, cod liver oil, lanolin, dimethicone, hard fat, vitamin A, allantoin, calamine, kaolin, glycerin, or colloidal oatmeal, and combinations of these. A skin care product may include one or more natural moisturizing factors such as ceramides, hyaluronic acid, glycerin, squalane, amino acids, cholesterol, fatty acids, triglycerides, phospholipids, glycosphingolipids, urea, linoleic acid, glycosaminoglycans, mucopolysaccharide, sodium lactate, or sodium pyrrolidone carboxylate, for example. Other ingredients that may be included in a skin care product include, without limitation, glycerides, apricot kernel oil, canola oil, squalane, squalene, coconut oil, corn oil, jojoba oil, jojoba wax, lecithin, olive oil, safflower oil, sesame oil, shea butter, soybean oil, sweet almond oil, sunflower oil, tea tree oil, shea butter, palm oil, cholesterol, cholesterol esters, wax esters, fatty acids, and orange oil.

The composition can be in any useful form, for example, as powders, granules, pastes, bars, unit dose, or liquid.

The unit dose form may be water-soluble, for example, a water-soluble unit dose article comprising a water-soluble film and a liquid or solid laundry detergent composition, also referred to as a pouch. A water-soluble unit dose pouch comprises a water-soluble film which fully encloses the liquid or solid detergent composition in at least one compartment. The water-soluble unit dose article may comprise a single compartment or multiple compartments. The water-soluble unit dose article may comprise at least two compartments or at least three compartments. The compartments may be arranged in a superposed orientation or in a side-by-side orientation.

A unit dose article is typically a closed structure, made of the water-soluble film enclosing an internal volume which comprises the liquid or solid laundry detergent composition. The pouch can be of any form and shape which is suitable to hold and protect the composition, e.g. without allowing the release of the composition from the pouch prior to contact of the pouch to water.

A liquid detergent composition may be aqueous, typically containing up to about 70% by weight of water and 0% to about 30% by weight of organic solvent. It may also be in the form of a compact gel type containing less than or equal to 30% by weight water.

The polysaccharide derivative comprising a polysaccharide substituted with a) at least one hydrophobic group and b) at least one hydrophilic group, wherein the polysaccharide is poly alpha-1,3-glucan, poly alpha-1,6-glucan, or poly alpha-1,3-1,6-glucan, can be used as an ingredient in the desired product or may be blended with one or more additional suitable ingredients and used as, for example, fabric care applications, laundry care applications, and/or personal care applications. Any of the disclosed compositions, for example, a fabric care, a laundry care or a personal care composition can comprise in the range of 0.01 to 99 percent by weight of the polysaccharide derivative, based on the total dry weight of the composition (dry solids basis). The term "total dry weight" means the weight of the composition excluding any solvent, for example, any water that might be present. In other embodiments, the composition comprises 0.1 to 10% or 0.1 to 9% or 0.5 to 8% or 1 to 7% or 1 to 6% or 1 to 5% or 1 to 4% or 1 to 3% or 5 to 10% or 10 to 15% or 15 to 20% or 20 to 25% or 25 to 30% or 30 to 35% or 35 to 40% or 40 to 45% or 45 to 50% or 50 to 55% or 55 to 60% or 60 to 65% or 65 to 70% or 70 to 75% or 75 to 80% or 80 to 85% or 85 to 90% or 90 to 95% or 95 to 99% by weight of the polysaccharide derivative, wherein the percentages by weight are based on the total dry weight of the composition.

The composition can further comprise at least one of a surfactant, an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil re-deposition agent, a dye, a bactericide, a tarnish inhibitor, an optical brightener, a perfume, a saturated or unsaturated fatty acid, a dye transfer inhibiting agent, a chelating agent, a hueing dye, a calcium cation, a magnesium cation, a visual signaling ingredient, an anti-foam, a structurant, a thickener, an anti-caking agent, a starch, sand, a gelling agents, or a combination thereof. In one embodiment, the enzyme is a cellulase. In another embodiment, the enzyme is a protease. In yet another embodiment, the enzyme is an amylase. In a further embodiment, the enzyme is a lipase.

The composition can be a detergent composition useful for, for example, fabric care, laundry care and/or personal care and may further contain one or more active enzymes. Non-limiting examples of suitable enzymes include proteases, cellulases, hemicellulases, peroxidases, lipolytic enzymes (e.g., metallolipolytic enzymes), xylanases, lipases, phospholipases, esterases (e.g., arylesterase, polyesterase), perhydrolases, cutinases, pectinases, pectate lyases, mannanases, keratinases, reductases, oxidases (e.g., choline oxidase), phenoloxidases, lipoxygenases, ligninases, pullulanases, tannases, pentosanases, malanases, beta-glucanases, arabinosidases, hyaluronidases, chondroitinases, laccases, metalloproteinases, amadoriases, glucoamylases, arabinofuranosidases, phytases, isomerases, transferases, amylases or a combination thereof. If an enzyme(s) is included, it may be present in the composition at about 0.0001 to 0.1% by weight of the active enzyme, based on the total weight of the composition. In other embodiments, the enzyme can be present at about 0.01 to 0.03% by weight of the active enzyme (e.g., calculated as pure enzyme protein) based on the total weight of the composition. In some embodiments, a combination of two or more enzymes can be used in the composition. In some embodiments, the two or more enzymes are cellulase and one or more of proteases, hemicellulases, peroxidases, lipolytic enzymes, xylanases, lipases, phospholipases, esterases, perhydrolases, cutinases, pectinases, pectate lyases, mannanases, keratinases, reductases, oxidases, phenoloxidases, lipoxygenases, ligninases, pullulanases, tannases, pentosanases, malanases, beta-glucanases, arabinosidases, hyaluronidases, chondroitinases, laccases, metalloproteinases, amadoriases, glucoamylases, arabinofuranosidases, phytases, isomerases, transferases, amylases or a combination thereof.

In some embodiments, the composition can comprise one or more enzymes, each enzyme present from about 0.00001% to about 10% by weight, based on the total weight of the composition. In some embodiments, the composition can also comprise each enzyme at a level of about 0.0001% to about 10%, about 0.001% to about 5%, about 0.001% to about 2% or about 0.005% to about 0.5% by weight, based on the total weight of the composition.

A cellulase can have endocellulase activity (EC 3.2.1.4), exocellulase activity (EC 3.2.1.91), or cellobiase activity (EC 3.2.1.21). A cellulase is an "active cellulase" having activity under suitable conditions for maintaining cellulase activity; it is within the skill of the art to determine such suitable conditions. Besides being able to degrade cellulose, a cellulase in certain embodiments can also degrade cellulose ether derivatives such as carboxymethyl cellulose.

The cellulase may be derived from any microbial source, such as a bacteria or fungus. Chemically-modified cellulases or protein-engineered mutant cellulases are included. Suitable cellulases include, for example, cellulases from the genera *Bacillus, Pseudomonas, Streptomyces, Trichoderma, Humicola, Fusarium, Thielavia* and *Acremonium*. As other examples, the cellulase may be derived from *Humicola insolens, Myceliophthora thermophile, Fusarium oxysporum, Trichoderma reesei* or a combination thereof. The cellulase, such as any of the foregoing, can be in a mature form lacking an N-terminal signal peptide. Commercially available cellulases useful herein include CELLUSOFT®, CELLUCLEAN®, CELLUZYME® and CAREZYME® (Novozymes NS); CLAZINASE® and PURADAX® HA and REVITALENZ™ (DuPont Industrial Biosciences), BIOTOUCH® (AB Enzymes); and KAC-500(B)® (Kao Corporation).

Alternatively, a cellulase herein may be produced by any means known in the art, for example, a cellulase may be produced recombinantly in a heterologous expression system, such as a microbial or fungal heterologous expression system. Examples of heterologous expression systems include bacterial (e.g., *E. coli, Bacillus* sp.) and eukaryotic systems. Eukaryotic systems can employ yeast (e.g., *Pichia* sp., *Saccharomyces* sp.) or fungal (e.g., *Trichoderma* sp. such as *T. reesei, Aspergillus* species such as *A. niger*) expression systems, for example.

The cellulase in certain embodiments can be thermostable. Cellulase thermostability refers to the ability of the enzyme to retain activity after exposure to an elevated temperature (e.g. about 60-70° C.) for a period of time (e.g., about 30-60 minutes). The thermostability of a cellulase can be measured by its half-life (t1/2) given in minutes, hours, or days, during which time period half the cellulase activity is lost under defined conditions.

The cellulase in certain embodiments can be stable to a wide range of pH values (e.g. neutral or alkaline pH such as pH of ~7.0 to ~11.0). Such enzymes can remain stable for a predetermined period of time (e.g., at least about 15 min., 30 min., or 1 hour) under such pH conditions.

At least one, two, or more cellulases may be included in the composition. The total amount of cellulase in a composition herein typically is an amount that is suitable for the purpose of using cellulase in the composition (an "effective amount"). For example, an effective amount of cellulase in a composition intended for improving the feel and/or appearance of a cellulose-containing fabric is an amount that produces measurable improvements in the feel of the fabric (e.g., improving fabric smoothness and/or appearance, removing pills and fibrils which tend to reduce fabric appearance sharpness). As another example, an effective amount of cellulase in a fabric stonewashing composition herein is that amount which will provide the desired effect (e.g., to produce a worn and faded look in seams and on fabric panels). The amount of cellulase in a composition herein can also depend on the process parameters in which the composition is employed (e.g., equipment, temperature, time, and the like) and cellulase activity, for example. The effective concentration of cellulase in an aqueous composition in which a fabric is treated can be readily determined by a skilled artisan. In fabric care processes, cellulase can be present in an aqueous composition (e.g., wash liquor) in which a fabric is treated in a concentration that is minimally about 0.01-0.1 ppm total cellulase protein, or about 0.1-10 ppb total cellulase protein (e.g., less than 1 ppm), to maximally about 100, 200, 500, 1000, 2000, 3000, 4000, or 5000 ppm total cellulase protein, for example.

Suitable enzymes are known in the art and can include, for example, MAXATASE®, MAXACAL™, MAXAPEM™, OPTICLEAN®, OPTIMASE®, PROPERASE®, PURAFECT®, PURAFECT® OXP, PURAMAX™, EXCEL- LASE™, PREFERENZ™ proteases (e.g. P100, P110, P280), EFFECTENZ™ proteases (e.g. P1000, P1050, P2000), EXCELLENZ™ proteases (e.g. P1000), ULTIMASE®, and PURAFAST™ (Genencor); ALCALASE®, SAVINASE®, PRIMASE®, DURAZYM™, POLARZYME®, OVOZYME®, KANNASE®, LIQUANASE®, NEUTRASE®, RELASE® and ESPERASE® (Novozymes); BLAP™ and BLAP™ variants (Henkel Kommanditgesellschaft auf Aktien, Duesseldorf, Germany), and KAP (*B. alkalophilus* subtilisin; Kao Corp., Tokyo, Japan) proteases; MANNASTAR®, PURABRITE™, and MANNAWAY® mannanases; M1 LIPASE™, LUMA FAST™, and LIPOMAX™ (Genencor); LIPEX®, LIPOLASE® and LIPOLASE® ULTRA (Novozymes); and LIPASE P™ "Amano" (Amano Pharmaceutical Co. Ltd., Japan) lipases; STAINZYME®, STAINZYME PLUS®, NATALASE®, DURAMYL®, TERMAMYL®, TERMAMYL ULTRA®, FUNGAMYL® and BAN™ (Novo Nordisk NS and Novozymes NS); RAPIDASE®, POWERASE®, PURASTAR® and PREFERENZ™ (DuPont Industrial Biosciences) amylases; GUARDZYME™ (Novo Nordisk NS and Novozymes NS) peroxidases or a combination thereof.

In some embodiments, the enzymes in the composition can be stabilized using conventional stabilizing agents, e.g., a polyol such as propylene glycol or glycerol; a sugar or sugar alcohol; lactic acid; boric acid or a boric acid derivative (e.g., an aromatic borate ester).

A detergent composition herein typically comprises one or more surfactants, wherein the surfactant is selected from nonionic surfactants, anionic surfactants, cationic surfactants, ampholytic surfactants, zwitterionic surfactants, semipolar nonionic surfactants and mixtures thereof. The surfactant may be petroleum-derived (also referred to as synthetic) or non-petroleum-derived (also referred to as natural). In some embodiments, the surfactant is present at a level of from about 0.1% to about 60%, while in alternative embodiments the level is from about 1% to about 50%, while in still further embodiments the level is from about 5% to about 40%, by weight of the cleaning composition. A detergent will usually contain 0% to about 50% by weight of an anionic surfactant such as linear alkylbenzenesulfonate (LAS), alpha-olefinsulfonate (AOS), alkyl sulfate (fatty alcohol sulfate) (AS), alcohol ethoxysulfate (AEOS or AES), secondary alkanesulfonates (SAS), alpha-sulfo fatty acid methyl esters, alkyl- or alkenylsuccinic acid, or soap.

The detergent composition may comprise an alcohol ethoxysulfate of the formula $R^1$—$(OCH_2CH_2)_x$—O—$SO_3M$, wherein $R^1$ is a non-petroleum derived, linear or branched fatty alcohol consisting of even numbered carbon chain lengths of from about $C_8$ to about $C_{20}$, and wherein x is from about 0.5 to about 8, and where M is an alkali metal or ammonium cation. The fatty alcohol portion of the alcohol ethoxysulfate ($R^1$) is derived from a renewable source (e.g., animal or plant derived) rather than geologically derived (e.g., petroleum-derived). Fatty alcohols derived from a renewable source may be referred to as natural fatty alcohols. Natural fatty alcohols have an even number of carbon atoms with a single alcohol (—OH) attached to the terminal carbon. The fatty alcohol portion of the surfactant ($R^1$) may comprise distributions of even number carbon chains, e.g., C12, C14, C16, C18, and so forth.

In addition, a detergent composition may optionally contain 0 wt % to about 40 wt % of a nonionic surfactant such as alcohol ethoxylate (AEO or AE), carboxylated alcohol ethoxylates, nonylphenol ethoxylate, alkylpolyglycoside, alkyldimethylamineoxide, ethoxylated fatty acid monoethanolamide, fatty acid monoethanolamide, or polyhydroxy alkyl fatty acid amide. The detergent composition may comprise an alcohol ethoxylate of formula $R^2$—$(OCH_2CH_2)_y$—OH, wherein $R^2$ is a non-petroleum derived, linear or branched fatty alcohol consisting of even numbered carbon chain lengths of from about $C_{10}$ to about $C_{18}$, and wherein y is from about 0.5 to about 15. The fatty alcohol portion of the alcohol ethoxylate ($R^2$) is derived from a renewable source (e.g., animal or plant derived) rather than geologically derived (e.g., petroleum-derived). The fatty alcohol portion of the surfactant ($R^2$) may comprise distributions of even number carbon chains, e.g., C12, C14, C16, C18, and so forth.

The composition can further comprise one or more detergent builders or builder systems. In some embodiments incorporating at least one builder, the compositions comprise at least about 1%, from about 3% to about 60% or from about 5% to about 40% by weight of the builder, based on the total weight of the composition. Builders include, for example, the alkali metal, ammonium and/or alkanolammonium salts of polyphosphates, alkali metal silicates, alkaline earth and alkali metal carbonates, aluminosilicates, polycarboxylate compounds, ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, citric acid, oxydisuccinic acid, polymaleic acid, benzene 1,3,5-tricarboxylic acid, carboxymethyloxysuccinic acid, and soluble salts thereof. Examples of a detergent builder or complexing agent include zeolite, diphosphate, triphosphate, phosphonate, citrate, nitrilotriacetic acid (NTA), ethylenediaminetetraacetic acid (EDTA), diethylenetriaminepentaacetic acid (DTMPA), alkyl- or alkenylsuccinic acid, soluble silicates or layered silicates (e.g., SKS-6 from Hoechst). A detergent may also be unbuilt, i.e., essentially free of detergent builder.

The composition can further comprise at least one chelating agent. Suitable chelating agents include, for example, copper, iron and/or manganese chelating agents and mixtures thereof. In some embodiments in which at least one chelating agent is used, the compositions comprise from about 0.1% to about 15% or even from about 3.0% to about 10% by weight of the chelating agent, based on the total weight of the composition.

The composition can further comprise at least one deposition aid. Suitable deposition aids include, for example, polyethylene glycol, polypropylene glycol, polycarboxylate, soil release polymers such as polytelephthalic acid, clays such as kaolinite, montmorillonite, atapulgite, illite, bentonite, halloysite, or a combination thereof.

The composition can further comprise one or more dye transfer inhibiting agents. Suitable dye transfer inhibiting agents include, for example, polyvinylpyrrolidone polymers, polyamine N-oxide polymers, copolymers of N-vinylpyrrolidone and N-vinylimidazole, polyvinyloxazolidones, polyvinylimidazoles, manganese phthalocyanine, peroxidases, polyvinylpyrrolidone polymers, ethylene-diamine-tetraacetic acid (EDTA); diethylene triamine penta methylene phosphonic acid (DTPMP); hydroxy-ethane diphosphonic acid (HEDP); ethylenediamine N,N'-disuccinic acid (EDDS); methyl glycine diacetic acid (MGDA); diethylene triamine penta acetic acid (DTPA); propylene diamine tetracetic acid (PDT A); 2-hydroxypyridine-N-oxide (HPNO); or methyl glycine diacetic acid (MGDA); glutamic acid N,N-diacetic acid (N,N-dicarboxymethyl glutamic acid tetrasodium salt (GLDA); nitrilotriacetic acid (NTA); 4,5-dihydroxy-m-benzenedisulfonic acid; citric acid and any salts thereof; N-hydroxyethylethylenediaminetriacetic acid (HEDTA), triethylenetetraaminehexaacetic acid (TTNA), N-hydroxyethyliminodiacetic acid (HEIDA), dihydroxyethylglycine (DHEG), ethylenediaminetetrapropionic acid (EDTP) and derivatives thereof or a combination thereof. In embodiments in which at least one dye transfer inhibiting agent is used, the compositions can comprise from about 0.0001% to about 10%, from about 0.01% to about 5%, or even from about 0.1% to about 3% by weight of the dye transfer inhibiting agent, based on the total weight of the composition.

The composition can further comprise silicates. Suitable silicates can include, for example, sodium silicates, sodium disilicate, sodium metasilicate, crystalline phyllosilicates or a combination thereof. In some embodiments, silicates can be present at a level of from about 1% to about 20% by weight, based on the total weight of the composition. In other embodiments, silicates can be present at a level of from about 5% to about 15% by weight, based on the total weight of the composition.

The composition can further comprise dispersants. Suitable water-soluble organic materials can include, for example, homo- or co-polymeric acids or their salts, in which the polycarboxylic acid comprises at least two carboxyl radicals separated from each other by not more than two carbon atoms.

The composition can further comprise one or more other types of polymers in addition to the present poly alpha-1,3-glucan, poly alpha-1,6-glucan, or poly alpha-1,3-1,6-glucan derivatives. Examples of other types of polymers useful herein include carboxymethyl cellulose (CMC), poly(vinylpyrrolidone) (PVP), polyethylene glycol (PEG), poly (vinyl alcohol) (PVA), polycarboxylates such as polyacrylates, maleic/acrylic acid copolymers and lauryl methacrylate/acrylic acid copolymers.

The composition can further comprise a bleaching system. For example, the bleaching system can comprise an $H_2O_2$ source such as perborate, percarbonate, perhydrate salts, mono or tetra hydrate sodium salt of perborate, persulfate, perphosphate, persilicate, percarboxylic acids and salts, percarbonic acids and salts, perimidic acids and salts, peroxymonosulfuric acids and salts, sulfonated zinc phthalocyanines, sulfonated aluminum phthalocyanines, xanthene dyes which may be combined with a peracid-forming bleach activator such as, for example, dodecanoyl oxybenzene sulfonate, decanoyl oxybenzene sulfonate, decanoyl oxybenzoic acid or salts thereof, tetraacetylethylenediamine (TAED) or nonanoyloxybenzenesulfonate (NOBS). Alternatively, a bleaching system may comprise peroxyacids (e.g., amide, imide, or sulfone type peroxyacids). In other embodiments, the bleaching system can be an enzymatic bleaching system comprising perhydrolase. Combinations of any of the above may also be used.

The composition can further comprise conventional detergent ingredients such as fabric conditioners, clays, foam boosters, suds suppressors, anti-corrosion agents, soil-suspending agents, anti-soil redeposition agents, dyes, bactericides, tarnish inhibiters, optical brighteners, or perfumes. The pH of a detergent composition herein (measured in aqueous solution at use concentration) can be neutral or alkaline (e.g., pH of about 7.0 to about 11.0).

The composition can be a detergent composition and optionally, a heavy duty (all purpose) laundry detergent composition. In some embodiments, the detergent composition can comprise a detersive surfactant (10%-40% wt/wt), including an anionic detersive surfactant (selected from a group of linear or branched or random chain, substituted or unsubstituted alkyl sulphates, alkyl sulphonates, alkyl alkoxylated sulphate, alkyl phosphates, alkyl phosphonates, alkyl carboxylates, and/or mixtures thereof), and optionally non-ionic surfactant (selected from a group of linear or branched or random chain, substituted or unsubstituted alkyl alkoxylated alcohol, e.g., $C_8$-$C_{18}$ alkyl ethoxylated alcohols and/or $C_6$-$C_{12}$ alkyl phenol alkoxylates), where the weight ratio of anionic detersive surfactant (with a hydrophilic index (HIc) of from 6.0 to 9) to non-ionic detersive surfactant is greater than 1:1. Suitable detersive surfactants also include cationic detersive surfactants (selected from a group of alkyl pyridinium compounds, alkyl quaternary ammonium compounds, alkyl quaternary phosphonium compounds, alkyl ternary sulphonium compounds, and/or mixtures thereof); zwitterionic and/or amphoteric detersive surfactants (selected from a group of alkanolamine sulphobetaines); ampholytic surfactants; semi-polar non-ionic surfactants and mixtures thereof.

The composition can be a detergent composition, optionally including, for example, a surfactancy boosting polymer consisting of amphiphilic alkoxylated grease cleaning polymers. Suitable amphiphilic alkoxylated grease cleaning polymers can include, for example, alkoxylated polymers having branched hydrophilic and hydrophobic properties, such as alkoxylated polyalkylenimines, random graft polymers comprising a hydrophilic backbone comprising monomers, for example, unsaturated C1-C6 carboxylic acids, ethers, alcohols, aldehydes, ketones, esters, sugar units, alkoxy units, maleic anhydride, saturated polyalcohols such as glycerol, and mixtures thereof; and hydrophobic side chain(s), for example, one or more C4-C25 alkyl groups, polypropylene, polybutylene, vinyl esters of saturated C1-C6 mono-carboxylic acids, C1-C6 alkyl esters of acrylic or methacrylic acid, and mixtures thereof.

Suitable heavy duty laundry detergent compositions can optionally include additional polymers such as soil release polymers (include anionically end-capped polyesters, for example SRP1, polymers comprising at least one monomer unit selected from saccharide, dicarboxylic acid, polyol and combinations thereof, in random or block configuration, ethylene terephthalate-based polymers and co-polymers thereof in random or block configuration, for example REPEL-O-TEX SF, SF-2 AND SRP6, TEXCARE SRA100, SRA300, SRN100, SRN170, SRN240, SRN300 AND SRN325, MARLOQUEST SL), anti-redeposition polymers, include carboxylate polymers, such as polymers comprising at least one monomer selected from acrylic acid, maleic acid (or maleic anhydride), fumaric acid, itaconic acid, aconitic acid, mesaconic acid, citraconic acid, methylenemalonic acid, and any mixture thereof, vinylpyrrolidone homopolymer, and/or polyethylene glycol, molecular weight in the range of from 500 to 100,000 Daltons (Da); and polymeric carboxylate (such as maleate/acrylate random copolymer or polyacrylate homopolymer). If present, soil release polymers can be included at 0.1 to 10% by weight, based on the total weight of the composition.

The heavy duty laundry detergent composition can optionally further include saturated or unsaturated fatty acids, preferably saturated or unsaturated C12-C24 fatty acids; deposition aids, for example, polysaccharides, cellulosic polymers, poly diallyl dimethyl ammonium halides (DADMAC), and co-polymers of DADMAC with vinyl pyrrolidone, acrylamides, imidazoles, imidazolinium halides, and mixtures thereof, in random or block configuration, cationic guar gum, cationic starch, cationic polyacylamides or a combination thereof. If present, the fatty acids and/or the deposition aids can each be present at 0.1% to 10% by weight, based on the total weight of the composition.

The detergent composition may optionally include silicone or fatty-acid based suds suppressors; hueing dyes, calcium and magnesium cations, visual signaling ingredients, anti-foam (0.001% to about 4.0% by weight, based on the total weight of the composition), and/or a structurant/thickener (0.01% to 5% by weight, based on the total weight of the composition) selected from the group consisting of diglycerides and triglycerides, ethylene glycol distearate, microcrystalline cellulose, microfiber cellulose, biopolymers, xanthan gum, gellan gum, and mixtures thereof).

The compositions disclosed herein can be in the form of a dishwashing detergent composition. Examples of dishwashing detergents include automatic dishwashing detergents (typically used in dishwasher machines) and handwashing dish detergents. A dishwashing detergent composition can be in any dry or liquid/aqueous form as disclosed herein, for example. Components that may be included in certain embodiments of a dishwashing detergent composition include, for example, one or more of a phosphate; oxygen- or chlorine-based bleaching agent; non-ionic surfactant; alkaline salt (e.g., metasilicates, alkali metal hydroxides, sodium carbonate); any active enzyme disclosed herein; anti-corrosion agent (e.g., sodium silicate); anti-foaming agent; additives to slow down the removal of glaze and patterns from ceramics; perfume; anti-caking agent (in granular detergent); starch (in tablet-based detergents); gelling agent (in liquid/gel based detergents); and/or sand (powdered detergents).

In addition to the polysaccharide derivative, dishwashing detergent compositions can comprise (i) a non-ionic surfactant, including any ethoxylated non-ionic surfactant, alcohol alkoxylated surfactant, epoxy-capped poly(oxyalkylated) alcohol, or amine oxide surfactant present in an amount from 0 to 10% by weight; (ii) a builder, in the range of about 5 to 60% by weight, including any phosphate builder (e.g., mono-phosphates, di-phosphates, tri-polyphosphates, other oligomeric-polyphosphates, sodium tripolyphosphate-STPP), any phosphate-free builder (e.g., amino acid-based compounds including methyl-glycine-diacetic acid [MGDA] and salts or derivatives thereof, glutamic-N,N-diacetic acid [GLDA] and salts or derivatives thereof, iminodisuccinic acid (IDS) and salts or derivatives thereof, carboxy methyl inulin and salts or derivatives thereof, nitrilotriacetic acid [NTA], diethylene triamine penta acetic acid [DTPA], B-alaninediacetic acid [B-ADA] and salts thereof), homopolymers and copolymers of poly-carboxylic acids and partially or completely neutralized salts thereof, monomeric polycarboxylic acids and hydroxycarboxylic acids and salts thereof in the range of 0.5 to 50% by weight, or sulfonated/carboxylated polymers in the range of about 0.1% to about 50% by weight; (iii) a drying aid in the range of about 0.1% to about 10% by weight (e.g., polyesters, especially anionic polyesters, optionally together with further monomers with 3 to 6 functionalities, for example, acid, alcohol or ester functionalities which are conducive to polycondensation, polycarbonate-, polyurethane- and/or polyurea-polyorganosiloxane compounds or precursor compounds thereof, particularly of the reactive cyclic carbonate and urea type); (iv) a silicate in the range from about 1% to about 20% by weight (e.g., sodium or potassium silicates such as sodium disilicate, sodium meta-silicate and crystalline phyllosilicates); (v) an inorganic bleach (e.g., perhydrate salts such as perborate, percarbonate, perphosphate, persulfate and persilicate salts) and/or an organic bleach, for example, organic peroxyacids such as diacyl- and tetraacylperoxides, especially diperoxydodecanedioic acid, diperoxytetradecanedioic acid, and diperoxyhexadecanedioic acid; (vi) a bleach activator, for example, organic peracid precursors in the range from about 0.1% to about 10% by weight and/or bleach catalyst (e.g., manganese triazacyclononane and related complexes; Co, Cu, Mn, and Fe bispyridylamine and related complexes; and pentamine acetate cobalt(III) and related complexes); (vii) a metal care agent in the range from about 0.1% to 5% by weight, for example, benzatriazoles, metal salts and complexes, and/or silicates; and/or (viii) any active enzyme disclosed herein in the range from about 0.01 to 5.0 mg of active enzyme per gram of automatic dishwashing detergent composition, and an enzyme stabilizer component. The percentages by weight are based on the total weight of the composition.

Various examples of detergent formulations comprising at least one polysaccharide derivative are disclosed below (1-21):

1) A detergent composition formulated as a granulate having a bulk density of at least 600 g/L comprising: linear alkylbenzenesulfonate (calculated as acid) at about 7 to 12% by weight; alcohol ethoxysulfate (e.g., C12-18 alcohol, 1-2 ethylene oxide [EO]) or alkyl sulfate (e.g., C16-18) at about 1 to 4% by weight; alcohol ethoxylate (e.g., C14-15 alcohol) at about 5 to 9% by weight; sodium carbonate at about 14 to 20% by weight; soluble silicate (e.g., $Na_2O$ $2SiO_2$) at about 2 to 6% by weight; zeolite (e.g., $NaAlSiO_4$) at about 15 to 22% by weight; sodium sulfate at about 0 to 6% by weight; sodium citrate/citric acid at about 0 to 15% by weight; sodium perborate at about 11 to 18% by weight; TAED at about 2 to 6% by weight; polysaccharide derivative up to about 2% by weight; other polymers (e.g., maleic/acrylic acid copolymer, PVP, PEG) at about 0 to 3% by weight; optionally an enzyme(s) (calculated as pure enzyme protein) at about 0.0001 to 0.1% by weight; and minor ingredients (e.g., suds suppressors, perfumes, optical brightener, photobleach) at about 0 to 5% by weight.

2) A detergent composition formulated as a granulate having a bulk density of at least 600 g/L comprising: linear alkylbenzenesulfonate (calculated as acid) at about 6 to 11% by weight; alcohol ethoxysulfate (e.g., C12-18 alcohol, 1-2 EO) or alkyl sulfate (e.g., C16-18) at about 1 to 3% by weight; alcohol ethoxylate (e.g., $C_{14}$-15 alcohol) at about 5 to 9% by weight; sodium carbonate at about 15 to 21% by weight; soluble silicate (e.g., $Na_2O$ $2SiO_2$) at about 1 to 4% by weight; zeolite (e.g., $NaAlSiO_4$) at about 24 to 34% by weight; sodium sulfate at about 4 to 10% by weight; sodium citrate/citric acid at about 0 to 15% by weight; sodium perborate at about 11 to 18% by weight; TAED at about 2 to 6% by weight; polysaccharide derivative up to about 2% by weight; other polymers (e.g., maleic/acrylic acid copolymer, PVP, PEG) at about 1 to 6% by weight; optionally an enzyme(s) (calculated as pure enzyme protein) at about 0.0001 to 0.1% by weight; and minor ingredients (e.g., suds suppressors, perfumes, optical brightener, photobleach) at about 0 to 5% by weight.

3) A detergent composition formulated as a granulate having a bulk density of at least 600 g/L comprising: linear alkylbenzenesulfonate (calculated as acid) at about 5 to 9% by weight; alcohol ethoxysulfate (e.g., C12-18 alcohol, 7 EO) at about 7 to 14% by weight; soap as fatty acid (e.g., C16-22 fatty acid) at about 1 to 3% by weight; sodium carbonate at about 10 to 17% by weight; soluble silicate (e.g., Na$_2$O 2SiO$_2$) at about 3 to 9% by weight; zeolite (e.g., NaAlSiO$_4$) at about 23 to 33% by weight; sodium sulfate at about 0 to 4% by weight; sodium perborate at about 8 to 16% by weight; TAED at about 2 to 8% by weight; phosphonate (e.g., EDTMPA) at about 0 to 1% by weight; polysaccharide derivative up to about 2% by weight; other polymers (e.g., maleic/acrylic acid copolymer, PVP, PEG) at about 0 to 3% by weight; optionally an enzyme(s) (calculated as pure enzyme protein) at about 0.0001 to 0.1% by weight; and minor ingredients (e.g., suds suppressors, perfumes, optical brightener) at about 0 to 5% by weight.

4) A detergent composition formulated as a granulate having a bulk density of at least 600 g/L comprising: linear alkylbenzene sulfonate (calculated as acid) at about 8 to 12% by weight; alcohol ethoxylate (e.g., C12-18 alcohol, 7 EO) at about 10 to 25% by weight; sodium carbonate at about 14 to 22% by weight; soluble silicate (e.g., Na$_2$O 2SiO$_2$) at about 1 to 5% by weight; zeolite (e.g., NaAlSiO$_4$) at about 25 to 35% by weight; sodium sulfate at about 0 to 10% by weight; sodium perborate at about 8 to 16% by weight; TAED at about 2 to 8% by weight; phosphonate (e.g., EDTMPA) at about 0 to 1% by weight; polysaccharide derivative up to about 2% by weight; other polymers (e.g., maleic/acrylic acid copolymer, PVP, PEG) at about 1 to 3% by weight; optionally an enzyme(s) (calculated as pure enzyme protein) at about 0.0001 to 0.1% by weight; and minor ingredients (e.g., suds suppressors, perfumes) at about 0 to 5% by weight.

5) An aqueous liquid detergent composition comprising: linear alkylbenzenesulfonate (calculated as acid) at about 15 to 21% by weight; alcohol ethoxylate (e.g., C12-18 alcohol, 7 EO; or C12-15 alcohol, 5 EO) at about 12 to 18% by weight; soap as fatty acid (e.g., oleic acid) at about 3 to 13% by weight; alkenylsuccinic acid (C12-14) at about 0 to 13% by weight; aminoethanol at about 8 to 18% by weight; citric acid at about 2 to 8% by weight; phosphonate at about 0 to 3% by weight; polysaccharide derivative up to about 2% by weight; other polymers (e.g., PVP, PEG) at about 0 to 3% by weight; borate at about 0 to 2% by weight; ethanol at about 0 to 3% by weight; propylene glycol at about 8 to 14% by weight; optionally an enzyme(s) (calculated as pure enzyme protein) at about 0.0001 to 0.1% by weight; and minor ingredients (e.g., dispersants, suds suppressors, perfume, optical brightener) at about 0 to 5% by weight.

6) An aqueous structured liquid detergent composition comprising: linear alkylbenzenesulfonate (calculated as acid) at about 15 to 21% by weight; alcohol ethoxylate (e.g., C12-18 alcohol, 7 EO; or C12-15 alcohol, 5 EO) at about 3 to 9% by weight; soap as fatty acid (e.g., oleic acid) at about 3 to 10% by weight; zeolite (e.g., NaAlSiO$_4$) at about 14 to 22% by weight; potassium citrate about 9 to 18% by weight; borate at about 0 to 2% by weight; polysaccharide derivative up to about 2% by weight; other polymers (e.g., PVP, PEG) at about 0 to 3% by weight; ethanol at about 0 to 3% by weight; anchoring polymers (e.g., lauryl methacrylate/acrylic acid copolymer, molar ratio 25:1, MW 3800) at about 0 to 3% by weight; glycerol at about 0 to 5% by weight; optionally an enzyme(s) (calculated as pure enzyme protein) at about 0.0001 to 0.1% by weight; and minor ingredients (e.g., dispersants, suds suppressors, perfume, optical brightener) at about 0 to 5% by weight.

7) A detergent composition formulated as a granulate having a bulk density of at least 600 g/L comprising: fatty alcohol sulfate at about 5 to 10% by weight, ethoxylated fatty acid monoethanolamide at about 3 to 9% by weight; soap as fatty acid at about 0 to 3% by weight; sodium carbonate at about 5 to 10% by weight; soluble silicate (e.g., Na$_2$O 2SiO$_2$) at about 1 to 4% by weight; zeolite (e.g., NaAlSiO$_4$) at about 20 to 40% by weight; sodium sulfate at about 2 to 8% by weight; sodium perborate at about 12 to 18% by weight; TAED at about 2 to 7% by weight; polysaccharide derivative up to about 2% by weight; other polymers (e.g., maleic/acrylic acid copolymer, PEG) at about 1 to 5% by weight; optionally an enzyme(s) (calculated as pure enzyme protein) at about 0.0001 to 0.1% by weight; and minor ingredients (e.g., optical brightener, suds suppressors, perfumes) at about 0 to 5% by weight.

8) A detergent composition formulated as a granulate comprising: linear alkylbenzenesulfonate (calculated as acid) at about 8 to 14% by weight; ethoxylated fatty acid monoethanolamide at about 5 to 11% by weight; soap as fatty acid at about 0 to 3% by weight; sodium carbonate at about 4 to 10% by weight; soluble silicate (e.g., Na$_2$O 2SiO$_2$) at about 1 to 4% by weight; zeolite (e.g., NaAlSiO$_4$) at about 30 to 50% by weight; sodium sulfate at about 3 to 11% by weight; sodium citrate at about 5 to 12% by weight; polysaccharide derivative up to about 2% by weight; other polymers (e.g., PVP, maleic/acrylic acid copolymer, PEG) at about 1 to 5% by weight; optionally an enzyme(s) (calculated as pure enzyme protein) at about 0.0001 to 0.1% by weight; and minor ingredients (e.g., suds suppressors, perfumes) at about 0 to 5% by weight.

9) A detergent composition formulated as a granulate comprising: linear alkylbenzenesulfonate (calculated as acid) at about 6 to 12% by weight; nonionic surfactant at about 1 to 4% by weight; soap as fatty acid at about 2 to 6% by weight; sodium carbonate at about 14 to 22% by weight; zeolite (e.g., NaAlSiO$_4$) at about 18 to 32% by weight; sodium sulfate at about 5 to 20% by weight; sodium citrate at about 3 to 8% by weight; sodium perborate at about 4 to 9% by weight; bleach activator (e.g., NOBS or TAED) at about 1 to 5% by weight; polysaccharide derivative up to about 2% by weight; other polymers (e.g., polycarboxylate or PEG) at about 1 to 5% by weight; optionally an enzyme(s) (calculated as pure enzyme protein) at about 0.0001 to 0.1% by weight; and minor ingredients (e.g., optical brightener, perfume) at about 0 to 5% by weight.

10) An aqueous liquid detergent composition comprising: linear alkylbenzenesulfonate (calculated as acid) at about 15 to 23% by weight; alcohol ethoxysulfate (e.g., C$_{12-15}$ alcohol, 2-3 EO) at about 8 to 15% by weight; alcohol ethoxylate (e.g., C$_{12-15}$ alcohol, 7 EO; or C$_{12-15}$ alcohol, 5 EO) at about 3 to 9% by weight; soap as fatty acid (e.g., lauric acid) at about 0 to 3% by weight; aminoethanol at about 1 to 5% by weight; sodium citrate at about 5 to 10% by weight; hydrotrope (e.g., sodium cumene sulfonate) at about 2 to 6% by weight; borate at about 0 to 2% by weight; polysaccharide derivative up to about 1% by weight; ethanol at about 1 to 3% by weight; propylene glycol at about 2 to 5% by weight; optionally an enzyme(s) (calculated as pure enzyme protein) at about 0.0001 to 0.1% by weight; and minor ingredients (e.g., dispersants, perfume, optical brighteners) at about 0 to 5% by weight.

11) An aqueous liquid detergent composition comprising: linear alkylbenzenesulfonate (calculated as acid) at about 20 to 32% by weight; alcohol ethoxylate (e.g., C12-15 alcohol, 7 EO; or C12-15 alcohol, 5 EO) at about 6 to 12% by weight; aminoethanol at about 2 to 6% by weight; citric acid at about 8 to 14% by weight; borate at about 1 to 3% by weight; polysaccharide derivative up to about 2% by weight; ethanol at about 1 to 3% by weight; propylene glycol at about 2 to 5% by weight; other polymers (e.g., maleic/acrylic acid copolymer, anchoring polymer such as lauryl methacrylate/acrylic acid copolymer) at about 0 to 3% by weight; glycerol at about 3 to 8% by weight; optionally an enzyme(s) (calculated as pure enzyme protein) at about 0.0001 to 0.1% by weight; and minor ingredients (e.g., hydrotropes, dispersants, perfume, optical brighteners) at about 0 to 5% by weight.

12) A detergent composition formulated as a granulate having a bulk density of at least 600 g/L comprising: anionic surfactant (e.g., linear alkylbenzenesulfonate, alkyl sulfate, alpha-olefinsulfonate, alpha-sulfo fatty acid methyl esters, alkanesulfonates, soap) at about 25 to 40% by weight; nonionic surfactant (e.g., alcohol ethoxylate) at about 1 to 10% by weight; sodium carbonate at about 8 to 25% by weight; soluble silicate (e.g., $Na_2O\ 2SiO_2$) at about 5 to 15% by weight; sodium sulfate at about 0 to 5% by weight; zeolite ($NaAlSiO_4$) at about 15 to 28% by weight; sodium perborate at about 0 to 20% by weight; bleach activator (e.g., TAED or NOBS) at about 0 to 5% by weight; polysaccharide derivative up to about 2% by weight; optionally an enzyme(s) (calculated as pure enzyme protein) at about 0.0001 to 0.1% by weight; and minor ingredients (e.g., perfume, optical brighteners) at about 0 to 3% by weight.

13) Detergent compositions as described in (1)-(12) above, but in which all or part of the linear alkylbenzenesulfonate is replaced by C12-C18 alkyl sulfate.

14) A detergent composition formulated as a granulate having a bulk density of at least 600 g/L comprising: C12-C18 alkyl sulfate at about 9 to 15% by weight; alcohol ethoxylate at about 3 to 6% by weight; polyhydroxy alkyl fatty acid amide at about 1 to 5% by weight; zeolite (e.g., $NaAlSiO_4$) at about 10 to 20% by weight; layered disilicate (e.g., SK56 from Hoechst) at about 10 to 20% by weight; sodium carbonate at about 3 to 12% by weight; soluble silicate (e.g., $Na_2O\ 2SiO_2$) at 0 to 6% by weight; sodium citrate at about 4 to 8% by weight; sodium percarbonate at about 13 to 22% by weight; TAED at about 3 to 8% by weight; polysaccharide derivative up to about 2% by weight; other polymers (e.g., polycarboxylates and PVP) at about 0 to 5% by weight; optionally an enzyme(s) (calculated as pure enzyme protein) at about 0.0001 to 0.1% by weight; and minor ingredients (e.g., optical brightener, photobleach, perfume, suds suppressors) at about 0 to 5% by weight.

15) A detergent composition formulated as a granulate having a bulk density of at least 600 g/L comprising: C12-C18 alkyl sulfate at about 4 to 8% by weight; alcohol ethoxylate at about 11 to 15% by weight; soap at about 1 to 4% by weight; zeolite MAP or zeolite A at about 35 to 45% by weight; sodium carbonate at about 2 to 8% by weight; soluble silicate (e.g., $Na_2O\ 2SiO_2$) at 0 to 4% by weight; sodium percarbonate at about 13 to 22% by weight; TAED at about 1 to 8% by weight; polysaccharide derivative up to about 3% by weight; other polymers (e.g., polycarboxylates and PVP) at about 0 to 3% by weight; optionally an enzyme(s) (calculated as pure enzyme protein) at about 0.0001 to 0.1% by weight; and minor ingredients (e.g., optical brightener, phosphonate, perfume) at about 0 to 3% by weight.

16) Detergent formulations as described in (1) to (15) above, but that contain a stabilized or encapsulated peracid, either as an additional component or as a substitute for an already specified bleach system(s).

17) Detergent compositions as described in (1), (3), (7), (9) and (12) above, but in which perborate is replaced by percarbonate.

18) Detergent compositions as described in (1), (3), (7), (9), (12), (14) and (15) above, but that additionally contain a manganese catalyst. A manganese catalyst, for example, is one of the compounds described by Hage et al. (1994, Nature 369:637-639), which is incorporated herein by reference.

19) Detergent compositions formulated as a non-aqueous detergent liquid comprising a liquid non-ionic surfactant, for example, a linear alkoxylated primary alcohol, a builder system (e.g., phosphate), polysaccharide derivative, optionally an enzyme(s), and alkali. The detergent may also comprise an anionic surfactant and/or bleach system.

20) An aqueous liquid detergent composition comprising: non-petroleum-derived alcohol ethoxysulfate (e.g., C12 alcohol, 1 EO) sodium sulfate at about 30 to 45% by weight; non-petroleum-derived alcohol ethoxylate (e.g., C12-14 alcohol, 9 EO) at about 3 to 10% by weight; soap as fatty acid (e.g., C12-18) at about 1 to 5% by weight; propylene glycol at about 5-12% by weight; C12-14 alkyl amineoxide at about 4 to 8% by weight; citric acid at about 2 to 8% by weight; polysaccharide derivative up to about 4% by weight; other polymers (e.g., PVP, PEG) at about 0 to 3% by weight; borate at about 0 to 4% by weight; ethanol at about 0 to 3% by weight; optionally an enzyme(s) (calculated as pure enzyme protein) at about 0.0001 to 0.3% by weight; and minor ingredients (e.g., dispersants, suds suppressors, perfume, optical brightener, stabilizers) at about 0 to 5% by weight and the balance being water.

21) A water-soluble unit dose detergent composition comprising: alcohol ethoxysulfate (e.g., C12-15 alcohol, 2-3 EO) sodium sulfate at about 10 to 25% by weight; linear alkylbenzenesulfonate (calculated as acid) at about 15 to 25% by weight; alcohol ethoxylate (e.g., C12-14 alcohol, 9 EO) at about 0.5 to 10% by weight; alcohol ethoxylate (e.g., C12-15 alcohol, 7 EO) at about 0.5 to 10% by weight; soap as fatty acid (e.g., C12-18) at about 1 to 8% by weight; propylene glycol at about 6 to 15% by weight; citric acid at about 0.5 to 8% by weight; polysaccharide derivative up to about 4% by weight; monoethanolamine at about 5 to 10% by weight, other polymers (e.g., PVP, PEG, PVOH) at about 0 to 3% by weight; dipropyleneglycol at about 2 to 6%, glycerine at about 2 to 5% by weight; optionally an enzyme(s) (calculated as pure enzyme protein) at about 0.0001 to 0.3% by weight; and minor ingredients (e.g., dispersants, suds suppressors, perfume, optical brightener, stabilizers) at about 0 to 5% by weight and the balance being water.

Various examples of personal care formulations comprising at least one polysaccharide derivative are disclosed below (22-24)

22) A hair conditioner composition comprising: cetyl alcohol (1-3%), isopropyl myristate (1-3%), hydroxyethyl cellulose (Natrosol® 250 HHR), 0.1-1%, polysaccharide derivative of the present invention (0.1-2%), potassium salt (0.1-0.5%), Preservative, Germaben® II (0.5%) available from International Specialty Products), and the balance being water.

23) A hair shampoo composition comprising: 5-20% sodium laureth sulfate, 1-2 wt % cocamidopropyl betane, 1-2 wt % sodium chloride, 0.1-2% polysaccharide derivative of the present invention, and Preservative (0.1-0.5%), and the balance being water.

24) A skin lotion composition comprising: 1-5% glycerin, 1-5% glycol stearate, 1-5% stearic acid, 1-5% mineral oil, 0.5-1% acetylated lanolin (Lipolan® 98), 0.1-0.5 cetyl alcohol, 0.2-1% triethanolamine, 0.1-1 wt % Germaben® II preservative, 0.5-2 wt % polysaccharide derivatives of the present invention, and the balance being water.

In other embodiments, the disclosure relates to a method for treating a substrate, the method comprising the steps:

A) providing a composition comprising a polysaccharide derivative, wherein the polysaccharide derivative comprises a polysaccharide substituted with:
   a) at least one hydrophobic group; and
   b) at least one hydrophilic group;
wherein the polysaccharide is poly alpha-1,3-glucan, poly alpha-1,6-glucan, poly alpha-1,6-glucan or a mixture thereof;
B) contacting the substrate with the composition; and
C) optionally rinsing the substrate.

In one embodiment, the substrate can be a textile, a fabric, carpet, or apparel. In another embodiment, the substrate can be carpet, upholstery, or a surface. By "upholstery" is meant the soft, padded textile covering that is fixed to furniture such as armchairs and sofas. The treatment provides a benefit to the substrate, for example, one or more of improved fabric hand, improved resistance to soil deposition, improved colorfastness, improved wear resistance, improved wrinkle resistance, improved antifungal activity, improved stain resistance, improved cleaning performance when laundered, improved drying rates, improved dye, pigment or lake update, improved whiteness retention, or a combination thereof. In another embodiment, the substrate can be a surface, for example a wall, a floor, a door, or a panel, or paper, or the substrate can be a surface of an object, such as a table. The treatment provides a benefit to the substrate, for example improved resistance to soil deposition, improved stain resistance, improved cleaning performance, or a combination thereof.

A fabric herein can comprise natural fibers, synthetic fibers, semi-synthetic fibers, or any combination thereof. A semi-synthetic fiber is produced using naturally occurring material that has been chemically derivatized, an example of which is rayon. Non-limiting examples of fabric types herein include fabrics made of (i) cellulosic fibers such as cotton (e.g., broadcloth, canvas, chambray, chenille, chintz, corduroy, cretonne, damask, denim, flannel, gingham, jacquard, knit, matelassé, oxford, percale, poplin, plissé, sateen, seersucker, sheers, terry cloth, twill, velvet), rayon (e.g., viscose, modal, lyocell), linen, and TENCEL®; (ii) proteinaceous fibers such as silk, wool and related mammalian fibers; (iii) synthetic fibers such as polyester, acrylic, nylon, and the like; (iv) long vegetable fibers from jute, flax, ramie, coir, kapok, sisal, henequen, abaca, hemp and sunn; and (v) any combination of a fabric of (i)-(iv). Fabric comprising a combination of fiber types (e.g., natural and synthetic) includes those with both a cotton fiber and polyester, for example. Materials/articles containing one or more fabrics include, for example, clothing, curtains, drapes, upholstery, carpeting, bed linens, bath linens, tablecloths, sleeping bags, tents, car interiors, etc. Other materials comprising natural and/or synthetic fibers include, for example, non-woven fabrics, paddings, paper, and foams. Fabrics are typically of woven or knit construction.

The step of contacting can be performed at a variety of conditions, for example, times, temperatures, wash/rinse volumes. Methods for contacting a fabric or textile substrate, for example, a fabric care method or laundry method are generally well known. For example, a material comprising fabric can be contacted with the disclosed composition: (i) for at least about 5, 10, 20, 30, 40, 50, 60, 70, 80, 90, 100, 110, or 120 minutes; (ii) at a temperature of at least about 10, 15, 20, 25, 30, 35, 40, 45, 50, 55, 60, 65, 70, 75, 80, 85, 90, or 95° C. (e.g., for laundry wash or rinse: a "cold" temperature of about 15-30° C., a "warm" temperature of about 30-50° C., a "hot" temperature of about 50-95° C.); (iii) at a pH of about 2, 3, 4, 5, 6, 7, 8, 9, 10, 11, or 12 (e.g., pH range of about 2-12, or about 3-11); (iv) at a salt (e.g., NaCl) concentration of at least about 0.5, 1.0, 1.5, 2.0, 2.5, 3.0, 3.5, or 4.0% by weight; or any combination of (i)-(iv). The contacting step in a fabric care method or laundry method can comprise any of washing, soaking, and/or rinsing steps, for example. In some embodiments, the rinsing step is a step of rinsing with water.

Also disclosed herein is a method for treating a fabric to provide improved whiteness maintenance. Whiteness maintenance is the ability of a detergent to keep white items from whiteness loss when washed in the presence of soils, which can re-deposit onto the white items, making them less white each time they are washed. In one embodiment, the method comprises the steps:

A) providing a composition comprising a polysaccharide derivative, wherein the polysaccharide derivative comprises a polysaccharide substituted with:
   a) at least one hydrophobic group; and
   b) at least one hydrophilic group;
wherein the polysaccharide is poly alpha-1,3-glucan, poly alpha-1,6-glucan, or poly alpha-1,3-1,6-glucan;
B) contacting the fabric with the composition; and
C) optionally rinsing the substrate;
wherein the fabric obtained in step B) or step C) has a change WICIE of +1.5 or more units relative to that of the fabric before treatment, as determined according to the L*a*b* WICIE method.

The hydrophobic and hydrophilic groups are as disclosed herein. In one embodiment, the composition comprising a polysaccharide derivative, or the polysaccharide derivative itself, at 2 wt % has a surface tension of 70 nM/m or less as determined according to ASTM Standard D1331, 2015. In another embodiment, the composition comprising a polysaccharide derivative, or the polysaccharide derivative itself, at 2 wt % has a surface tension of 65 nM/m or less as determined according to ASTM Standard D1331, 2015. In yet another embodiment, the composition comprising a polysaccharide derivative, or the polysaccharide derivative itself, at 2 wt % has a surface tension of 54 mN/m or less as determined according to ASTM Standard D1331, 2015 method. In a further embodiment, the composition comprising a polysaccharide derivative, or the polysaccharide derivative itself, at 1 wt % has a surface tension of 70 mN/m or less as determined according to ASTM Standard D1331, 2015 method.

Other substrates that can be contacted include, for example, surfaces that can be treated with a dish detergent (e.g., automatic dishwashing detergent or hand dish detergent). Examples of such materials include surfaces of dishes, glasses, pots, pans, baking dishes, utensils and flatware made from ceramic material, china, metal, glass, plastic (e.g., polyethylene, polypropylene, and polystyrene) and wood (collectively referred to herein as "tableware"). Examples of conditions (e.g., time, temperature, wash volume) for conducting a dishwashing or tableware washing method are known in the art. In other examples, a tableware article can be contacted with the composition herein under a suitable set of conditions such as any of those disclosed above with regard to contacting a fabric-comprising material.

Certain embodiments of a method of treating a substrate further comprise a drying step, in which a material is dried after being contacted with the composition. The drying step can be performed directly after the contacting step, or following one or more additional steps that might follow the contacting step, for example, drying of a fabric after being rinsed, in water for example, following a wash in an aqueous composition. Drying can be performed by any of several means known in the art, such as air drying at a temperature of at least about 30, 40, 50, 60, 70, 80, 90, 100, 120, 140, 160, 170, 175, 180, or 200° C., for example. A material that has been dried herein typically has less than 3, 2, 1, 0.5, or 0.1 wt % water comprised therein.

In another embodiment, the substrate can be a surface, for example a wall, a floor, a door, or a panel, or the substrate can be a surface of an object, such as a table. The treatment provides a benefit to the substrate, for example improved resistance to soil deposition, improved stain resistance, improved cleaning performance, or a combination thereof. The step of contacting can include wiping or spraying the substrate with the composition.

Non-limiting examples of the embodiments disclosed herein include:

1. A composition comprising:
    a polysaccharide derivative, wherein the polysaccharide derivative comprises a polysaccharide substituted with
        a) at least one hydrophobic group; and
        b) at least one hydrophilic group;
    wherein the polysaccharide is poly alpha-1,3-glucan, poly alpha-1,6-glucan or poly alpha-1,3-1,6-glucan.
2. The composition of embodiment 1, wherein the poly alpha-1,3-glucan comprises a backbone of glucose monomer units wherein greater than or equal to 50% of the glucose monomer units are linked via alpha-1,3-glycosidic linkages.
3. The composition of embodiment 1 or 2, wherein the poly alpha-1,3-glucan comprises a backbone of glucose monomer units wherein greater than or equal to 90% of the glucose monomer units are linked via alpha-1,3-glycosidic linkages.
4. The composition of embodiment 1, wherein the poly alpha-1,6-glucan comprises a backbone of glucose monomer units wherein greater than or equal to 40% of the glucose monomer units are linked via alpha-1,6-glycosodic linkages.
5. The composition of embodiment 1 or 4, wherein the poly alpha-1,6-glucan has a degree of alpha-1,2-branching that is less than 50%.
6. The composition of any one of embodiments 1, 2, 3, 4, or 5, wherein the at least one hydrophobic group comprises a $C_1$ to $C_{18}$ alkyl, a $C_2$ to $C_{18}$ alkene, a $C_2$ to $C_{18}$ alkyne, a polyether comprising repeat units of (—$CH_2CH_2O$—), (—$CH_2CH(CH_3)O$—), or mixtures thereof, wherein the total number of repeat units is in the range of from 3 to 100, a $C_6$ to $C_{20}$ aryl, a benzyl, a $C_1$-$C_{18}$ alkyl sulfonyl, a $C_6$-$C_{20}$ aryl sulfonyl, a p-toluenesulfonyl group, or a combination thereof.
7. The composition of any one of embodiments 1, 2, 3, 4, or 5, wherein the at least one hydrophobic group comprises a $C_1$ to $C_{18}$ alkyl, a benzyl, a p-toluenesulfonyl group, or a combination thereof.
8. The composition of any one of embodiments 6 or 7, wherein the at least one hydrophobic group comprises a benzyl group, and the benzyl group is further substituted with one or more of a halogen, a cyano, an ester, an amide, an ether group, a $C_1$ to $C_6$ alkyl group, an aryl group, a $C_2$ to $C_6$ alkene group, a $C_2$ to $C_6$ alkyne group, or a combination thereof.
9. The composition of any one of embodiments 1, 2, 3, 4, or 5, wherein the at least one hydrophilic group comprises a carboxylic acid, carboxylic acid salt, sulfonic acid derivative, sulfonic acid derivative salt, sulfuric acid derivative, sulfuric acid derivative salt, thiosulfate, a thiosulfate salt, phosphoric acid derivative, phosphoric acid derivative salt, alkyl amine, alkyl substituted ammonium salt, quaternized pyridine salt, quaternized imidazole salt, or a combination thereof.
10. The composition of any one of embodiments 1, 2, 3, 4, or 5, wherein the at least one hydrophilic group comprises a carboxylic acid, an alkyl substituted ammonium salt, a sulfonate, an alkyl sulfonate, a sulfate, thiosulfate, or a combination thereof.
11. The composition of any one of embodiments 1, 2, 3, 4, 5, or 8, wherein the at least one hydrophobic group comprises a $C_1$ to $C_{18}$ alkyl, a $C_2$ to $C_{18}$ alkene, a $C_2$ to $C_{18}$ alkyne, a polyether comprising repeat units of (—$CH_2CH_2O$—), (—$CH_2CH(CH_3)O$—), or mixtures thereof, wherein the total number of repeat units is in the range of from 3 to 100, a $C_6$ to $C_{20}$ aryl, a benzyl, a $C_1$-$C_{18}$ alkyl sulfonyl, a $C_6$-$C_{20}$ aryl sulfonyl, a p-toluenesulfonyl group, or a combination thereof, and the at least one hydrophilic group comprises a carboxylic acid, carboxylic acid salt, a sulfonic acid derivative, a sulfonic acid derivative salt, a sulfuric acid derivative, a sulfuric acid derivative salt, thiosulfate, a thiosulfate salt, a phosphoric acid derivative, a phosphoric acid derivative salt, an alkyl amine, an alkyl substituted ammonium salt, a quaternized pyridine salt, a quaternized imidazole salt, or a combination thereof.
12. The composition of any one of embodiments 1, 2, 3, 4, 5, or 8, wherein the at least one hydrophobic group comprises a $C_1$ to $C_{18}$ alkyl, a benzyl, a p-toluenesulfonyl group, or a combination thereof, and the at least one hydrophilic group comprises a carboxylic acid, an alkyl substituted ammonium salt, a sulfonate, an alkyl sulfonate, a sulfate, thiosulfate, or a combination thereof.
13. The composition of any one of embodiments 1, 2, 3, 4, 5, or 8, wherein the at least one hydrophobic group comprises a $C_1$ to $C_{18}$ alkyl, a benzyl, or a p-toluenesulfonyl group, and the at least one hydrophilic group comprises a thiosulfate or carboxymethyl group.
14. The composition of any one of embodiments 1, 2, 3, 4, 5, 6, 7, 8, 9, 10, 11, 12, or 13, wherein the polysaccharide derivative has a degree of polymerization in the range of from about 5 to about 1400.
15. The composition of any one of embodiments 1, 2, 3, 4, 5, 6, 7, 8, 9, 10, 11, 12, 13, or 14, wherein the polysaccharide derivative has a degree of substitution of about 0.001 to about 3.0.
16. The composition of any one of embodiments 1, 2, 3, 4, 5, 6, 7, 8, 9, 10, 11, 12, 13, 14, or 15, wherein the polysaccharide derivative at 2 wt % has a surface tension of 65 mN/m or less as determined according to ASTM Standard D1331, 2015 method.
17. The composition of any one of embodiments 1, 2, 3, 4, 5, 6, 7, 8, 9, 10, 11, 12, 13, 14, 15, or 16, wherein the composition is in the form of a liquid, a gel, a powder, a hydrocolloid, an aqueous solution, a granule, a tablet, a capsule, a single compartment sachet, a multi-compartment sachet, a single compartment pouch, or a multi-compartment pouch.
18. The composition of any one of embodiments 1, 2, 3, 4, 5, 6, 7, 8, 9, 10, 11, 12, 13, 14, 15, 16, or 17, further comprising at least one of a surfactant, an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil re-deposition agent, a dye, a bactericide, a tarnish inhibitor, an optical brightener, a perfume, a saturated or unsaturated fatty acid, a dye transfer inhibiting agent, a chelating agent, a hueing dye, a calcium cation, a magnesium cation, a visual signaling ingredient, an anti-foam, a structurant, a thickener, an anti-caking agent, a starch, sand, a gelling agent, or a combination thereof.

19. The composition of embodiment 18, wherein the enzyme is a cellulase.

20. The composition of embodiment 18, wherein the enzyme is a protease.

21. The composition of embodiment 18, wherein the enzyme is an amylase.

22. The composition of embodiment 18, wherein the enzyme is a lipase.

23. The composition of embodiment 18, wherein the enzyme is a cellulase, a protease, an amylase, a lipase, or a combination thereof.

24. A method for treating a substrate, the method comprising the steps:
    A) providing a composition comprising a polysaccharide derivative, wherein the polysaccharide derivative comprises a polysaccharide substituted with:
        a) at least one hydrophobic group; and
        b) at least one hydrophilic group;
    wherein the polysaccharide is poly alpha-1,3-glucan, poly alpha-1,6-glucan, or poly alpha-1,3-1,6-glucan;
    B) contacting the substrate with the composition; and
    C) optionally rinsing the substrate;
    wherein the substrate is a carpet, upholstery, or a surface.

25. The method of embodiment 24, wherein the composition comprising a polysaccharide derivative is a composition of embodiment 1, 2, 3, 4, 5, 6, 7, 8, 9, 10, 11, 12, 13, 14, 15, 16, 17, 18, 19, 20, 21, 22, or 23.

26. A product comprising:
    from about 1% to about 60% by weight of a surfactant; and
    from about 0.1% to about 10% by weight of a polysaccharide derivative, wherein the polysaccharide derivative comprises a polysaccharide substituted with
        a) at least one hydrophobic group; and
        b) at least one hydrophilic group;
    wherein the polysaccharide is poly alpha-1,3-glucan, poly alpha-1,6-glucan, or poly alpha-1,3-1,6-glucan; wherein said product is a household product.

27. The product of embodiment 26, in the form of a liquid, a gel, a powder, a hydrocolloid, an aqueous solution, a granule, a tablet, a capsule, a single compartment sachet, a multi-compartment sachet, a single compartment pouch, or a multi-compartment pouch.

28. The product of embodiment 26 or 27, further comprising at least one of an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil re-deposition agent, a dye, a bactericide, a tarnish inhibitor, an optical brightener, a perfume, a saturated or unsaturated fatty acid, a dye transfer inhibiting agent, a chelating agent, a hueing dye, a calcium cation, a magnesium cation, a visual signaling ingredient, an anti-foam, a structurant, a thickener, an anti-caking agent, a starch, sand, a gelling agent, or a combination thereof.

29. The product of embodiment 28, wherein the enzyme is a cellulase, a protease, an amylase, a lipase, or a combination thereof.

30. The product of any of embodiments 26, 27, 28, or 29, wherein the polysaccharide derivative at 2 wt % has a surface tension of less than 65 mN/m.

31. The product of any of embodiments 26, 27, 28, 29, or 30, wherein the at least one hydrophobic group comprises a $C_1$ to $C_{18}$ alkyl, a $C_2$ to $C_{18}$ alkene, a $C_2$ to $C_{18}$ alkyne, a polyether comprising repeat units of (—$CH_2CH_2O$—), (—$CH_2CH(CH_3)O$—), or mixtures thereof, wherein the total number of repeat units is in the range of from 3 to 100, a $C_6$ to $C_{20}$ aryl, a benzyl, a $C_1$-$C_{18}$ alkyl sulfonyl, a $C_6$-$C_{20}$ aryl sulfonyl, a p-toluenesulfonyl group, or a combination thereof, and the at least one hydrophilic group comprises a carboxylic acid, carboxylic acid salt, a sulfonic acid derivative, a sulfonic acid derivative salt, a sulfuric acid derivative, a sulfuric acid derivative salt, thiosulfate, a thiosulfate salt, a phosphoric acid derivative, a phosphoric acid derivative salt, an alkyl amine, an alkyl substituted ammonium salt, a quaternized pyridine salt, a quaternized imidazole salt, or a combination thereof.

32. A water-soluble unit dose article comprising a water-soluble film and a composition comprising from about 1% to about 60% by weight of a surfactant; and from about 0.1% to about 10% by weight of a polysaccharide derivative, wherein the polysaccharide derivative comprises a polysaccharide substituted with
    a) at least one hydrophobic group; and
    b) at least one hydrophilic group;
wherein the polysaccharide is poly alpha-1,3-glucan, poly alpha-1,6-glucan, or poly alpha-1,3-1,6-glucan; wherein said water-soluble unit dose article is a household product.

33. The water-soluble unit dose article of embodiment 32, comprising at least two compartments.

34. The water-soluble unit dose article of embodiment 33, where the compartments are arranged in a superposed orientation or in a side-by-side orientation.

35. The water-soluble unit dose article of embodiment 32, comprising at least three compartments.

36. The water-soluble unit dose article of any of embodiments 32, 33, 34, or 35, wherein the at least one hydrophobic group comprises a $C_1$ to $C_{18}$ alkyl, a $C_2$ to $C_{18}$ alkene, a $C_2$ to $C_{18}$ alkyne, a polyether comprising repeat units of (—$CH_2CH_2O$—), (—$CH_2CH(CH_3)O$—), or mixtures thereof, wherein the total number of repeat units is in the range of from 3 to 100, a $C_6$ to $C_{20}$ aryl, a benzyl, a $C_1$-$C_{18}$ alkyl sulfonyl, a $C_6$-$C_{20}$ aryl sulfonyl, a p-toluenesulfonyl group, or a combination thereof, and the at least one hydrophilic group comprises a carboxylic acid, carboxylic acid salt, a sulfonic acid derivative, a sulfonic acid derivative salt, a sulfuric acid derivative, a sulfuric acid derivative salt, thiosulfate, a thiosulfate salt, a phosphoric acid derivative, a phosphoric acid derivative salt, an alkyl amine, an alkyl substituted ammonium salt, a quaternized pyridine salt, a quaternized imidazole salt, or a combination thereof.

37. A method of treating a substrate, where the method includes the step of contacting the substrate with the household product of any of embodiments 26, 27, 28, 29, 30, or 31 in the presence of water, wherein the substrate is a fabric or a hard surface.

38. A method of treating a fabric with the product of any of embodiments 26, 27, 28, 29, 30, or 31, wherein the treated fabric has a change in WICIE of +1.5 or more units versus the fabric before treatment, as determined according to the L*a*b* WICIE method.

39. A product comprising:
    from about 1% to about 60% by weight of a non-petroleum derived surfactant;
    from about 0.1% to about 10% by weight of a polysaccharide derivative,
    wherein the polysaccharide derivative comprises a polysaccharide substituted with
        a) at least one hydrophobic group; and
        b) at least one hydrophilic group;

wherein the polysaccharide is poly alpha-1,3-glucan, poly alpha-1,6-glucan, or poly alpha-1,3-1,6-glucan; wherein said product is a household product.

40. The product of embodiment 39, wherein the product is substantially free of dye and brightener.

41. The product of embodiment 39 or 40, wherein the at least one hydrophobic group comprises a $C_1$ to $C_{18}$ alkyl, a $C_2$ to $C_{18}$ alkene, a $C_2$ to $C_{18}$ alkyne, a polyether comprising repeat units of (—$CH_2CH_2O$—), (—$CH_2CH(CH_3)O$—), or mixtures thereof, wherein the total number of repeat units is in the range of from 3 to 100, a $C_6$ to $C_{20}$ aryl, a benzyl, a $C_1$-$C_{18}$ alkyl sulfonyl, a $C_6$-$C_{20}$ aryl sulfonyl, a p-toluenesulfonyl group, or a combination thereof, and the at least one hydrophilic group comprises a carboxylic acid, carboxylic acid salt, a sulfonic acid derivative, a sulfonic acid derivative salt, a sulfuric acid derivative, a sulfuric acid derivative salt, thiosulfate, a thiosulfate salt, a phosphoric acid derivative, a phosphoric acid derivative salt, an alkyl amine, an alkyl substituted ammonium salt, a quaternized pyridine salt, a quaternized imidazole salt, or a combination thereof.

EXAMPLES

Unless otherwise stated, all ingredients are available from Sigma-Aldrich, St. Louis, Mo. and were used as received.

As used herein, "Comp. Ex." Means Comparative Example; "Ex." means Example.

Representative Preparation of Poly Alpha-1,3-Glucan

Poly alpha-1,3-glucan can be prepared using a gtfJ enzyme preparation as described in U.S. Pat. No. 7,000,000; U.S. Patent Appl. Publ. No. 2013/0244288, now U.S. Pat. No. 9,080,195; and U.S. Patent Appl. Publ. No. 2013/0244287, now U.S. Pat. No. 8,642,757 (all of which are incorporated herein by reference in their entirety).

Poly alpha-1,3-glucan polymer can be synthesized, and wet cake thereof prepared, following the procedures disclosed in U.S. Appl. Publ. No. 2014/0179913, now U.S. Pat. No. 9,139,718 (see Example 12 therein, for example), both of which are incorporated herein by reference in their entirety.

Preparation of Poly Alpha-1,6-Glucan

Two samples of poly alpha-1,6-glucan were prepared according to the procedures below. Sample #1 contained 10.2% alpha-1,2-branching. Sample #2 contained 23.7% alpha-1,2-branching.

Sample #1

Soluble α-(1,2)-branched poly alpha-1,6-glucan was prepared using stepwise combination of glucosyltransferase GTF8117 and α-(1,2) branching enzyme GTFJ18T1, according to the following procedure.

A reaction mixture (2 L) comprised of sucrose (450 g/L), GTF8117 (9.4 U/mL), and 50 mM sodium acetate was adjusted to pH 5.5 and stirred at 47° C. Aliquots (0.5-1 mL) were withdrawn at predetermined times and quenched by heating at 90° C. for 15 min. The resulting heat-treated aliquots were passed through 0.45 μm filter. The flow through was analyzed by HPLC to determine the concentration of sucrose, glucose, fructose, leucrose, oligosaccharides and polysaccharides. After 23.5 h, the reaction mixture was heated to 90° C. for 30 minutes. An aliquot of the heat-treated reaction mixture was passed through 0.45 μm filter and the flow through was analyzed for soluble mono/disaccharides, oligosaccharides, and polysaccharides (Table 1). A major product was linear dextran with a DPw of 93.

TABLE 1

HPLC Analysis of Soluble Mono/Disaccharides, Oligosaccharides, and Polysaccharides Produced by GTF8117 Reaction

| Soluble Mono/Disaccharide, Oligosaccharide, Polysaccharide | Amount (g/L) |
| --- | --- |
| DP8+ | 171.3 |
| DP7 | 0.5 |
| DP6 | 0.9 |
| DP5 | 1.6 |
| DP4 | 1.8 |
| DP3 | 2.2 |
| DP2 | 10.4 |
| Sucrose | 0.0 |
| Leucrose | 31.2 |
| Glucose | 4.6 |
| Fructose | 241.1 |

A second reaction mixture was prepared by adding 95.3 g of sucrose and 210 mL of α-(1,2)-branching enzyme GTFJ18T1 (5.0 U/mL) to the leftover heat-treated reaction mixture that was obtained from the sucrose and GTF8117 reaction described immediately above. The mixture was stirred at 30° C. with a volume of ~2.2 L. Aliquots (0.5-1 mL) were withdrawn at predetermined times and quenched by heating at 90° C. for 15 min. The resulting heat-treated aliquots were passed through 0.45 μm filter. The flow through was analyzed by HPLC to determine the concentration of sucrose, glucose, fructose, leucrose, oligosaccharides and polysaccharides. After 95 h, the reaction mixture was heated to 90° C. for 30 minutes. An aliquot of the heat-treated reaction mixture was passed through 0.45 μm filter and the flow through was analyzed for soluble mono/disaccharides, oligosaccharides, and polysaccharides (Table 2). Leftover heat-treated mixture was centrifuged using 1 L centrifugation bottles. The supernatant was collected and cleaned more than 200-fold using ultrafiltration system (Pellicon Mini with 1 or 5 KDa MWCO cassettes) with deionized water. The cleaned oligo/polysaccharide product solution was dried. Dry sample was then analyzed by $^1$H NMR spectroscopy to determine the anomeric linkages of the oligosaccharides and polysaccharides (Table 3).

TABLE 2

HPLC Analysis of Soluble Mono/Disaccharides, Oligosaccharides and Polysaccharides Produced by α-(1,2) Branching Reaction.

| Soluble Mono/Disaccharide, Oligosaccharide, Polysaccharide | Amount (g/L) |
| --- | --- |
| DP8+ | 170.0 |
| DP7 | 0.0 |
| DP6 | 1.2 |
| DP5 | 1.8 |
| DP4 | 1.8 |
| DP3 | 2.0 |
| DP2 | 8.4 |
| Sucrose | 0.0 |
| Leucrose | 30.3 |
| Glucose | 5.5 |
| Fructose | 218.1 |

TABLE 3

Anomeric Linkage Analysis of Soluble Oligosaccharides and Polysaccharides by ¹H NMR Spectroscopy.

| % α-(1,4) | % α-(1,3) | % α-(1,3,6) | % α-(1,2,6) | % α-(1,6) | % α-(1,2) branching |
|---|---|---|---|---|---|
| 0.0 | 0.2 | 0.2 | 9.2 | 80.7 | 10.2 |

Sample #2

Soluble α-(1,2)-branched poly alpha-1,6-glucan was prepared using stepwise combination of glucosyltransferase GTF8117 and α-(1,2) branching enzyme GTFJ18T1, according to the following procedure.

A reaction mixture (2 L) comprised of sucrose (450 g/L), GTF8117 (9.4 U/mL), and 50 mM sodium acetate was adjusted to pH 5.5 and stirred at 47° C. Aliquots (0.2-1 mL) were withdrawn at predetermined times and quenched by heating at 90° C. for 15 min. The resulting heat-treated aliquots were passed through 0.45 μm filter. The flow through was analyzed by HPLC to determine the concentration of sucrose, glucose, fructose, leucrose, oligosaccharides and polysaccharides. After 23.5 h, the reaction mixture was heated to 90° C. for 30 minutes. An aliquot of the heat-treated reaction mixture was passed through 0.45 μm filter and the flow through was analyzed for soluble mono/disaccharides, oligosaccharides, and polysaccharides (Table 4). A major product was linear dextran with a DPw of 93.

TABLE 4

HPLC Analysis of Soluble Mono/Disaccharides, Oligosaccharides, and Polysaccharides Produced by GTF8117 Reaction.

| Soluble Mono/Disaccharide, Oligosaccharide, Polysaccharide | Amount (g/L) |
|---|---|
| DP8+ | 173.2 |
| DP7 | 2.2 |
| DP6 | 0.3 |
| DP5 | 0.7 |
| DP4 | 1.1 |
| DP3 | 1.5 |
| DP2 | 9.4 |
| Sucrose | 0.0 |
| Leucrose | 30.7 |
| Glucose | 5.6 |
| Fructose | 240.2 |

A second reaction mixture was prepared by adding 238.2 g of sucrose and 210 mL of α-(1,2)-branching enzyme GTFJ18T1 (5.0 U/mL) to the leftover heat-treated reaction mixture that was obtained from the sucrose and GTF8117 reaction described immediately above. The mixture was stirred at 30° C. with a volume of ~2.2 L. Aliquots (0.2-1 mL) were withdrawn at predetermined times and quenched by heating at 90° C. for 15 min. The resulting heat-treated aliquots were passed through 0.45 μm filter. The flow through was analyzed by HPLC to determine the concentration of sucrose, glucose, fructose, leucrose, oligosaccharides and polysaccharides. After 95 h, the reaction mixture was heated to 90° C. for 30 minutes. An aliquot of the heat-treated reaction mixture was passed through 0.45 μm filter and the flow through was analyzed for soluble mono/disaccharides, oligosaccharides, and polysaccharides (Table 5). Leftover heat-treated mixture was centrifuged using 1 L centrifugation bottles. The supernatant was collected and cleaned more than 200-fold using ultrafiltration system with 1 or 5 KDa MWCO cassettes and deionized water. The cleaned oligo/polysaccharide product solution was dried. Dry sample was then analyzed by ¹H NMR spectroscopy to determine the anomeric linkages of the oligosaccharides and polysaccharides (Table 6).

TABLE 5

HPLC Analysis of Soluble Mono/Disaccharides, Oligosaccharides and Polysaccharides Produced by α-(1,2) Branching Reaction

| Soluble Mono/Disaccharide, Oligosaccharide, Polysaccharide | Amount (g/L) |
|---|---|
| DP8+ | 188.2 |
| DP7 | 0.0 |
| DP6 | 1.2 |
| DP5 | 2.0 |
| DP4 | 1.9 |
| DP3 | 1.7 |
| DP2 | 7.7 |
| Sucrose | 0.0 |
| Leucrose | 45.4 |
| Glucose | 0.0 |
| Fructose | 233.8 |

TABLE 6

Anomeric Linkage Analysis of Soluble Oligosaccharides and Polysaccharides by ¹H NMR Spectroscopy.

| % α-(1,4) | % α-(1,3) | % α-(1,3,6) | % α-(1,2,6) | % α-(1,6) | % α-(1,2) branching |
|---|---|---|---|---|---|
| 0.0 | 0.1 | 0.2 | 19.2 | 61.8 | 23.7 |

Example 1A: Benzylation of Poly-1,3-Glucan

Poly alpha-1,3-glucan (180 g of wet cake containing 27.5 wt % glucan, balance water) was charged into a 3-neck 1 L reactor. To this was added 110 mL water. This mixture was cooled to 18-21° C. with ice water batch. To this was added 63 g of 50 wt % sodium hydroxide solution, and the mixture was stirred for 30 minutes. Water was added (150 mL) to the mixture. The reactor mixture was heated to 48° C. and benzyl chloride (89 g) was added over 40 minutes. The reaction mixture was then heated to 78° C. for 3 hours. The mixture was cooled, neutralized to pH 7.0, and filtered. The solid was washed 3× with cold 20% aqueous methanol, and dried in vacuum oven at 40° C. to yield 53 g of yellow solid. The degree of benzyl substitution was determined by ¹H NMR to be 0.57.

Example 1B: Preparation of Carboxymethyl Benzyl Glucan

Benzyl glucan (obtained from Example 1A), 53 g, was suspended in 410 mL 92 wt % aqueous ethanol and stirred at room temperature. The mixture was cooled to 15-19° C. with ice-water bath. To the cooled, stirred suspension was added 48 g of 50 wt % solution of sodium hydroxide over 20 minutes. The ice-water bath was removed and the mixture was stirred for 25 minutes. The mixture was cooled over ice-water batch and 30.9 g of chloroacetic acid (in 30 g of 92 wt % ethanol) was added in two portions, first two-thirds was added then stirred at 15° C. for 15 min, followed by the last third. The ice-water bath was removed, and the reaction mixture was stirred at room temperature for 15 minutes at 300 rpm. The mixture was then immersed into a 90° C.

preheated oil bath. The reaction mixture was then heated for 3 hours at 74° C. (internal temperature). The reaction mixture was then cooled, diluted with 53 g of water, and neutralized to pH 6.7 with 10 wt % HCl. The reaction mixture was filtered, and the solid was washed with 70% aqueous methanol to yield a brown solid. The solid was dissolved in 200 mL water, adjusted to pH 8 with 0.1N NaOH, and then added to cold methanol. The suspension was stirred at 10° C. for 1 hour. The solution was decanted off, and more cold methanol was added to the residual solid, followed by decanting. This process was repeated 2 times. Final fraction was obtained by adding 2-propanol to the residual to lead to an off-white solid was isolated by filtration. The solids were combined to yield 40 g. Degree of substitution of carboxymethyl group was determined by $^1$H NMR to be 0.59. The degree of benzyl substitution was 0.57.

Example 2A: Benzyl Glucan Preparation

To a 4-neck 2 L flask was added with stirring 980 mL of water and poly alpha-1,3-glucan (270 g of wet cake containing 40 wt % glucan and 60% water), portion-wise. Sodium hydroxide (55 g of 50 wt % aqueous solution) was added dropwise over 10-minute period while the reaction mixture was stirred at 20-25° C., then at room temperature for 2 hours. The reaction mixture was heated to 75° C. Benzyl chloride (77 g) was added at 75° C. The reaction mixture was heated to 85° C. and kept at 85° C. for 3.5 hours. The reaction mixture was cooled and filtered. The wet cake was washed with water (3×700 mL), ethanol (50 wt %, 800 mL), methanol (80 wt %, 800 mL), acetone (800 mL), and hexanes (2×500 mL). The resulting wet cake was dried on a frit with vacuum and $N_2$ purge for 3 hours to afford a white solid. The solid was dried in vacuum oven at 80° C. overnight with nitrogen sweep to give a white solid, 96 g. The degree of benzyl substitution was determined by $^1$H NMR to be 0.17.

Example 2B: Carboxymethylation of Benzyl Glucan to Prepare Carboxymethyl Benzyl Glucan A 4-neck 250 mL round-bottom flask was equipped with overhead mechanical stirrer, thermocouple, and $N_2$ inlet. Benzyl glucan (from Example 2A, 20 g) and ethanol (92 wt %) was added into the flask. The mixture was stirred at room temperature for 30 minutes. Sodium hydroxide (40 g of 50 wt % aqueous solution) was added dropwise over a 10 minute period, while stirring. The slurry was stirred at room temperature for 15 minutes. Chloroacetic acid (11.6 g in 5 g of 92 wt % ethanol) was added in 5 minutes. The slurry was stirred at 63-65° C. for 3 hours. After being cooled to 30° C., pH of the reaction mixture was adjusted to about 7 by adding 18.5 wt % HCl solution. The solid was collected by filtration and re-slurry with warm methanol (90 wt %, 150 mL), then filtered to give a wet cake. The wet cake was washed with methanol (90 wt %, 3×150 mL) by re-slurry/filtration method, then dried on vacuum to give a solid, 22.3 g, which was further purified by TFF (nanofiltration: Membrane: PES, 5K MWCO), with approx. 5 L water exchange, then further purified by 10K MWCO membrane. The retentate was concentrated and dried to give carboxymethyl benzyl glucan as a solid 18.1 g. Degree of substitution of carboxymethyl group was determined by $^1$H NMR to be 1.75. The degree of benzyl substitution was 0.17.

Example 3A: Benzyl Glucan Preparation

Poly alpha-1,3-glucan (53 kg of wet cake containing 89% glucan and 11% water) was charged into a 150 gallon reactor, followed by water (2216 kg) under nitrogen. To this was added sodium hydroxide solution (10% solid, 202 kg), and the mixture was stirred at room temperature under nitrogen for 2 hours. The reactor was heated to 65° C., and benzyl chloride (58.5 kg) was added to the reactor. The reactor temperature was increased to 80-85° C., and the reaction was heated for 3.5 hours. The reactor was cooled to 70° C., and the pH of the reaction mixture was adjusted to pH 3 using 3M sulfuric acid. The reaction mixture was washed with Methanol/water (5:1), acetone (2×), methanol, and dried. Degree of substitution of benzyl group was determined by $^1$H NMR to be 0.5.

Example 3B: Carboxymethylation of Benzyl Glucan

A 4-neck 250 mL round bottom flask was equipped with overhead mechanical stirrer, thermocouple, and $N_2$ inlet. Benzyl glucan (from Example 3A, 20 g) and ethanol (92 wt %, 120 mL) was added into the flask. The mixture was stirred at room temperature for 30 min. Sodium hydroxide (20 g, 50 wt % aqueous solution) was added dropwise over 10 min period, while stirring. The slurry was stirred at room temperature for 15 minutes. Chloroacetic acid (11.6 g in 5 g of 92 wt % ethanol) was added in 5 minutes. The slurry was stirred at 60-62° C. for 4 hours. The solid was not completely soluble in water. After being cooled to 35° C., sodium hydroxide (11.5 g, 50 w % aqueous solution) and chloroacetic acid 6.8 g (in 3 g of 92 wt % ethanol was added. The resulting mixture was stirred at 60° C. After 1.5 hours at 60° C., a large lump was formed. The heating was turned off. The top layer liquid was decanted and methanol 50 w %, 150 mL), pH of the resulting mixture was adjusted to about 7 by adding 18.5 wt % HCl solution. The mixture was slowly stirred at room temperature overnight to form a gel. Methanol (50 mL) was added slowly while the gel was stirred. A soft solid was precipitated. The top layer liquid was decanted. Methanol (90 w %, 150 mL) was added. The solid was collected by filtration and washed with methanol (90 w %, 3×100 mL), then dried on vacuum to give a solid 20.5 g. The solid was further purified by ultrafiltration. The brown solid was dissolved in approx. 1.5 L water. The solution was purified by TFF (nanofiltration, membrane: regenerated cellulose, 10K MWCO), with approx. 5 L water exchange. The retentate was concentrated and dried to give carboxymethyl benzyl glucan as a solid 16.8 g. Degree of substitution of carboxymethyl group was determined by $^1$H NMR to be 0.95. The degree of substitution of the benzyl group was 0.5.

Example 4: Preparation of Quaternary Ammonium Benzyl Glucan

A 4-neck 250 mL round-bottom flask was equipped with overhead mechanical stirrer, thermocouple, and $N_2$ inlet. Benzyl glucan (from Example 2A, 20 g) and isopropyl alcohol (120 mL) were added to the flask. The mixture was stirred at room temperature, sodium hydroxide (18.64 g of 50 wt % aqueous solution) was added dropwise over 10-minute period, while stirring. The reaction mixture was heated to 50° C. with a preheated oil bath (60° C.). 3-Chloro-2-hydroxypropyl trimethylammonium chloride (52.3 g of 60 wt % aqueous solution) was added in 5 minutes. The slurry was stirred at 55-60° C. for 3 hours. A large lump was formed. The liquid (about 100 mL) was decanted. Methanol (100 mL) was added and the lump was broken manually. The pH of this mixture was adjusted to about 7 by adding 18.5 wt % HCl solution. The solid was collected by filtration and washed with 90 w % methanol (2×150 mL), then filtered to give a wet cake, which was dried on vacuum at 80° C. to give a solid. This solid was suspended in water (700 mL) and centrifuged. The top layer solution was dropped into methanol to precipitate the product which was dried to give a white solid, 14.5 g. Degree of substitution of quaternary ammonium was determined by $^1$H NMR to be 0.25. The degree of substitution of the benzyl group was 0.17.

Example 5A: Hydroxypentyl Glucan

Poly alpha-1,3-glucan (50 g of wet cake containing 27.5 wt % glucan, 0.085 mol) is charged into a 3-neck 1 L reactor. To this is added 30 mL water. This mixture is cooled to 18-21° C. with ice water batch. To this is added 18 g of 50 wt % sodium hydroxide solution, and the mixture is stirred for 30 minutes. Water is added (50 mL) to the mixture. The reactor mixture is heated to 48° C. and 1,2-epoxypentane (17 g) is added over 40 minutes. The reaction mixture is then heated to 75° C. for 3 hours. The mixture is cooled, neutralized to pH 7.0, and filtered. The solid is washed 3× with cold 20% aqueous methanol, and dried in vacuum oven. The degree of substitution of the —CH$_2$—CH(OH) CH$_2$CH$_2$CH$_3$ group is determined by $^1$H NMR.

Example 5B: Carboxymethylation of Hydroxypentyl Glucan

Hydroxypentyl glucan (from Example 5A), 25 g, is suspended in 200 mL 92 wt % aqueous ethanol and stirred at room temperature. The mixture is cooled to 15-19° C. with ice-water bath. To the cooled, stirred suspension is added 24 g of 50 wt % solution of sodium hydroxide over 20 minutes. The ice-water bath is removed and the mixture is stirred for 25 minutes. To the mixture is added 15 g of chloroacetic acid (in 15 g of 92 wt % ethanol) dropwise. The ice-water bath is removed, and the reaction flask is heated to 70° C. for 3 hours. The reaction mixture is then cooled, diluted with 25 g of water, and neutralized to pH 7 with 10 wt % HCl. The reaction mixture is filtered, and the solid is washed with 70% aqueous methanol. Degree of substitution of carboxymethyl group is determined by $^1$H NMR.

Example 6A: Preparation of Poly Alpha-1,6-Glucan Tosylate

NaOH (35 g, 50% concentration), urea (30 g), and water (160.5 mL) were mixed and stirred to get a clear solution. Poly alpha-1,6-glucan (17K, 10% branching, 35 g, 31.4%) prepared as described herein above was added with stirring. The mixture was cooled to −12° C. for 1 hour with acetone-dry ice bath, once it warmed up to 0° C., the solution was vigorously stirred to obtain a transparent poly alpha-1,6-glucan solution.

To the above glucan solution cooled by ice-bath, p-toluenesulfonyl chloride (53 gram) and Imbentin AGS/35 (20 mL) were added. The mixture was stirred vigorously at 0° C. for at least 3 hours and warmed up to room temperature overnight. The mixture was phase separated into two layers. The top pale yellow clear liquid layer was removed. The bottom gel-like layer was precipitated in isopropanol as a white powder. The product was washed thoroughly with isopropanol (200 mL/each, 5 times) to afford the desired glucan-tosylate in quantitative yield. The degree of tosyl substitution was determined by NMR to be 1.0.

Example 6B: Preparation of Poly Alpha-1,6-Glucan-Tosylate-Ethylene Diamine

To the glucan-tosylate from Example 6A (15 g) in DMSO (45 mL), N-ethylethylenediamine (31.6 mL) was added at room temperature. N,N-Diisopropylethylamine (7.8 mL) was added. The reaction was stirred at 100° C. for 6 hrs. The mixture was cooled down and acidified to pH 7 using 5M HCl aqueous solution (40 mL). The crude mixture was further diluted 5-fold with deionized water and purified with dialysis using membrane tubing (3K MWCO) to afford the desired water-soluble poly alpha-1,6-glucan-tosylate-amine. The degree of tosyl substitution was determined by elemental analysis to be 0.5. The degree of amine substitution was determined by elemental analysis to be 0.3.

Example 7A: Preparation of Poly Alpha-1,6-Glucan Tosylate

NaOH (30 g, 50% concentration), urea (25 g), and water (154 mL) were mixed and stirred to obtain a clear solution. Poly alpha-1,6-glucan (17K, 25% branching, 20 g) prepared as described herein above was added with stirring. The mixture was cooled to −12° C. for 1 hour with acetone-dry ice bath, once it warmed up to 0° C., the solution was vigorously stirred to obtain a transparent poly alpha-1,6-glucan solution.

To the above glucan solution cooled by ice-bath, p-toluenesulfonyl chloride (47 gram) and Imbentin AGS/35 (5 mL) were added. The mixture was stirred vigorously at 0° C. for at least 3 hours and warmed up to room temperature overnight. The product was precipitated in isopropanol and washed thoroughly with isopropanol (200 mL/each, 5 times) to afford the desired glucan-tosylate in quantitative yield. The degree of tosyl substitution was determined by elemental analysis to be 0.7.

Example 7B: Preparation of Poly Alpha-1,6-Glucan-Tosylate-Ethylene Diamine

To a glucan-tosylate from a preparation similar to that of the examples herein (15 g, DoS (Ts)=0.9) in DMSO (30 mL) and CH$_3$CN (15 mL), N-ethylethylenediamine (30 mL) was added at room temperature. N,N-Disopropylethylamine (45 mL) was added. The reaction was stirred at 70° C. for 20 hrs. The mixture was cooled down and acidified to pH 7 using 5M HCl aqueous solution. The crude mixture was further diluted 5-fold with deionized water and purified with dialysis using membrane tubing (3K MWCO) to afford 10.5 gram of the desired water-soluble poly alpha-1,6-glucan-tosylate-amine. The degree of tosyl substitution was determined by elemental analysis to be 0.5. The degree of amine substitution was determined by elemental analysis to be 0.3.

Example 8: Preparation of Tosylate-Thiosulfate Glucan

To the glucan-tosylate from Example 7A (18 g) in DMSO (160 mL), Na$_2$S$_2$O$_3$ (36 gram), and water (40 mL) were added at room temperature. The reaction was stirred at 85° C. (external temperature) for 18 hrs. After that, the reaction mixture was cooled down to room temperature. Saturated NaHCO$_3$ (100 mL) and water (100 mL) were added. The resulting clear solution was further purified with spectra/Por® 6 dialysis membrane (3.5K) and dried to afford 13 gram of desired product. The degree of tosyl substitution was determined by elemental analysis to be 0.2. The degree of thiosulfate substitution was determined by elemental analysis to be 0.5. The degree of tosylate substitution was 0.7.

Example 9A: Preparation of Poly Alpha-1,3-Glucan Carboxylate

Nitric acid (69%, 500 mL) and phosphoric acid (85%, 250 mL) were mixed at room temperature. To this solution, glucan (jet-milled powder, 130 g) was added at room temperature. The mixture was stirred for 15 min, then sodium nitrite (6 g) was added at once while the reactor was cooled with an ice-bath. The reaction mixture was slowly stirred for 4 hours. The reaction mixture was cooled with a water bath and internal temperature was controlled not to exceed 35-40° C. The resulting mixture was set at room temperature for another 44 hours. Ice-water (500 mL) was added and the resulting mixture was poured into ice-water to total volume of about 6 L and treated with NaOH to pH about 7-8. The resulting solution was purified with ultrafiltration (5K membrane). The retentate was concentrated to give a residue which was dried on a lyophilizor to give a solid product (58 g). NMR analysis indicated that the glucan was about 96% oxidized to the carboxylate group (—COOH) at the $C_6$ position. The DoS was about 1.

Example 9B: Preparation of Poly Alpha-1,3-Glucan Carboxylate Benzyl Derivative The product from Example 9A (20 g) was dissolved in water (70 mL) at room temperature. To this solution, NaOH (12 g, 0.15 moles of 50% solution) was added at room temperature. A homogenous solution was formed. The mixture was heated to 65° C. Benzyl chloride (15.6 g, 0.123 moles) was added to the reaction mixture. The reaction mixture was then heated to 85° C. and hold at 85° C. for 3 hours. After being cooled to room temperature, the reaction mixture was poured into water (500 mL) and treated with HCl (18.5 wt. % solution) to pH about 7-8, then extracted with methylene chloride to remove as much organics as possible. This aqueous solution was then diluted with water to about 3 L and further purified with ultrafiltration (5K membrane). The retentate was concentrated to give a residue which was lyophilized to give a solid product (9.0 g). DoS of the benzyl group was about 1 based on NMR analysis.

Example 10A: Preparation of Allyl Poly Alpha-1,6-Glucan

Poly alpha-1,6-glucan (17K, 10% branching, 41 g) prepared as described herein above was dissolved in 100 mL deionized water in a 3 neck flask equipped with an additional funnel, overhead stirrer and nitrogen inlet. The mixture was cooled to 0-5° C. To this was added 50% sodium hydroxide (21 g) via the addition funnel, followed by allyl glycidyl ether (90 g). The mixture was heated to 65° C. and stirred under nitrogen for 6 hours. The amber solution was cooled and neutralized with 18 wt % HCl. The solution was diluted to 3 L, and purified by ultrafiltration (MWCO 5K, PES). The product was freeze-dried to yield white powder. NMR analysis showed the degree of substitution of allyl group was 1.3.

Example 10B: Carboxymethylation of Allyl Poly Alpha-1,6-Glucan

Allyl poly alpha-1,6 glucan from Example 10A (20 g) was dissolved in 50 mL deionized water in a 3 neck flask equipped with an additional funnel, overhead stirrer, and nitrogen inlet. The mixture was cooled to 0-5° C. To this as added 50% sodium hydroxide (21 g) via the addition funnel, and the mixture was stirred for another 10 min to yield an orange slurry. To this was added chloroacetic acid (5.2 g dissolved in 3.5 g water) via the addition funnel. The mixture was heated to 65° C. and stirred under nitrogen for 3 hours. The amber solution was cooled and neutralized with 18 wt % HCl. The product was purified by ultrafiltration (MWCO 5K, PES). The product was freeze-dried to yield white powder. NMR analysis showed the degree of substitution of allyl group was 1.3 and the degree of substitution of the carboxmethyl group was 0.1.

Example 11: Preparation of Tosylate-Alkyl Sulfonate Glucan

To the poly alpha-1,6-glucan-tosylate from Example 7A (10 g) in DMSO (50 mL) is added 1,3-propanesultone (10 g), followed by trimethylamine (3 g) under nitrogen. The reaction mixture is stirred at 60° C. for 6 hours. The mixture is cooled to room temperature and diluted with 500 mL water. The product is purified by dialysis (spectra/Por® 6 dialysis membrane (3.5K) and freeze dried.

Example 12: Preparation of Poly Alpha-1,6-Glucan-Tosylate-Carboxymethyl Derivative A 4-neck 250 mL round bottom flask is equipped with overhead mechanical stirrer, thermocouple, and $N_2$ inlet. Poly alpha-1,6-glucan-tosylate from Example 7A (10 g) and ethanol (92 wt %, 60 mL) is added into the flask. The mixture is stirred at room temperature for 30 min. Sodium hydroxide (10 g, 50 wt % aqueous solution) is added dropwise over 10 min period, while stirring. The slurry is stirred at room temperature for 15 minutes. Chloroacetic acid (5.8 g in 3 g of 92 wt % ethanol) is added in 5 minutes. The slurry is stirred at 60-62° C. for 4 hours. The mixture is cooled to room temperature and neutralized with 18.5 wt % HCl solution. The mixture is dissolved and purified by ultrafiltration (MWCO 5 kD, PES membrane).

Example 13A: Benzyl Glucan Preparation

Into a 4-neck 2 L flask was added 610 mL water and 270 g of poly alpha-1,3-glucan wet cake (containing about 100 g dry glucan). The mixture was stirred at room temperature for 30 min. Sodium hydroxide solution (50%, 129 g) was added. The reaction mixture was heated to 65° C. Benzyl chloride (155 g) was added and the resulting reaction mixture was heated to 84° C. and kept at 80-85° C. for 3 hours. The reaction mixture was cooled to about 35° C. and treated with hydrochloric acid (18.5 wt. %) to pH about 7. Reaction slurry was filtered and washed with water (500 mL), methanol solution (1:1 with water, 500 mL), and then acetone (3×500 mL). The resulting wet cake was dried in a 40° C. vacuum oven with $N_2$ flash overnight to give benzyl glucan (68 g). Based on NMR analysis, the DoS of the benzyl group was determined to be 0.6.

Example 13B: Carboxymethylation of Benzyl Glucan

To a 4-neck 1 L flask was added 400 mL ethanol (92 wt %) and benzyl glucan from Example 13A (57.7 g). The mixture was stirred at room temperature for 30 min. Sodium hydroxide solution (50%, 51.5 g) was added. The mixture was stirred at room temperature for 15 min. Monochloroacetic acid (30.5 g) in ethanol (23 g) was added to the reaction mixture. The reaction mixture was heated to 72-75° C. for 3 hours. The reaction mixture was cooled to about 35° C. and treated with hydrochloric acid (18.5 wt. %) to pH about 7-8. Reaction slurry was filtered. The wet cake was dissolved into water (4 L) and filtered. The filtrate was purified by ultra-filtration (5K membrane). The retentate was concentrated and dried on a lyophilizer to give carboxymethyl benzyl glucan (60.7 g). Based on NMR analysis, the DoS for the benzyl group was 0.7 and DoS for the carboxymethyl group was 0.5.

Example 14: Preparation of Hydroxyethyl Carboxymethyl Glucan

Hydroxyethyl glucan, with MS of EO substitution of 3.5 was prepared as described in U.S. Pat. No. 9,139,718. The carboxymethylation reaction was carried out as follows.

A 4-neck, 250 mL round bottom flask was charged with 20 g of hydroxyethyl glucan and water (80 g). The mixture was stirred and sodium hydroxide (28.5 g, 50 wt % solution) was added over a 20 minute period. The mixture was stirred for an additional 60 minutes. A solution containing 16.8 g of monochloroacetic acid in 5 g of water was added. The resulting mixture was heated for 3 hours at 60-63° C. Water (100 mL) was added and pH of the mixture was adjusted to about 7 by adding HCl (18.5 wt %). The mixture was poured into water (1.2 L) and further purified by ultra-filtration. The retentate was concentrated and dried on a lyophilizer to give a solid product (12.6 g). NMR analysis indicated DoS (carboxymethyl)=0.4, and MS (EO) of 3.5.

Example 15: Soil Release Testing of Benzyl-Carboxymethyl Glucan

Benzyl-carboxymethyl glucan from Example 1B was used. Fabric swatches (JoAnn's Fabric Symphony Broadcloth: 65% polyester: 35% cotton) were scoured in 400 ppm nonionic surfactant prior to use. The fabric was cut to 4"×4" and 3 swatches were used per test. The swatches were dipped in 100 ppm of aqueous solution benzyl-carboxymethyl glucan, wrung to a consistent liquid mass, and laid flat to air dry. Vegetable oil dyed with solvent red 27 was used to soil each swatch (approximately 0.13 g of soil was applied to each swatch). The swatches were dried overnight before washing. Wash conditions: 1 L tap water, 60 ppm hardness. 80 rpm agitation, 38° C. wash temp, 10 minute wash with 3 minute rinse. Detergent used: Arms & Hammer Clean Burst 0.68 g/L; addition order: water, detergent, cloth. The swatches were wrung to consistent mass before and after rinse cycle and air dried.

A control experiment was performed similarly, but with no benzyl-carboxymethyl glucan in the aqueous solution. Comparative Examples A and B were also performed similarly, but with Repel-O-Tex Crystal and Fisher's LSD, respectively, substituted for the benzyl-carboxymethyl glucan.

The reflectance readings (x, y, z color space) were taken in quadruplicate for each swatch using a Hunter colorimeter both after soiling and after washing. The y values were used to determine cleaning efficacy. The differences between the two values are reported (Delta R, the larger value indicates more soil removal). The results shown below in Table 7 illustrate that benzyl-carboxymethyl glucan is effective in soil release of oily soil.

TABLE 7

Soil Release Testing Results

| Sample | Delta R |
|---|---|
| Control (no glucan polymer) | 0.8 |
| Benzyl-carboxymethy glucan (Example 1B) | 14.6 |
| Repel-O-Tex Crystal (Solvay) (Comparative Example A) | 12.3 |
| Fisher's LSD @ 95% (Comparative Example B) | 1.1 |

Example 16: Whiteness Testing of Benzyl-Carboxymethyl Glucan and Tosylate-Thiosulfate Glucan Benzyl-carboxymethyl glucan made similarly as described in Example 13B and tosylate-thiosulfate glucan obtained in Example 8 is used. Whiteness maintenance, also referred to as Whiteness preservation, is the ability of a detergent to keep white items from whiteness loss when they are washed in the presence of soils. White garments can become dirty/dingy looking over time when soils are removed from dirty clothes and deposited into the wash water, then these soils can re-deposit onto clothing, making the clothing less white each time they are washed.
Calculation of Whiteness: CIELab b* and Ganz and CIE Whiteness Index Whiteness Index ("WI") is a qualifying assessment of color that is calculated by a formula which includes three components of color measurement—hue, saturation, and lightness—which is then indexed to a standard white value. Several whiteness formulas can be used to measure whiteness on cellulose based substrates. Two common formulas are the Ganz Whiteness Index and CIE Whiteness. Ganz Whiteness Index is expressed by the formula: WI=(D*Y)+(P*x)+(Q*y)+C, where Y, x and y are colorimetric values and D, P, Q and C are formula parameters. CIE Whiteness is expressed by the formula: WI=Y−(800*x)−(1700*y)+813.7, where Y, x and y are colorimetric values. Further information is available in the publication of Rolf Griesser, Ciba-Geigy Ltd, "Whiteness and Tint", June 1993.

The surface color of an article may be quantified using a series of measurements—L*, a*, and b*—generated by measuring the samples using a spectrophotometer. The equipment used for this test is a Konica Minolta CM-3610D spectrophotometer. The software program used is Spectra-Magic NX software. "L" is a measure of the amount of white or black in a sample; higher "L" values indicate a lighter colored sample. A measure of the amount of red or green in a sample is determined by "a*" values. A measure of the amount of blue or yellow in a sample is determined by "b*" values; lower (more negative) b* values indicate more blue on a sample.

This method measures the ability of product formulations to suspend the background soil in the wash water and prevent it from depositing on the clothes. Due to the multi-cycle nature of this test and the ability to read fabric change over the cycles, the data reported below after 3 wash cycles.

The average wash load contains ~40 g of soil. Of this wash soil, 70% is body soil, 10% is environmental (dirt, grass) soil, 10% is accidental food stains, and the final 10% is miscellaneous/unidentified. SBL2004 test soil strips (artificial soil, available from WFK Testgewebe GmbH) replicate this diversity of food, body soil, and clay and pigments. SBL2004 test soil strips are added to simulate consumer soil levels. One SBL2004 sheet is on average loaded with 8 g soil. WFK: WFK Testgewebe GmbH, European supplier of test materials (ECE-2 detergent, artificial soil SBL2004 and whiteness tracers. WFK Testgewebe GmbH.

This method is run under type III wash conditions, using 0.31% soil/wash cycle and a 5 pot Automatic Mini-Washers (AMW). Product concentration, time and wash temperature in mini-washer is identical to product concentration, time and wash temperature in the equivalent full-scale wash condition.

TABLE 8

Standard Washing Conditions

| Condition | Water Fill (l) | Wash Time (min) | Wash Temperature (° C.) | Full Scale Example |
|---|---|---|---|---|
| Type I | 60 | 35 | 30 | Top Loader |
| Type II | 30 | 45 | 25 | NA Top Loader HE & Asia Low Water |
| Type III | 16 | 30 | 30 | NA HE Front loader and Japan |
| Type IV | 16 | 110 | 48 | WE Front Loader |

Hardness (in grains per gallon, gpg): US 7 gpg (3:1 Ca:Mg), Western Europe 15 gpg (3:1 Ca:Mg), Japan 3 gpg (3:1 Ca:Mg), China 15 gpg (4:1 Ca:Mg)

Table 8 above shows the suitable product concentration, hardness and soil load for 7.57 liter 5-pot Automatic mini-washers, under the respective wash conditions. Fabric swatches used in the whiteness test are provided in Table 9.

TABLE 9

Fabric Samples

| Code | % Fiber Content | Fiber Construction | Fabric Density (g/m) | Whiteness Index (WI) A* | Whiteness Index (WI) D65** | Size |
|---|---|---|---|---|---|---|
| CT [1] | 100 | Woven | ~540 | ~93 | ~163 | 8" × 8" (20 × 20 cm) |
| CK [2] | 100 | Weft Knit | ~220 | ~96 | ~165 | 8" × 8" (20 × 20 cm) |
| PC [3] | 65/35 | Plain Woven | ~125 | ~98 | ~156 | 8" × 8" (20 × 20 cm) |
| PE [4] | 100 | Weft Knit | ~200 | ~95 | ~156 | 8" × 8" (20 × 20 cm) |
| CS [5] | 98/2 | Woven Twill | ~180 | ~86 | ~158 | 8" × 8" (20 × 20 cm) |

Notes:
*WI(A) - illuminant A (indoor lighting)
**WI(D65) - illuminant D65 (outdoor lighting)
[1] Cotton Terry
[2] Cotton Knit
[3] Polyester/Cotton
[4] Polyester
[5] Cotton/Spandex For the mini-washer test, 3.5 SBL strips are used per wash leg (~28 g of soil) per cycle. Per test leg, there are 3 of each fabric type that remain through 3 cycles of treatment. The SBL soil strips are replaced after each wash. Whiteness readings are done prior to and after treatment using L*a*b* WICIE method (Hunter Labs). Data reported in Table 10 is after the third washing cycle.

TABLE 10

Fabric Whiteness Measurement Results

| Glucan | Fabric Sample (under Type III conditions) | | | | |
|---|---|---|---|---|---|
| | PE | PC | CK | CS | CT |
| None | 0.00 | 0.00 | 0.00 | 0.00 | 0.00 |
| Benzyl carboxymethyl Glucan (Ex. 13B) | 28.65 | 5.03 | 5.48 | 3.03 | 3.41 |
| Tosylate-Thiosulfate Glucan (Ex. 8) | 14.88 | 7.52 | 7.08 | 6.13 | 3.93 |

Example 17: Surface Tension Measurements

The surface activity of amphiphilic glucan polymers was determined by the surface tension measurement with the du Nuoy ring method, using a CAHN DCA-312 force tensiometer, according to ASTM Standard D1331, 2015 method. The data in Table 11 shows that the amphiphilic polysaccharide derivatives have surface activity, as demonstrated by the reduction of surface tension. The results for Comparative Example C shows that carboxymethylated poly alpha-1,3-glucan does not exhibit surface activity. The carboxymethylated glucan was prepared as described in U.S. Pat. No. 9,139,718 and had a carboxymethylation DoS of 0.6 based on NMR analysis.

TABLE 11

Surface Tension Measurements

| Polymer Description | ST (mN/m) 1 wt % | ST (mN/m) 2 wt % |
|---|---|---|
| Water | | 72 |
| Carboxymethylated glucan (Comparative Example C) | | 71 |
| Benzyl carboxymethyl glucan (Example 1b) | 68 | 51 |
| Benzyl carboxymethyl glucan (Example 2b) | 54 | 37 |
| Benzyl carboxymethyl glucan (Example 3b) | 64 | 54 |
| Quaternary ammonium benzyl glucan (Example 4) | 69 | 54 |
| Tosylate ethylene diamine glucan (Example 7B) | 42 | — |
| Tosylate thiosulfate glucan (Example 8) | 53 | 52 |
| Allyl carboxymethyl glucan (Example 10B) | 46 | 46 |
| Hydroxyethyl carboxymethyl glucan (Example 14) | 65 | 65 |

What is claimed is:

1. A composition comprising a polysaccharide derivative, wherein the polysaccharide derivative comprises a polysaccharide substituted with at least one hydrophilic group that comprises sulfate,
wherein the polysaccharide is poly alpha-1,3-glucan that comprises a backbone of glucose monomer units of which greater than or equal to 50% are linked via alpha-1,3-glycosidic linkages,
and wherein the composition is an industrial product, household product, or personal care product.

2. The composition of claim 1, wherein greater than or equal to 90% of the glucose monomer units are linked via alpha-1,3-glycosidic linkages.

3. The composition of claim 1, wherein the polysaccharide is further substituted with at least one hydrophobic group.

4. The composition of claim 3, wherein the hydrophobic group comprises a $C_6$ to $C_{20}$ aryl, benzyl, $C_6$-$C_{20}$ aryl sulfonyl, or p-toluenesulfonyl group.

5. The composition of claim 1, wherein the polysaccharide has a degree of polymerization of about 5 to about 1400.

6. The composition of claim 1, wherein the polysaccharide derivative has a degree of substitution of about 0.001 to about 3.0.

7. The composition of claim 1, wherein the composition is in the form of a liquid, gel, powder, hydrocolloid, aqueous solution, granule, tablet, capsule, single compartment sachet, multi-compartment sachet, single compartment pouch, or multi-compartment pouch.

8. The composition of claim 1, wherein the composition further comprises at least one of a surfactant, enzyme, detergent builder, complexing agent, polymer, soil release polymer, surfactancy-boosting polymer, bleaching agent, bleach activator, bleaching catalyst, fabric conditioner, clay, foam booster, suds suppressor, anti-corrosion agent, soil-suspending agent, anti-soil redeposition agent, dye, bactericide, tarnish inhibitor, optical brightener, perfume, saturated or unsaturated fatty acid, dye transfer inhibiting agent, chelating agent, hueing dye, calcium cation, magnesium cation, visual signaling ingredient, anti-foam, structurant, thickener, anti-caking agent, starch, sand, or gelling agent.

9. The composition of claim 8, wherein the composition comprises the surfactant.

10. The composition of claim 8, wherein the composition comprises the enzyme, and the enzyme is a cellulase, protease, amylase, or lipase.

11. The composition of claim 1, wherein the composition is a fabric care composition.

12. The composition of claim 11, wherein the fabric care composition is a laundry detergent.

13. A method of treating a substrate, the method comprising:
   (a) providing a composition according to claim 1, and
   (b) contacting the substrate with the composition.

14. The method of claim 13, further comprising:
   (c) rinsing the substrate.

\* \* \* \* \*